US011869526B2

(12) United States Patent
Cheung et al.

(10) Patent No.: US 11,869,526 B2
(45) Date of Patent: *Jan. 9, 2024

(54) HEARING ENHANCEMENT METHODS AND SYSTEMS

(71) Applicant: IpVenture, Inc., San Jose, CA (US)

(72) Inventors: Kwok Wai Cheung, Cambridge (GB); Peter P. Tong, Mountain View, CA (US); C. Douglass Thomas, Saratoga, CA (US)

(73) Assignee: IpVenture, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,546

(22) Filed: May 8, 2023

(65) Prior Publication Data

US 2023/0274752 A1 Aug. 31, 2023

Related U.S. Application Data

(63) Continuation of application No. 17/899,591, filed on Aug. 30, 2022, now Pat. No. 11,657,827, which is a (Continued)

(51) Int. Cl.

*H04R 3/12* (2006.01)
*G10L 21/0208* (2013.01)

(Continued)

(52) U.S. Cl.

CPC .......... *G10L 21/0208* (2013.01); *H04R 1/403* (2013.01); *H04R 25/405* (2013.01);

(Continued)

(58) Field of Classification Search

CPC ... G10L 21/0208; H04R 25/405; H04R 1/403; H04R 3/12; H04R 2201/023

(Continued)

(56) References Cited

U.S. PATENT DOCUMENTS

| | | | |
|---|---|---|---|
| 3,104,290 | A | 9/1963 | Rosemond et al. |
| 3,119,903 | A | 1/1964 | Rosemond et al. |

(Continued)

FOREIGN PATENT DOCUMENTS

| | | | |
|---|---|---|---|
| DE | 2652101 | A1 | 5/1978 |
| DE | 10109862 | A1 | 9/2002 |

(Continued)

OTHER PUBLICATIONS

Office Action for U.S. Appl. No. 10/826,529, dated Jan. 3, 2007.

(Continued)

*Primary Examiner* — Melur Ramakrishnaiah

(57) ABSTRACT

Different embodiments on hearing enhancement methods and systems to enhance a user's hearing. In one embodiment, a system includes a headset. The headset can access audio signals from other portable or non-portable instruments, wired or wirelessly, such as from home entertainment units, phones, microphones at a conference or speakers at a movie theater. The headset includes a wireless communication component to receive signals from an instrument, a down-convert circuitry, a speaker and a microphone to pickup sound in a headset environment. The headset is configured to modify audio output signals based on the pickup sound to at least reduce noise in the audio output signals to help the user hear audio signals.

20 Claims, 43 Drawing Sheets

Related U.S. Application Data continuation of application No. 17/333,688, filed on May 28, 2021, now Pat. No. 11,488,618, which is a continuation of application No. 17/155,767, filed on Jan. 22, 2021, now Pat. No. 11,257,508, which is a continuation of application No. 16/703,788, filed on Dec. 4, 2019, now Pat. No. 10,937,439, which is a continuation of application No. 15/667,742, filed on Aug. 3, 2017, now Pat. No. 10,522,165, which is a continuation of application No. 14/482,049, filed on Sep. 10, 2014, now Pat. No. 9,741,359, which is a continuation of application No. 12/930,344, filed on Jan. 4, 2011, now Pat. No. 8,849,185, which is a continuation-in-part of application No. 12/462,601, filed on Aug. 6, 2009, now Pat. No. 8,208,970, which is a continuation of application No. 11/893,835, filed on Aug. 16, 2007, now Pat. No. 7,587,227, which is a continuation of application No. 10/826,529, filed on Apr. 15, 2004, now Pat. No. 7,269,452.

(60) Provisional application No. 61/335,361, filed on Jan. 5, 2010, provisional application No. 60/462,570, filed on Apr. 15, 2003, provisional application No. 60/469,221, filed on May 12, 2003, provisional application No. 60/493,441, filed on Aug. 8, 2003.

(51) Int. Cl.
*H04R 25/00* (2006.01)
*H04R 1/40* (2006.01)

(52) U.S. Cl.
CPC .......... *H04R 3/12* (2013.01); *H04R 2201/023* (2013.01); *H04R 2217/03* (2013.01)

(58) Field of Classification Search
USPC .......................................................... 381/98
See application file for complete search history.

(56) References Cited

U.S. PATENT DOCUMENTS

| | | | | |
|---|---|---|---|---|
| 3,882,425 A | | 5/1975 | Briley | |
| 3,942,139 A | | 3/1976 | Cooper et al. | |
| 3,974,335 A | | 8/1976 | Blackledge | |
| 4,006,308 A | | 2/1977 | Ponsgen | |
| 4,128,738 A | | 12/1978 | Gallery | |
| 4,292,679 A | | 9/1981 | Kondo et al. | |
| 4,476,571 A | | 10/1984 | Tokumo et al. | |
| 4,622,440 A | | 11/1986 | Slavin | |
| 4,625,318 A | | 11/1986 | Snyder | |
| 4,823,908 A | | 4/1989 | Tanaka et al. | |
| 4,904,078 A | | 2/1990 | Gorike | |
| 4,955,729 A | | 9/1990 | Marx | |
| 5,313,663 A | | 5/1994 | Norris | |
| 5,321,758 A | | 6/1994 | Charpentier et al. | |
| 5,357,578 A | | 10/1994 | Taniishi | |
| 5,450,494 A | | 9/1995 | Okubo et al. | |
| 5,481,616 A | | 1/1996 | Freadman | |
| 5,495,534 A | | 2/1996 | Inanaga et al. | |
| 5,519,781 A | | 5/1996 | Kukurudza | |
| 5,526,411 A | | 6/1996 | Krieter | |
| 5,572,575 A | | 11/1996 | Yamamoto et al. | |
| 5,588,041 A | | 12/1996 | Meyer, Jr. et al. | |
| 5,590,417 A | | 12/1996 | Rydbeck | |
| 5,648,824 A | | 7/1997 | Dunn et al. | |
| 5,661,699 A | * | 8/1997 | Sutton | H04B 11/00 367/199 |
| 5,666,424 A | | 9/1997 | Fosgate et al. | |
| 5,666,658 A | * | 9/1997 | Borchardt | H04R 5/033 455/344 |
| 5,682,157 A | | 10/1997 | Asmussen et al. | |
| 5,754,664 A | | 5/1998 | Clark et al. | |
| 5,764,595 A | | 6/1998 | Power | |
| 5,764,782 A | | 6/1998 | Hayes | |
| 5,777,665 A | | 7/1998 | McNelley et al. | |
| 5,793,875 A | | 8/1998 | Lehr et al. | |
| 5,802,190 A | | 9/1998 | Ferren | |
| 5,819,183 A | | 10/1998 | Voroba et al. | |
| 5,828,768 A | | 10/1998 | Eatwell et al. | |
| 5,835,732 A | | 11/1998 | Kikinis et al. | |
| 5,870,484 A | | 2/1999 | Greenberger | |
| 5,872,743 A | | 2/1999 | Maxwell | |
| 5,943,430 A | | 8/1999 | Saitoh | |
| 6,011,855 A | | 1/2000 | Selfridge et al. | |
| 6,041,657 A | | 3/2000 | Sutherland | |
| 6,052,336 A | | 4/2000 | Lowrey, III | |
| 6,052,568 A | * | 4/2000 | Williams | H04B 7/18517 455/12.1 |
| 6,058,315 A | | 5/2000 | Clark | |
| 6,086,541 A | | 7/2000 | Rho | |
| 6,151,398 A | | 11/2000 | Norris | |
| 6,163,711 A | | 12/2000 | Juntunen et al. | |
| 6,169,813 B1 | | 1/2001 | Richardson et al. | |
| 6,231,181 B1 | | 5/2001 | Swab | |
| 6,243,472 B1 | | 6/2001 | Bilan et al. | |
| 6,259,731 B1 | | 7/2001 | Dent et al. | |
| 6,275,596 B1 | | 8/2001 | Fretz et al. | |
| 6,279,946 B1 | | 8/2001 | Johnson et al. | |
| 6,311,155 B1 | | 10/2001 | Vaudrey et al. | |
| 6,322,521 B1 | | 11/2001 | Hou | |
| 6,363,139 B1 | | 3/2002 | Zurek et al. | |
| 6,445,804 B1 | | 9/2002 | Hirayanagi | |
| 6,453,045 B1 | | 9/2002 | Zurek et al. | |
| 6,477,258 B1 | | 11/2002 | Watson et al. | |
| 6,484,040 B1 | | 11/2002 | Wang | |
| 6,496,205 B1 | | 12/2002 | White et al. | |
| 6,498,970 B2 | | 12/2002 | Colmenarez et al. | |
| 6,512,826 B1 | | 1/2003 | Kim | |
| 6,535,612 B1 | | 3/2003 | Croft, III et al. | |
| 6,539,100 B1 | | 3/2003 | Amir et al. | |
| 6,556,687 B1 | | 4/2003 | Manabe | |
| 6,582,075 B1 | | 6/2003 | Swab et al. | |
| 6,584,205 B1 | | 6/2003 | Croft, III et al. | |
| 6,591,085 B1 | | 7/2003 | Grady | |
| 6,594,367 B1 | | 7/2003 | Marash et al. | |
| 6,631,196 B1 | | 10/2003 | Taenzer et al. | |
| 6,643,377 B1 | | 11/2003 | Takahashi et al. | |
| 6,650,755 B2 | | 11/2003 | Vaudrey et al. | |
| 6,671,494 B1 | | 12/2003 | James | |
| 6,678,381 B1 | | 1/2004 | Manabe | |
| 6,710,797 B1 | | 3/2004 | McNelley et al. | |
| 6,771,785 B2 | | 8/2004 | Pompei | |
| 6,807,281 B1 | | 10/2004 | Sasaki et al. | |
| 6,813,490 B1 | | 11/2004 | Lang et al. | |
| 6,895,261 B1 | | 5/2005 | Palamides | |
| 6,914,991 B1 | | 7/2005 | Pompei | |
| 7,013,009 B2 | | 3/2006 | Warren | |
| 7,016,504 B1 | | 3/2006 | Shennib | |
| 7,016,708 B1 | | 3/2006 | Chan et al. | |
| 7,062,050 B1 | | 6/2006 | Pompei | |
| 7,106,180 B1 | | 9/2006 | Pompei | |
| 7,269,452 B2 | | 9/2007 | Cheung | |
| 7,376,236 B1 | | 5/2008 | Norris et al. | |
| 7,388,962 B2 | | 6/2008 | Cheung et al. | |
| 7,430,299 B2 | | 9/2008 | Armstrong et al. | |
| 7,587,227 B2 | | 9/2009 | Cheung et al. | |
| 7,596,228 B2 | | 9/2009 | Pompei | |
| 7,657,044 B2 | | 2/2010 | Pompei | |
| 7,787,647 B2 | | 8/2010 | Hagen et al. | |
| 7,801,570 B2 | | 9/2010 | Cheung et al. | |
| 8,009,849 B2 | | 8/2011 | Enzmann | |
| 8,175,886 B2 | | 5/2012 | Odinak | |
| 8,208,970 B2 | | 6/2012 | Cheung et al. | |
| 8,251,875 B2 | | 8/2012 | Ellis et al. | |
| 8,571,241 B2 | | 10/2013 | Larsen | |
| 8,582,789 B2 | | 11/2013 | Cheung et al. | |
| 8,620,208 B2 | | 12/2013 | Slotznick | |
| 8,626,246 B2 | | 1/2014 | Shostak | |
| 8,849,185 B2 | | 9/2014 | Cheung et al. | |
| 8,953,821 B2 | | 2/2015 | Pompei | |
| 9,183,351 B2 | | 11/2015 | Shusterman | |

(56) References Cited

U.S. PATENT DOCUMENTS 9,369,814 B2 6/2016 Victorian et al.
9,741,359 B2 8/2017 Cheung et al.
10,522,165 B2 12/2019 Cheung et al.
10,937,439 B2 3/2021 Cheung et al.
11,257,508 B2 2/2022 Cheung et al.
11,488,618 B2 11/2022 Cheung et al.
11,657,827 B2 5/2023 Cheung et al.
11,670,320 B2 6/2023 Cheung et al.
2001/0007591 A1 7/2001 Pompei
2001/0038698 A1 11/2001 Breed et al.
2001/0055397 A1 12/2001 Norris et al.
2002/0005777 A1 1/2002 Rodewald et al.
2002/0008718 A1 1/2002 Obradovich
2002/0012441 A1 1/2002 Matsunaga et al.
2002/0048382 A1 4/2002 Hou
2002/0048385 A1 4/2002 Rosenberg
2002/0054689 A1 5/2002 Zhang et al.
2002/0057746 A1* 5/2002 Chen ................. H04L 25/03343 375/334
2002/0070881 A1 6/2002 Marcarelli et al.
2002/0090099 A1 7/2002 Hwang
2002/0090103 A1 7/2002 Calisto, Jr.
2002/0098877 A1* 7/2002 Glezerman ............ H04B 1/385 455/575.5
2002/0101360 A1 8/2002 Schrage
2002/0136414 A1 9/2002 Jordan et al.
2002/0141599 A1 10/2002 Trajkovic et al.
2002/0148872 A1 10/2002 DeVolentine et al.
2002/0149705 A1 10/2002 Allen et al.
2002/0183648 A1 12/2002 Hou
2002/0191807 A1 12/2002 Asada et al.
2003/0009248 A1 1/2003 Wiser et al.
2003/0009329 A1 1/2003 Stahl et al.
2003/0026439 A1 2/2003 Yamamoto et al.
2003/0035552 A1 2/2003 Kolano et al.
2003/0037125 A1 2/2003 Luman et al.
2003/0045283 A1 3/2003 Hagedoorn
2003/0064746 A1 4/2003 Rader et al.
2003/0069000 A1 4/2003 Kindo et al.
2003/0091200 A1 5/2003 Pompei
2003/0092377 A1 5/2003 Hill
2003/0118198 A1 6/2003 Croft, III et al.
2003/0156495 A1 8/2003 Haase et al.
2003/0174242 A1 9/2003 Carmi et al.
2003/0182104 A1 9/2003 Muesch
2003/0185404 A1 10/2003 Milsap
2004/0001588 A1* 1/2004 Hairston ............... H04M 1/271 379/419
2004/0005069 A1 1/2004 Buck
2004/0042615 A1 3/2004 Scholte
2004/0052387 A1 3/2004 Norris et al.
2004/0114770 A1 6/2004 Pompei
2004/0114772 A1 6/2004 Zlotnick
2004/0124739 A1 7/2004 Li
2004/0170086 A1 9/2004 Mayer et al.
2004/0202339 A1 10/2004 O'Brien, Jr. et al.
2004/0204168 A1 10/2004 Laurila
2004/0208324 A1 10/2004 Cheung et al.
2004/0208325 A1 10/2004 Cheung et al.
2004/0208333 A1 10/2004 Cheung et al.
2004/0209654 A1 10/2004 Cheung et al.
2005/0009583 A1 1/2005 Cheung et al.
2005/0090295 A1 4/2005 Ali et al.
2006/0210090 A1 9/2006 Shennib
2006/0233404 A1 10/2006 Croft et al.
2006/0291667 A1 12/2006 Watanabe et al.
2007/0189548 A1 8/2007 Croft, III
2007/0211574 A1 9/2007 Croft, III
2007/0287516 A1 12/2007 Cheung
2008/0279410 A1 11/2008 Cheung et al.
2009/0298430 A1 12/2009 Cheung et al.
2010/0080409 A1 4/2010 Xu et al.
2011/0103614 A1 5/2011 Cheung et al.
2014/0376745 A1 12/2014 Cheung et al.
2017/0289323 A1 10/2017 Gelvin et al.
2018/0018988 A1 1/2018 Cheung et al.
2020/0105288 A1 4/2020 Cheung et al.
2021/0142817 A1 5/2021 Cheung et al.
2021/0287692 A1 9/2021 Cheung et al.
2022/0139412 A1 5/2022 Cheung et al.
2022/0415338 A1 12/2022 Cheung et al.
2023/0253001 A1 8/2023 Cheung et al.

FOREIGN PATENT DOCUMENTS

DE 10140646 A1 3/2003
EP 0973152 A2 9/2002
FR 2711515 A1 5/1995
GB 2351169 A 12/2000
GB 2365692 A 2/2002
JP 01109898 A 4/1989
JP 20022511706 A 4/2002
JP 2003101622 A * 4/2003 ............. G06F 3/016
KR 2000-000426 U 1/2000
KR 2001-0091117 A 10/2001
KR 2002-0044416 A 6/2002
TW 527844 A * 4/2003 .............. H04M 1/05
WO WO 95/34184 12/1995
WO WO 01/24576 A1 4/2001
WO WO 03/019125 A1 3/2003
WO WO 03/026349 A1 3/2003

OTHER PUBLICATIONS

Notice of Allowance for U.S. Appl. No. 10/826,529 dated Jun. 12, 2007.
Supplemental Notice of Allowance for U.S. Appl. No. 10/826,529, dated Jul. 30, 2007.
Office Action for U.S. Appl. No. 11/893,835, dated Oct. 21, 2008.
Notice of Allowance for U.S. Appl. No. 11/893,835, dated May 19, 2009.
Supplemental Notice of Allowance for U.S. Appl. No. 11/893,835, dated Jun. 8, 2009.
Supplemental Notice of Allowance for U.S. Appl. No. 11/893,835, dated Jun. 15, 2009.
Office Action for U.S. Appl. No. 12/462,601, dated Nov. 9, 2011.
Notice of Allowance for U.S. Appl. No. 12/462,601, dated Mar. 29, 2012.
Office Action for U.S. Appl. No. 12/930,344, dated Mar. 5, 2014.
Notice of Allowance for U.S. Appl. No. 12/930,344, dated Jun. 3, 2014.
Office Action for U.S. Appl. No. 14/482,049, dated May 9, 2016.
Notice of Allowance for U.S. Appl. No. 14/482,049, dated Sep. 16, 2016.
Notice of Allowance for U.S. Appl. No. 14/482,049, dated Jan. 13, 2017.
Notice of Allowance for U.S. Appl. No. 14/482,049, dated Apr. 10, 2017.
Non-Final Office Action for U.S. Appl. No. 15/667,742, dated Jan. 23, 2018.
Notice of Allowance for U.S. Appl. No. 15/667,742, dated Aug. 9, 2018.
Non-Final Office Action for U.S. Appl. No. 15/667,742, dated Oct. 30, 2018.
Notice of Allowance for U.S. Appl. No. 15/667,742, dated Jan. 9, 2018.
Non-Final Office Action for U.S. Appl. No. 15/667,742, dated Mar. 5, 2019.
Notice of Allowance for U.S. Appl. No. 15/667,743, dated Sep. 20, 2019.
Office Action for U.S. Appl. No. 16/703,788, dated Mar. 5, 2020.
Notice of Allowance for U.S. Appl. No. 16/703,788, dated Nov. 27, 2020.
Office Action for U.S. Appl. No. 17/155,767, dated Jul. 7, 2021.
Notice of Allowance for U.S. Appl. No. 17/155,767, dated Sep. 2, 2021.
Notice of Allowance for U.S. Appl. No. 17/155,767, dated Nov. 3, 2021.
Office Action for U.S. Appl. No. 17/333,688, dated Dec. 7, 2021.

(56) References Cited

OTHER PUBLICATIONS

Office Action for U.S. Appl. No. 17/333,688, dated Apr. 28, 2022.
Notice of Allowance for U.S. Appl. No. 17/333,688, dated Jun. 15, 2022.
Office Action for U.S. Appl. No. 17/574,698, dated Feb. 17, 2022.
Notice of Allowance for U.S. Appl. No. 17/574,698, dated Apr. 18, 2022.
Notice of Allowance for U.S. Appl. No. 17/574,698, dated Aug. 1, 2022.
Office Action for U.S. Appl. No. 17/574,698, dated Nov. 9, 2022.
Office Action for U.S. Appl. No. 17/899,591, dated Nov. 29, 2022.
Notice of Allowance for U.S. Appl. No. 17/899,591, dated Feb. 16, 2023.
Notice of Allowance for U.S. Appl. No. 17/899,591, dated Mar. 30, 2023.
Office Action, re: CN 200480010388.8, Chinese Patent Office, dated Apr. 17, 2009, 8 pages.
Second Office Action re: CN200480010388.8 Chinese Patent Office, dated Sep. 4, 2009, 6 pages.
Third Office Action re: CN200480010388.8 Chinese Patent Office, dated Jan. 22, 2010, 9 pages.
Fourth Office Action re: CN200480010388.8 Chinese Patent Office, dated Jul. 25, 2012, 4 pages.
Fifth Office Action re: CN200480010388.8 Chinese Patent Office, dated Oct. 26, 2012, 5 pages.
PCT International Search Report, Re: PCT/US04/11972, dated Jan. 31, 2005.
PCT Written Opinion of the International Searching Authority, Re: PCT/US04/11972, dated Jan. 31, 2005.
American Technology Corporation, HyperSonic Sound, Jan. 22, 2002, www.atcsd.com.
American Technology Corporation, "Technology Introduction," 2001, pp. 1-19.
American Technology Corporation, "Theory, History, and the Advancement of Parametric Loudspeakers—A Technology Overview," White Paper, 2002, pp. 1-27.
American Technology Corporation, "HSS Directed Audio Sound System, Model Series: 220," Product Information, 2003.
American Technology Corporation,"Technology Licensing—HyperSonic Sound," 2003, pp. 1-3.
Aoki, K. et al., "Parametric Loudspeaker-Applied Examples," Electronics and Communications in Japan, Part 3, vol. 77, No. 1, 1994, pp. 64-74.
Aoki, K. et al., "Self-demodulation of a plane-wave—Study on primary wave modulation for wideband signal transmission," J. Acoust. Soc. Jpn., pp. 349-356, 1984 (with English abstract).
Averkiou, M.A. et al., "Self-demodulation of amplitude- and frequency-modulated pulses in a thermoviscous fluid," The Journal of the Acoustical Society of America, 94(5), Nov. 1993, pp. 2876-2883.
Baker, A. C., "Nonlinear pressure fields due to focused circular apertures," The Journal of the Acoustical Society of America, 91(2), Feb. 1992, pp. 713-717.
Bennett, M. B., et al. "Parametric array in air," The Journal of the Acoustical Society of America, vol. 57, No. 3, Mar. 1975, pp. 562-568.
Berktay, H.O., "Possible Exploitation of Non-Linear Acoustics in Underwater Transmitting Applications," J. Sound Vib. (1965) 2(4), 435-461.
Berntsen, J. et al., "Interaction of sound waves. Part IV: Scattering of sound by sound," The Journal of the Acoustical Society of America, 86(5), Nov. 1989, pp. 1968-1983.
Berntsen, J. et al., "Nearfield of a large acoustic transducer. Part IV: Second harmonic and sum frequency radiation," The Journal of the Acoustical Society of America, 75(5), May 1984, pp. 1383-1391.
Blackstock, David T., "Audio Application of the Parametric Array," J. Acoust. Soc. Am, vol. 102, No. 5, Pt. 2, Nov. 1997, p. 3106.
Brain, Marshall, How USB Ports Work, Oct. 11, 2002, www.howstuffworks.com/usb.
Darvennes, C. M., et al., "Effects of absorption on the nonlinear interaction of sound beams," The Journal of the Acoustical Society of America, 89(3), Mar. 1991, pp. 1028-1036.
Davy, B. A., "Acoustic Self-demodulation of Pre-distorted Pulsed Carriers," Masters' Thesis, University of Texas Austin, 1972, title page, pp. i-ix, and 1-57.
Darvennes, C. M., et al., "Scattering of sound by sound from two Gaussian beams," The Journal of the Acoustical Society of America, 87(5), May 1990, pp. 1955-1964.
Druyvesteyn, W. F., et al., "Personal Sound," J. Audio Eng. Soc., vol. 45, No. 9, Sep. 1997, pp. 685-701.
Garrett, G. et al., "Nearfield of a large acoustic transducer, Part II: Parametric radiation," The Journal of the Acoustical Society of America, 74(3), Sep. 1983, pp. 1013-1020.
Garrett, G., et al., "Nearfield of a large acoustic transducer. Part III: General results," The Journal of the Acoustical Society of America, 75(3), Mar. 1984, pp. 769-779.
Gol'dberg, Z.A., "Certain Second-Order Quantities in Acoustics," Sov Phys Acoust, vol. 3, 1957, pp. 157-162.
Greenspan, M., "Piston radiator: Some extensions of the theory," The Journal of the Acoustical Society of America, 65(3), Mar. 1979, pp. 608-621.
Havelock, D. I., "Directional Loudspeakers Using Sound Beams," J. Audio Eng. Soc., vol. 48, No. 10, Oct. 2000, pp. 908-916.
Holosonic Research Labs, Inc. 2002, "Audio Spotlight—Put sound where you want it," www.holosonics.com/technology.html (downloaded Jan. 18, 2004).
Kamakura, T. et al., "Development of Parametric Loudspeaker for Practical Use", Proceedings of the 10th International Symposium on Nonlinear Acoustics, pp. 147-150, 1984.
Kamakura, T. et al., "Suitable Modulation of the Carrier Ultrasound for a Parametric Loudspeaker," Acustica, vol. 73 (1991), pp. 215-217.
Kamakura, T. et al., "Harmonic generation in finite amplitude sound beams from a rectangular aperture source," The Journal of the Acoustical Society of America, 91(6), Jun. 1992, pp. 3144-3151.
Kamakura, T. et al., "Nonlinearly generated spectral components in the nearfield of a directive sound source," The Journal of the Acoustical Society of America, 85(6), Jun. 1989, pp. 2331-2337.
Kim, W. et al., "Audio Application of the Parametric Array—Implementation through a Numerical Model," presented at the 113th Convention of the Audio Engineering Society (AES), paper 5652, Oct. 2002, pp. 1-16.
Kim, Y.W. et al., "Novel Preprocessing Technique to Improve Harmonic Distortion in Airborne Parametric Array," ICSP '02 Proceedings, IEEE 2002, pp. 1815-1818.
Kite, T.D., et al., "Parametric Array in Air: Distortion Reduction by Preprocessing," Proceedings of the 16th International Congress on Acoustics and the 135th Meeting of the Acoustical Society of America, Seattle, WA, Jun. 1998, pp. 1091-1092.
Kuznetsov, V. P., "Equations of Nonlinear Acoustics," Soviet Physics-Acoustics, vol. 16, No. 4, Apr.-Jun. 1971, pp. 467-470.
Lawton, B. W., "Damage to human hearing by airborne sound of a very high frequency or ultrasonic frequency," Institute of Sound and Vibration Research, Contract Research Report 343/2001, 2001, pp. 1-77.
Lucas, B. G., et al., "Field of a parametric focusing source," The Journal of the Acoustical Society of America, 73 (6), Jun. 1983, pp. 1966-1971.
Lucas, B. G., et al., "The field of a focusing source, "The Journal of the Acoustical Society of America, 72(4), Oct. 1982, pp. 1289-1296.
Maney, K., "Sound technology turns the way you hear on its ear," USA Today, May 2003, pp. 1-4.
Marculescu, D. et al., "Ready to Ware," IEEE Spectrum, Oct. 2003, pp. 28-32.
Meyer, J., "Microphone Array for Hearing Aids taking into Account the Scattering of the Head," 2001 IEEE Workshop on Applications of Signal Processing to Audio and Acoustics, Oct. 21-24, 2001, pp. 27-30.
Muir, T.G., et al., "Parametric Acoustic Transmitting Arrays," The Journal of the Acoustical Society of America, vol. 52, No. 5, Part 2, 1972, pp. 1481-1486.

(56) References Cited

OTHER PUBLICATIONS

Nextel Communications, i60c Phone User's Guide, 2002, pp. 6, 65, 66, 135-137.
Nextel i60c Phone Details, http://nextelonline.nextel.com, downloaded Apr. 22, 2003, pp. 1-2.
Nextel-Direct Connect, http://nextelonline.nextel.com/services/directconnect-popup.html, downloaded Apr. 22, 2003, p. 1.
Palm™ m515 Handheld, Palm Store of Yahoo! Shopping, downloaded Apr. 23, 2003, pp. 1-2.
Palm™ PalmModem® Connectivity Kit, Palm Store of Yahoo! Shopping, downloaded Apr. 23, 2003, pp. 1-2.
Palm™ Tungsten™ C Handheld, Palm Store of Yahoo! Shopping, downloaded Apr. 23, 2003, pp. 1-3.
Palm™ Zire™ 71 Handheld, Palm Store of Yahoo! Shopping, downloaded Apr. 23, 2003, pp. 1-3.
Pompei, F. J., "The Use of Airborne Ultrasonics for Generating Audible Sound Beams," J. Audio Eng. Soc., vol. 47, No. 9, Sep. 1999, pp. 726-731.
"The Cookie-Size Concert Hall," Business Week, Dec. 2, 1996, 5 pages.
Tjotta, J. N. et al., "Propagation and interaction of two collinear finite amplitude sound beams," The Journal of the Acoustical Society of America, 88(6), Dec. 1990, pp. 2859-2870.
Vyas, A. L., et al., "Design Considerations of Parametric Arrays," IEEE Proceedings of the 1998 International Symposium on Underwater Technology, Apr. 15-17, 1998, pp. 98-102.
Westervelt, P.J., "Parametric Acoustic Array," The Journal of the Acoustical Society of America, vol. 35, No. 4, Apr. 1963, pp. 535-537.
Yoneyama, M., et al., "The audio spotlight: An application of nonlinear interaction of sound waves to a new type of loudspeaker design," The Journal of the Acoustical Society of America, 73(5), May 1983, pp. 1532-1536.
Zabolotskaya, E. A., et al., "Quasi-plane Waves in the Nonlinear Acoustics of Confined Beams," Soviet Physics-Acoustics, vol. 15, No. 1, Jul.-Sep. 1969, pp. 35-40.
Zemanek, J. "Beam Behavior within the Nearfield of a Vibrating Piston," The Journal of the Acoustical Society of America, vol. 42, No. 1 (Part 2), 1971, pp. 181-191.
Notice of Allowance for U.S. Appl. No. 17/574,698, dated Mar. 20, 2023.
Office Action for U.S. Appl. No. 18/135,514, dated Jun. 8, 2023.
Bing et al. "A Cellphone for All Standards," IEEE Spectrum, May 2002, pp. 34-39.
Schneiderman, Ron. "Bluetooth's Slow Dawn," IEEE Spetrum, Nov. 2000, pp. 61-65.
Tomasi, W. "Introduction to Electronic Communications." in *Electronic communications systems: fundamentals through advanced*, $4^{th}$ ed., 1-50, Prentice Hall, 2001.

* cited by examiner

HEARING ENHANCEMENT METHODS AND SYSTEMS

This application is a continuation of U.S. patent application Ser. No. 17/899,591, filed on Aug. 30, 2022, now U.S. Pat. No. 11,657,827, and entitled "HEARING ENHANCEMENT METHODS AND SYSTEMS," which is hereby incorporated herein by reference, and which application is a continuation of U.S. patent application Ser. No. 17/333,688, filed on May 28, 2021, now U.S. Pat. No. 11,488,618, and entitled "HEARING ENHANCEMENT METHODS AND SYSTEMS," which is hereby incorporated herein by reference, and which application is a continuation of U.S. patent application Ser. No. 17/155,767, filed on Jan. 22, 2021, now U.S. Pat. No. 11,257,508, and entitled "METHOD AND APPARATUS FOR DIRECTIONAL SOUND APPLICABLE TO VEHICLES," which is hereby incorporated herein by reference, and which application is a continuation of U.S. patent application Ser. No. 16/703,788, filed on Dec. 4, 2019, now U.S. Pat. No. 10,937,439, and entitled "METHOD AND APPARATUS FOR DIRECTIONAL SOUND APPLICABLE TO VEHICLES," which is hereby incorporated herein by reference, and which application is a continuation of U.S. patent application Ser. No. 15/667,742, filed on Aug. 3, 2017, now U.S. Pat. No. 10,522,165, and entitled "METHOD AND APPARATUS FOR ULTRASONIC DIRECTIONAL SOUND APPLICABLE TO VEHICLES," which is hereby incorporated herein by reference, and which application is a continuation of U.S. patent application Ser. No. 14/482,049, filed on Sep. 10, 2014, now U.S. Pat. No. 9,741,359, and entitled "HYBRID AUDIO DELIVERY SYSTEM AND METHOD THEREFOR," which is hereby incorporated herein by reference, which application is a continuation of U.S. patent application Ser. No. 12/930,344, filed on Jan. 4, 2011, now U.S. Pat. No. 8,849,185, and entitled "HYBRID AUDIO DELIVERY SYSTEM AND METHODS THEREFOR," which is hereby incorporated herein by reference, which application claims priority of U.S. Provisional Patent Application No. 61/335,361 filed Jan. 5, 2010, and entitled "HYBRID AUDIO DELIVERY SYSTEM AND METHOD THEREFOR," which is hereby incorporated herein by reference, U.S. patent application Ser. No. 12/930,344, filed on Jan. 4, 2011, and entitled "HYBRID AUDIO DELIVERY SYSTEM AND METHOD THEREFOR," is also a continuation in part of U.S. patent application Ser. No. 12/462,601, filed Aug. 6, 2009, now U.S. Pat. No. 8,208,970, and entitled "DIRECTIONAL COMMUNICATION SYSTEMS," which is hereby incorporated herein by reference, which application is a continuation of U.S. patent application Ser. No. 11/893,835, filed Aug. 16, 2007, now U.S. Pat. No. 7,587,227, and entitled "DIRECTIONAL WIRELESS COMMUNICATION SYSTEMS," which is hereby incorporated herein by reference, which application is a continuation of U.S. patent application Ser. No. 10/826,529, filed Apr. 15, 2004, now U.S. Pat. No. 7,269,452, and entitled "DIRECTIONAL WIRELESS COMMUNICATION SYSTEMS," which is hereby incorporated herein by reference, and claims priority of: (i) U.S. Provisional Patent Application No. 60/462,570, filed Apr. 15, 2003, and entitled "WIRELESS COMMUNICATION SYSTEMS OR DEVICES, HEARING ENHANCEMENT SYSTEMS OR DEVICES, AND METHODS THEREFOR," which is hereby incorporated herein by reference; (ii) U.S. Provisional Patent Application No. 60/469,221, filed May 12, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, PERSONALIZED AUDIO SYSTEMS OR DEVICES, AND METHODS THEREFOR," which is hereby incorporated herein by reference; and (iii) U.S. Provisional Patent Application No. 60/493,441, filed Aug. 8, 2003, and entitled "WIRELESS COMMUNICATION SYSTEMS OR DEVICES, HEARING ENHANCEMENT SYSTEMS OR DEVICES, DIRECTIONAL SPEAKER FOR ELECTRONIC DEVICE, AUDIO SYSTEMS OR DEVICES, WIRELESS AUDIO DELIVERY, AND METHODS THEREFOR," which is hereby incorporated herein by reference.

This application is also related to: (i) U.S. patent application Ser. No. 10/826,527, filed Apr. 15, 2004, now U.S. Pat. No. 7,388,962, entitled, "DIRECTIONAL HEARING ENHANCEMENT SYSTEMS," which is hereby incorporated herein by reference; (ii) U.S. patent application Ser. No. 10/826,531, filed Apr. 15, 2004, now U.S. Pat. No. 7,801,570, and entitled, "DIRECTIONAL SPEAKER FOR PORTABLE ELECTRONIC DEVICE," which is hereby incorporated herein by reference; (iii) U.S. patent application Ser. No. 10/826,537 filed Apr. 15, 2004, and entitled, "METHOD AND APPARATUS FOR LOCALIZED DELIVERY OF AUDIO SOUND FOR ENHANCED PRIVACY," which is hereby incorporated herein by reference; and (iv) U.S. patent application Ser. No. 10/826,528, filed Apr. 15, 2004, and entitled, "METHOD AND APPARATUS FOR WIRELESS AUDIO DELIVERY," which is hereby incorporated herein by reference.

BACKGROUND OF THE INVENTION

Description of the Related Art

A significant portion of our population has a certain degree of hearing loss. This can be due to, for example, heredity, noise exposure or simply aging. Hearing aids have been the traditional approach to ameliorate hearing difficulties. However, out of the 26 to 28 million people who are hearing impaired in the United States, only about 20% of them actually wear any hearing aids.

One reason people avoid wearing hearing aids is because hearing aids are not inexpensive. Typically, they range from about a thousand US dollars for a pair of analog hearing aids to five thousand US dollars for a pair of digital hearing aids.

Another reason for the lack of wide adoption of hearing aids is that there is still a stigma towards wearing them. People who need hearing aids are known as "hearing impaired." When they go to a dispenser for hearing aids, they are still called "patients." If given a choice, most people do not want others to know that they need hearing aids. As a result, many people with mild or moderate hearing loss do not wear one.

Basically, there are three major types of hearing aids—the "behind-the-ear" (BTE) style, the "in-the-ear" (ITE) style, and the completely-in-the-canal (CIC) style. The BTE hearing aids have a number of advantages. They are more applicable for those with severe hearing loss. Through the use of venting, they reduce to a certain degree the effects of occlusion, which is the hollowness, echoic or stuffed sensation of hearing one's own voice as one talks with a hearing aid inside one's ear. The BTE aids are encapsulated in relatively thick-walled housings. The housing serves to protect components in the hearing aids from harsh conditions due to temperature, sweat, pressure and impact. However, for those wearing hearing aids, they usually prefer a more inconspicuous type, such as an ITE (or CIC) hearing aid, which is located inside the ear canal.

The ITE (or CIC) designs have other benefits. People who use a telephone typically prefer them because they do not require a telephone loop to work with telephone conversations. People who wear glasses usually also prefer them because the hearing aids do not interfere with the arms of the glasses.

On the other hand, just like the BTE, individual ear molds have to be made for the ITE and the CIC hearing aids. The shell of the ITE hearing aid has to be individually configured based on an impression of the patient's canal. Not only is the hearing aid individually formed, a technician, through experience and craftsmanship, has to custom fit the hearing aid into the patient's canal. For a BTE hearing aid, an ear mold that fits the individual's ear canal is also made. This makes the hearing aid a custom product. If a hearing aid is lost or damaged, it is not as easily replaced.

The repair process can be annoying as well. If a user's hearing aid has to be repaired, the process can take a significant amount of time. Except for well-known brands or for manufacturers that offer a worldwide service, repair parts may not be immediately available. Since most hearing aids are still dispensed through local or regional clinics, they may not have the available parts. Though there is usually a loaner's program that allows the user to borrow a BTE aid during this period, the user may have to live, for days or weeks, with a hearing aid that may not feel comfortable.

Another challenge of an ITE (or CIC) hearing aid is in positioning its receiver and microphone because slight misalignment can lead to feedback and resonance.

Users want the ITE (or CIC) hearing aids to be small to make them inconspicuous. However, the inherent small size of the hearing aids brings along its problems. Due to the small size, the walls of its shell are thinner, making them more vulnerable to damage from heat, sweat and abuse than BTE hearing aids. Further, due to its small size and shape, ITE (or CIC) hearing aids are more difficult to handle. For example, sometimes it is cumbersome to switch batteries. And, it is also easier to accidentally drop an ITE (or CIC) aid than a BTE hearing aid. Finally, an ITE (or CIC) hearing aid custom-fits into the user's ear canal. The occlusion effects can be quite disturbing, particularly for the first time hearing aid users.

Hearing tends to decrease gradually. A person with mildly-decreased hearing normally does not need the same degree of hearing assistance as would one with severely-impaired hearing. Nevertheless, such a person could benefit from mild or moderate enhancement to their hearing.

It should be clear from the foregoing that there is still a need for improved techniques to assist those who are hearing impaired.

Also, cell phones and other wireless communication systems have become an integral part of our lives. During the early 20th Century, some predicted that if phone companies continued with their growth rate, everyone would become a phone operator. From a certain perspective, this prediction has actually come true. Cell phones have become so prevalent that many of us practically cannot live without them. As such, we might have become cell phone operators.

However, the proliferation of cell phones has brought on its share of headaches. The number of traffic accidents has increased due to the use of cell phones while driving. The increase is probably due to drivers taking their hands off the steering wheel to engage in phone calls. Instead of holding onto the steering wheel with both hands, one of the driver's hands may be holding a cell phone. Or, even worse, one hand may be holding a phone and the other dialing it. The steering wheel is left either unattended, or, at best, maneuvered by the driver's thighs!

Another disadvantage of cell phones is that they might cause brain tumors. With a cell phone being used so close to one's brain, there are rumors that the chance of getting a brain tumor is increased. One way to reduce the potential risk is to use an earpiece or headset connected to the cell phone.

Earpieces and headsets, however, can be quite inconvenient. Imagine your cell phone rings. You pick up the call but then you have to tell the caller to hold while you unwrap and extend the headset wires, plug the headset to the cell phone, and then put on the headset. This process is inconvenient to both the caller, who has to wait, and to you, as you fumble around to coordinate the use of the headset. Also, many headsets require earpieces. Having something plugged into one's ear is not natural and is annoying to many, especially for long phone calls. Further, if you are jogging or involved in a physical activity, the headset can get dislodged or detached.

It also should be apparent from the foregoing that there is still a need for improved ways to enable wireless communication systems to be used hands-free.

SUMMARY OF THE INVENTION

In one embodiment, the present invention pertains to a hearing enhancement system that enhances an individual's hearing based on a directional speaker. Many people are mildly or moderately hearing impaired. The decrease in hearing ability may not be to the point where one needs a dedicated, traditional hearing aid. Even so, it would certainly be advantageous to provide some hearing improvement. A number of embodiments in the present invention are particularly suitable for those with mild or moderate hearing loss.

One embodiment of the hearing enhancement system includes an interface unit that has the directional speaker and a microphone. In another embodiment, the system also includes a base unit. A user can wear the system on his clothing, and the speaker can be directed towards an ear of the user when worn.

In one embodiment, the microphone receives audio signals, which are transformed by the system into ultrasonic signals. Then, the directional speaker transmits the ultrasonic signals in air towards an ear of the user. The transmitted signals are transformed back into audio signals by air to form the output audio signals. At least a portion of the output audio signals have higher power with respect to the received audio signals at corresponding frequencies to enhance the hearing of the user.

The directivity of the audio signals is increased due to the ultrasonic signals. In one embodiment, the directivity is further increased by using a phase array of speaker devices. The array can generate the directional audio signals by constructive interference of signals from the individual devices. Based on the array, the direction of the audio signals can be steered by changing the relative phases among the devices.

Typically, the hearing of both ears decreases together. Hence, a user might use two interface units, one for the left and the other for the right ear.

The decrease in hearing may not be uniform across all audio frequencies. As a result, amplifying the received audio signals can be frequency dependent. One approach focuses on amplifying high audio frequencies. Another approach amplifies only a certain band of the audio frequencies. With the lower audio frequencies typically being louder, the band of amplification can be the higher audio frequencies. Since the directional speaker is not attached to or inserted in the ear, the user can still hear the audio signals directly from the audio source. Not only would such an approach eliminate the occlusion effect, with no hearing aid in the ear canal, the natural resonance of the ear canal (typically around 2700 Hz) boosts the audio signal strength in the 2 to 3 kHz ranges. Furthermore, without the hearing aid in the ear canal, there is no insertion loss due to the hearing aid.

In a third approach, the user's hearing is profiled so that frequency amplification is tailored to the user. The user's hearing profile can also be stored in a memory device (such as a removable memory card or stick), which can be inserted into the system. The system can then adjust the amplification of the audio signals across the frequencies based on the user's hearing profile. Frequency-dependent amplification has the added advantage of power conservation because certain audio frequencies may not even need amplification.

A number of embodiments include power management features. One embodiment includes a manual on/off switch allowing the user to turn the system off when desired. In another approach, the system is on-demand. If the signal-to-noise ratio of the incoming audio signals is below a pre-set threshold, the system can be placed in a standby mode (e.g., low power mode).

Another approach that can manage power is to use a directional microphone. This approach can also improve the signal-to-noise ratio. There can be more than one directional microphone, each pointing at a specific direction.

The power level of the output audio signals can also be environment dependent. For example, the power of the output audio signals is increased in a noisier environment. But, as the environment becomes very noisy, the amplification can cease or even be decreased.

The power of the output audio signals can be also increased through different mechanisms. This can be done, for example, by increasing the surface areas of the medium responsible for generating the output audio signals. In embodiments based on ultrasonic transformation, one approach to increase power is to increase the demodulation efficiency. In yet another embodiment, power is increased based on a phase-array of speaker devices, which further increases the directivity of the audio signals. This embodiment has the added advantage of power reduction. With the audio signals more confined, less power is needed to generate the audio signals. In one embodiment, the output audio signals can also be steered to more accurately target the user's ear.

With the ear canal remaining open, the user can still use a phone directly. But, in one embodiment, when there is an incoming phone call, the system changes its mode of operation and functions as a cell phone. If the system is used as a phone, since the audio signals are transmitted in an open environment, people next to the user might pick up the audio signals. Different approaches can be used to improve privacy. The audio signal propagation angle already serves to provide improved privacy. The virtual or physical cone of the audio signals typically propagates from a lower position (elevation) to a higher position towards the ear of the user. With such a propagation direction, signals reflected from the head tend to radiate upward. This reduces the chance of having bystanders eavesdrop on the conversation.

Privacy can be enhanced based on frequency-dependent amplification because certain frequency ranges may not even be amplified. Another approach to improve privacy is to reduce the power of the output audio signals. Yet another approach to enhance privacy is to further increase the directivity of the audio signals.

With the system being used as a phone, the system can have a directional microphone pointing at the head of the user to pick up the user's voice during a phone conversation.

In private, hearing impaired people sometimes might have a tendency to increase the sound level of audio or video instruments a bit too high. On the other hand, in public, hearing impaired people sometimes might have difficulty hearing. In one embodiment, the system is further designed to pick up, capture or access audio signals from a number of portable or non-portable instruments. Audio signals from these instruments can be transmitted through wire to the system. Alternatively, audio signals from these instruments can be transmitted wireless, such as through WiFi or Bluetooth, to the system. The system then converts the wireless signals to audio signals for the user to comfortably listen to the signals. Examples of such instruments include home entertainment units, phones, microphones at a conference, and speakers at a movie theaters.

Also, a number of embodiments of the present invention provide a wireless communication system that has a directional speaker. In one embodiment, with the speaker appropriately attached or integral to a user's clothing, the user can receive audio signals from the speaker hands-free. The audio-signals from the speaker are directional, allowing the user to hear the audio signals without requiring an earpiece, while providing certain degree of privacy protection.

The wireless communication system can be a phone. In one embodiment, the system has a base unit coupled to an interface unit. The interface unit includes a directional speaker and a microphone. Audio signals are generated by transforming directional ultrasonic signals (output by the directional speaker) with air. In one embodiment, the interface unit can be attached to the shoulder of the user, and the audio signals from the speaker can be directed towards one of the user's ears.

The interface unit can be coupled to the base unit through a wired or wireless connection. The base unit can also be attached to the clothing of the user.

The phone, particularly a cell phone, can be a dual-mode phone. One mode is the hands-free mode phone. The other mode is the normal mode, where the audio signals are generated directly from the speaker.

The interface unit can include two speakers, each located on, or proximate to, a different shoulder of the user. The microphone can also be separate from, and not integrated to, the speaker.

In one embodiment, the speaker can be made of one or more devices that can be piezoelectric thin-film devices, bimorph devices or magnetic transducers. Multiple devices can be arranged to form a blazed grating, with the orthogonal direction of the grating pointed towards the ear. Multiple devices can also be used to form a phase array, which can generate an audio beam that has higher directivity and is steerable.

In another embodiment, the wireless communication system can be used as a hearing aid. The system can also be both a cell phone and a hearing aid, depending on whether there is an incoming call.

In still another embodiment, the interface unit does not have a microphone, and the wireless communication system can be used as an audio unit, such as a CD player. The interface unit can also be applicable for playing video games, watching television or listening to a stereo system.

Due to the directional audio signals, the chance of disturbing people in the immediate neighborhood is significantly reduced.

In yet another embodiment, the interface unit is integrated with the base unit. The resulting wireless communication system can be attached to the clothing of the user, with its audio signals directed towards one ear of the user.

In another embodiment, the base unit includes the capability to serve as a computation system, such as a personal digital assistant (PDA) or a portable computer. This allows the user to simultaneously use the computation system (e.g. PDA) as well as making phone calls. The user does not have to use his hand to hold a phone, thus freeing both hands to interact with the computation system. In another approach for this embodiment, the directional speaker is not attached to the clothing of the user, but is integrated to the base unit. The base unit can also be enabled to be connected wirelessly to a local area network, such as to a WiFi or WLAN network, which allows high-speed data as well as voice communication with the network.

In still another embodiment, the wireless communication system is personalized to the hearing characteristics of the user, or is personalized to the ambient noise level in the vicinity of the user.

In one embodiment, a first portion of audio input signals can be pre-processed, with the output used to modulate ultrasonic carrier signals, thereby producing modulated ultrasonic signals. The modulated ultrasonic signals can be transformed into a first portion of audio output signals, which is directional. Based on a second portion of the audio input signals, a standard audio speaker can output a second portion of the audio output signals. Another embodiment further produces distortion compensated signals based on the pre-processed signals. The distortion compensated signals can be subtracted from the second portion of the audio input signals to generate inputs for the standard audio speaker to output the second portion of the audio output signals.

One embodiment includes a speaker arrangement for an audio output apparatus including a filter, a pre-processor, a modulator, an ultrasonic speaker (generating audio signals with the need for non-linear transformation of ultrasonic signals) and a standard speaker (generating audio signals without the need for non-linear transformation of ultrasonic signals). The filter can be configured to separate audio input signals into low frequency signals and high frequency signals. The pre-processor can be operatively connected to receive the high frequency signals from the filter and to perform predetermined preprocessing on the high frequency signals to produce pre-processed signals. The modulator can be operatively connected to the pre-processor to modulate ultrasonic carrier signals by the pre-processed signals thereby producing modulated ultrasonic signals. The ultrasonic speaker can be operatively connected to the modulator to receive the modulated ultrasonic signals and to output ultrasonic output signals which are transformed into high frequency audio output signals. The standard audio speaker can be operatively connected to the filter to receive the low frequency signals and to output low frequency audio output signals. In one embodiment, the speaker arrangement further includes a distortion compensation unit and a combiner. The distortion compensation unit can be operatively connected to the pre-processor to produce distortion compensated signals. The combiner can be operatively connected to the filter to subtract the distortion compensated signals from the low frequency signals to produce inputs for the standard speaker. Another embodiment does not include the filter. Yet another embodiment, noise can be added to the pre-processed signals.

Other aspects and advantages of the present invention will become apparent from the following detailed description, which, when taken in conjunction with the accompanying drawings, illustrates by way of example the principles of the invention.

Same numerals in FIGS. 1-34 are assigned to similar elements in all the figures. Embodiments of the invention are discussed below with reference to FIGS. 1-34. However, those skilled in the art will readily appreciate that the detailed description given herein with respect to these figures is for explanatory purposes as the invention extends beyond these limited embodiments.

DETAILED DESCRIPTION OF THE INVENTION

A number of embodiments in the present invention are particularly suitable for those with mild or moderate hearing loss.

Figure 1:
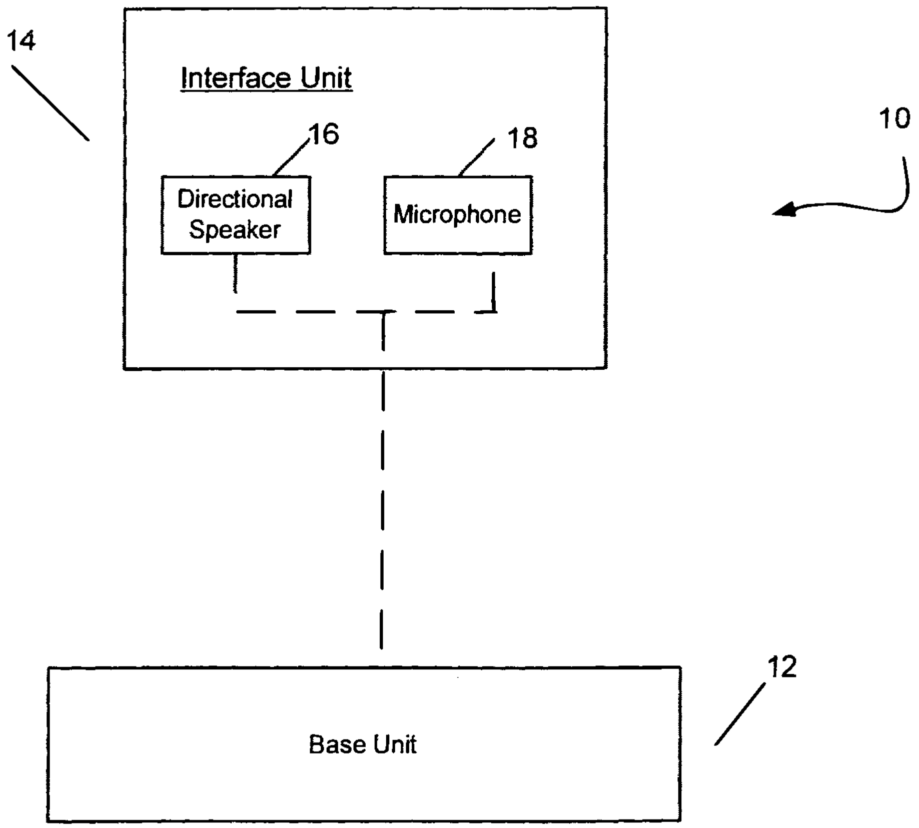
FIG. 1 shows embodiments of the present invention.

FIG. 1 shows one embodiment of a hearing enhancement system 10 of the present invention. The hearing enhancement system 10 includes an interface unit 14, which includes a directional speaker 16 and a microphone 18. The embodiment may also include a base unit 12, which has or, can couple to, a power source. The interface unit 14 can electrically couple to the base unit 12. In one embodiment, the base unit 12 can be integrated within the interface unit 14. The coupling can be in a wired (e.g., cable) or a wireless (e.g., Bluetooth technologies) manner.

Figure 2:
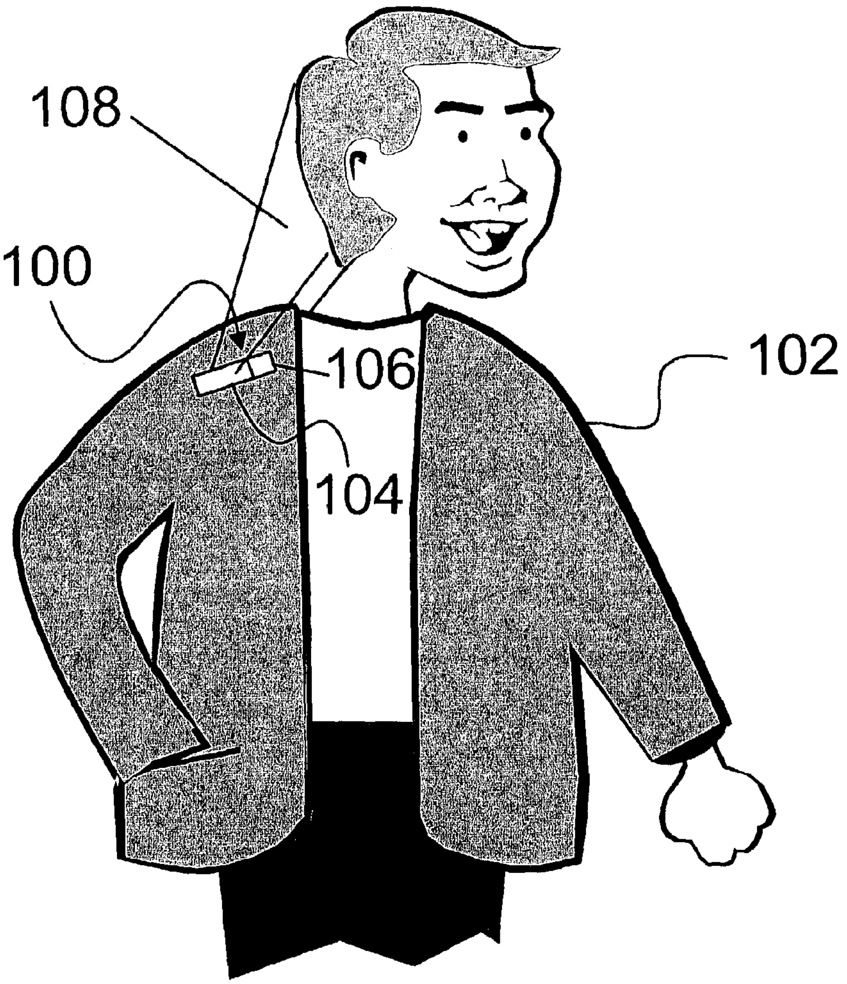
FIG. 2 shows a person wearing one embodiment of the present invention.

FIG. 2 shows a person wearing an interface unit 100 of the present invention on his jacket 102. The interface unit 100 can, for example, be the interface unit 14 shown in FIG. 1. Again, the interface unit 100 includes a directional speaker 104 and a microphone 106. The speaker 104 can be in a line of sight of an ear of the user.

Consider the scenario where a friend is speaking to the user. In one approach, the microphone 106 picks up the friend's speech, namely, her audio signals. A hearing enhancement system according to the invention can then use the audio signals to modulate ultrasound signals. Then, the directional speaker 104 transmits the modulated ultrasonic signals in air towards the ear of the user. The transmitted signals are demodulated in air to create the output audio signals. Based on ultrasound transmission, the speaker 104 generates directional audio signals and sends them as a cone (virtual cone) 108 to the user's ear. In another approach, the directional speaker 104 includes a physical cone or a horn that directly transmits directional audio signals. In yet another approach, the audio signals from the speaker can be steered to the ear or the ear canal, whose location can be identified through mechanisms, such as pattern recognition. Different embodiments of the directional speakers have been described in U.S. patent application Ser. No. 10/826,529, filed Apr. 15, 2004, and entitled "DIRECTIONAL WIRELESS COMMUNICATION SYSTEMS," which is hereby incorporated herein by reference.

Typically, hearing of both ears decreases together. In a sense, this is similar to our need to wear glasses. Rarely would one eye of a person need glasses, while the other eye has 20/20 vision. As a result, there can be two interface units, one for the left ear and another for the right ear. The left ear unit can be on the left shoulder, and the right ear unit can be on the right shoulder. These two interface units can be electrically coupled, or can be coupled to one base unit. Again, the coupling can be wired or wireless. In another approach, the interface unit can be worn by the user as a pendant on a necklace in front of the user. Output audio signals can then be propagated to both ears.

Figure 3:
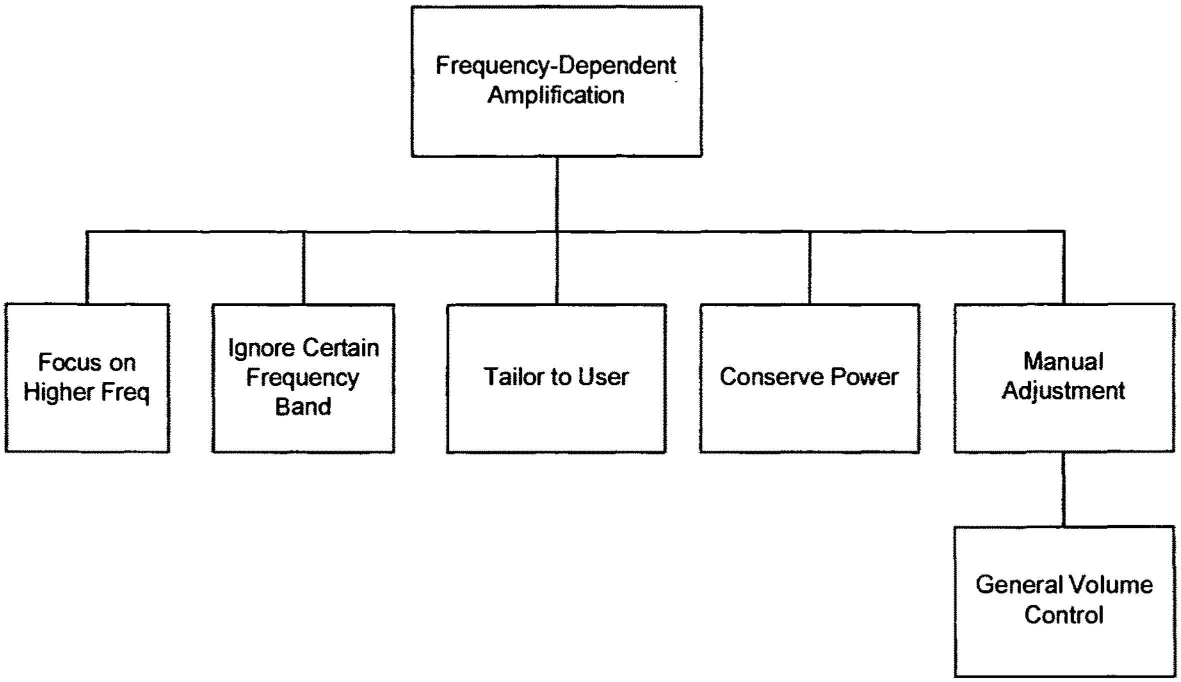
FIG. 3 shows different embodiments regarding frequency-dependent amplification of the present invention.

In one embodiment, the system is designed to operate in the frequency range between 500 Hz to 8 kHz. Typically, a user's hearing impairment is not the same across all audio frequencies. For example, in English, the user might be able to easily pick up the sound of vowels, but not the sound of consonants, such as "S" and "P". FIG. 3 shows different embodiments of the invention regarding frequency-dependent amplification of the received audio signals. Note that amplification is not limited to amplifying the received audio signals directly. For example, in the embodiments using ultrasonic signals to generate output audio signals, amplification can mean the power level of the output audio signals being higher than the received audio signals. This can be through increasing the power of the ultrasonic signals.

One approach for frequency-dependent amplification assumes that the decreased in hearing typically starts at high frequencies, such as above 2 to 3 kHz. So, hearing may need more assistance at the high frequency range. In this approach, one embodiment amplifies the audio signals so that around the entrance of the ear, the signals can have sound pressure level ("SPL") of about 80 dB from 2 kHz to 4 kHz. For frequencies below 2 kHz, the SPL is lower, such as, for frequencies lower than 500 Hz, the maximum SPL can be below 55 dB. In one embodiment, the SPL of the output audio signals can be 70 dB from 1.5 kHz to 4 kHz, and the 3 dB cutoff is also at 1.5 kHz. With a roll off being 12 dB/octave, at 750 Hz, the SPL becomes about 58 dB.

Another frequency-dependent amplification approach assumes that most information in the audio signals resides within a certain frequency band. For example, about 70% of the information in the audio signals can be within the frequency range of 1 to 2 kHz. Since the ear canal remains open and the user may only be mildly or moderately hearing impaired, the user can be hearing the audio signals directly from his sender (i.e., without assistance provided by the hearing enhancement system). In this approach, the system filters audio signals in the identified frequency range, such as the 1 to 2 kHz range, and processes them for amplification and transmission to the user. For frequencies not within the frequency band, they are not processed for amplification. The user can pick them up directly from the sender.

Low to mid frequencies, such as those below 2 kHz, are typically louder. Since the hearing enhancement system does not require having any hearing aid inserted into the ear, the low to mid frequencies can be received at the ear unaltered. Frequencies in the mid to high range, such as from 2000-3000 Hz, will be in the natural resonance of the ear canal, which is typically around 2700 Hz. As a result, these frequencies can be increased by about 15 dB. With no hearing aid inserted into one ear, the audio signals do not experience any insertion loss, and there is also no occlusion effect due to the user's own voice.

In a third approach, amplification across frequencies is directly tailored to the hearing needs of the user. This can be done through calibration. This third approach can also be used in conjunction with either the first approach or the second approach.

Frequency-dependent amplification has the added advantage of power conservation because certain frequency bands may not need or may not have amplification.

In one embodiment, the user has the option of manually changing the amplification of the system. The system can also have a general volume controller that allows the user to adjust the output power of the speaker. This adjustment can also be across certain frequency bands.

Figure 4:
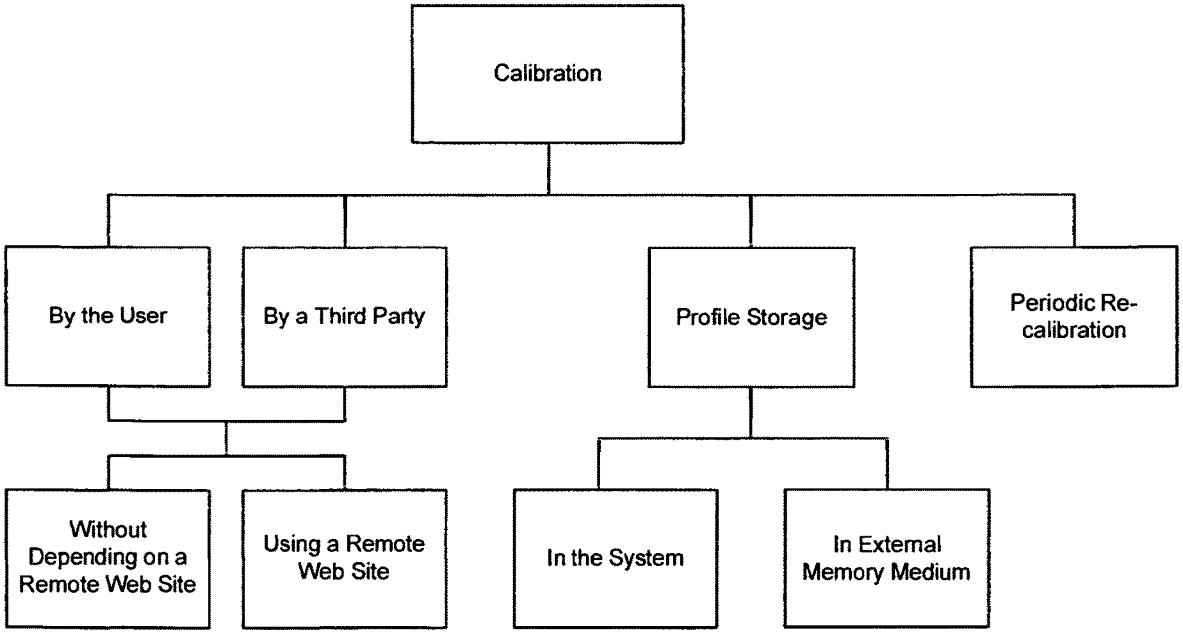
FIG. 4 shows a number of embodiments regarding calibration of the present invention.

FIG. 4 shows a number of embodiments regarding calibration of a user's hearing across various frequencies. Calibration enables the system to determine (e.g., estimate) the hearing sensitivity of the user. Through calibration, the user's hearing profile can be generated. The user can perform calibration by himself. For example, the audio frequencies are separated into different bands. The system generates different SPL at each band to test the user's hearing. The specific power level that the user feels most comfortable would be the power level for that band for the user. After testing is done for all of the bands, based on the power levels for each band, the system creates the user's personal hearing profile. In this calibration process, the system can prompt the user and lead the user through an interactive calibration process.

In another embodiment, calibration can be done remotely through a web site. The web site can guide the user through the calibration process. This can be done, for example, by the user being positioned proximate to a computer terminal that is connected through the Internet to the web site. The terminal has a speaker or headset that produces audio sounds as part of the calibration process.

Instead of the user, this calibration process can also be done by a third party, such as an audiologist.

The user's hearing profile can be stored in the hearing enhancement system. If the calibration is done through a computer terminal, the hearing profile can be downloaded into the hearing enhancement system wirelessly, such as through Bluetooth or infrared technology. The hearing profile can alternatively be stored in a portable media storage device, such as a memory stick. The memory stick could be inserted into the hearing enhancement system, or some other audio generating device, which desires to access the hearing profile and personalizes the system's amplification across frequencies to the user.

The system can also periodically alert the user for re-calibration. The period can be, for example, once a year. The calibration can also be done in stages so that it is less onerous and less obvious that a hearing evaluation is being performed.

Since the ear canal is open, the user can be hearing the audio signals both from the sender and the system. In one embodiment, to prevent echoing effect, signal processing speed of the system cannot be too low. Typically, the user would not be able to distinguish two identical sets of audio signals if the difference in arrival times of the two signals is below a certain delay time, such as 10 milliseconds. In one embodiment, the system's signal processing speed is faster than that the certain delay time. One approach to transform the input audio signals to ultrasonic signals depends on analog signal processing. Another approach to transform the input audio signals to ultrasonic signals depends on digital signal processing.

Figure 5A:
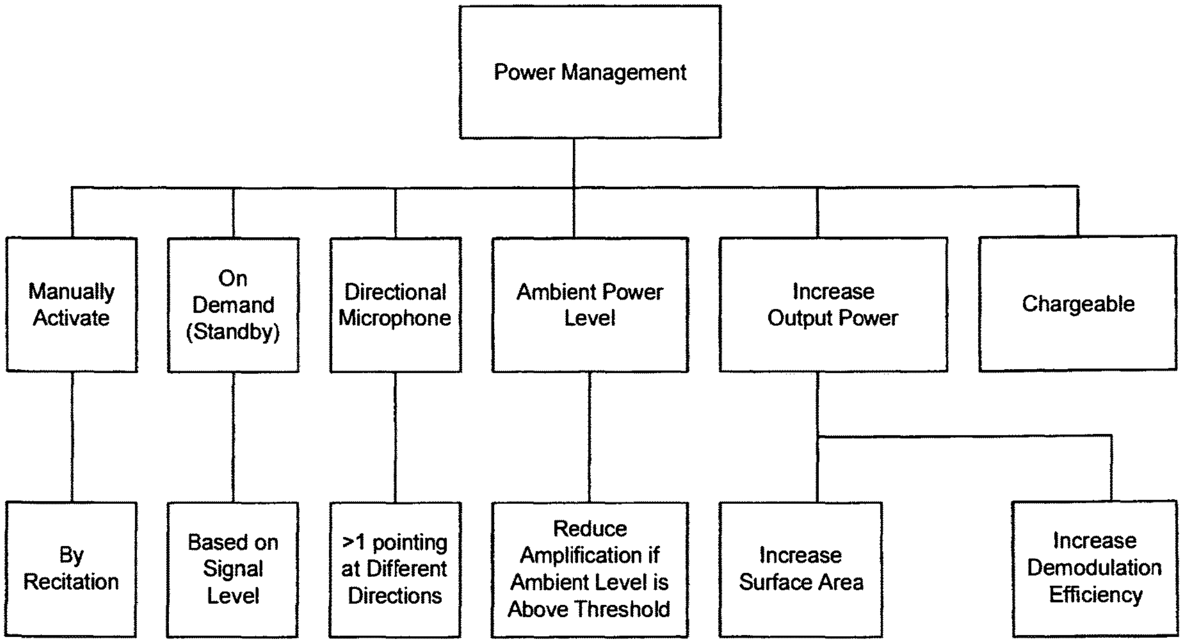
FIG. 5A shows a number of embodiments regarding power management of the present invention.

Since the system might be on continuously for a long duration of time, and can be amplifying across a broad range of the audio frequencies, power consumption can be an issue. FIG. 5A shows a number of embodiments for managing power consumption of the system. One embodiment includes a manual on/off switch, which allows the user to manually turn the system off as he desires. The on/off switch can be on a base unit, an interface unit, or a remote device. This on/off switch can also be voice activated. For example, the system is trained to recognize specific recitation, such as specific sentences or phrases, and/or the user's voice. To illustrate, when the user says sentences like any of the following, the system would be automatically turned on: What did you say? What? Louder. You said what?

The system can be on-demand. In one embodiment, the system can identify noise (e.g., background noise), as opposed to audio signals with information. To illustrate, if the audio signals across broad audio frequency ranges are flat, the system could assume that the input audio signals are noise. In another approach, if the average SPL of the input audio signals is below a certain level, such as 40 dB, the system would assume that there are no audio signals worth amplifying. In any case, when the system recognizes that signals are not to be amplified, the system can then be deactivated, such as to be placed into a sleep mode, a reduced power mode or a standby mode.

With the system operating on-demand, when the sender stops talking for a duration of time, the system can be deactivated. This duration of time can be adjustable, and can be, for example, 10 seconds or 10 minutes. In another approach, only when the signal-to-noise ratio of the audio signals is above a preset threshold would the system be activated (i.e., awakened from the sleep mode, the reduced power mode or the standby mode).

Another approach to manage power consumption can make use of a directional microphone. This approach can improve the signal-to-noise ratio. The gain at specific directions of such a microphone can be 20 dB higher than omni-directional microphones. The direction of the directional microphone can vary with application. However, in one embodiment, the direction of the directional microphone can be pointing forward or outward from the front of the user. The assumption is that the user typically faces the person talking to him, and thus it is the audio signals from the person in front of him that are to be enhanced.

Figure 6A:
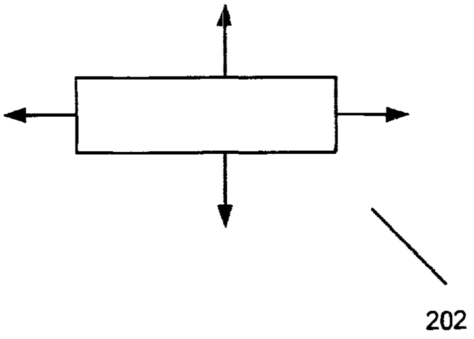
FIGS. 6A-6C show different embodiments regarding microphones for use with the present invention.

The system, namely, the interface unit, can have more than one directional microphone, each pointing in a different direction. FIG. 6A shows an interface unit 202 with four directional microphones pointing in four orthogonal directions. With the microphones in symmetry, the user does not have to think about the orientation of the microphones if the user is attaching the interface unit to a specific location on his clothing.

Figure 6C:
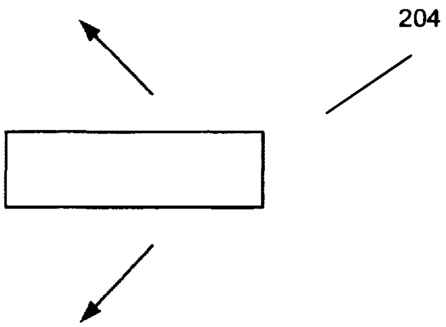
Figure 6B:
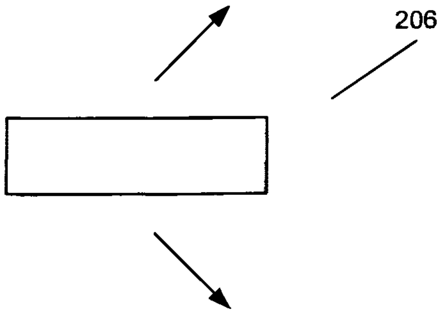

FIGS. 6B-6C show interface units 204 and 206, each with two directional microphones pointing in two orthogonal directions. For the two interface units 204 and 206 shown in FIG. 6B-6C, one unit can be on the left shoulder and the other unit on the right shoulder of the user, with the user's head in between the interface units in FIG. 6B and FIG. 6C.

The amplification of the system can also depend on the ambient power level, or the noise level of the environment of the system. One approach to measure the noise level is to measure the average SPL at gaps of the audio signals. For example, a person asks the user the following question, "Did you leave your heart in San Francisco?" Typically, there are gaps between every two words or between sentences or phrases. The system measures, for example, the root mean square ("rms") value of the power in each of the gaps, and can calculate another average among all of the rms values to determine the noise level. In one embodiment, the system increases the gain of the system so as to ensure that the average power of the output audio signals is higher than the noise level by a certain degree. For example, the average SPL of the output audio signals can be 10 dB above the noise level.

In another embodiment, if the average power level of the environment or the ambient noise level is higher than a threshold value, signal amplification is reduced. This average power level can include the audio signals of the person talking to the user. The rationale is that if the environment is very noisy, it would be difficult for the user to hear the audio signals from the other person anyway. As a result, the system should not keep on amplifying the audio signals independent of the environment. For example, if the average power level of the environment is more than 75 dB, the amplification of the system is reduced, such as to 0 dB.

Another power management approach is to increase the power of the audio signals. One embodiment to create more power is to increase the surface area of the medium responsible for generating the output audio signals. For example, if audio signals are generated by a piezoelectric film, one can increase the surface area of the film to increase the power of the signals.

A number of embodiments are based on ultrasonic demodulation or mixing. To increase the output power of such embodiments, one can again increase the surface area of the medium generating the ultrasonic signals. As an example, a 1-cm diameter bimorph can give 140 dB ultrasonic SPL. The device may need about 0.1 W of input power. Ten such devices would increase output power by about 20 dB.

Another approach to increase power is to increase the demodulation or mixing efficiency of the ultrasonic signals by having at least a portion of the transformation performed in a medium other than air. Depending on the medium, this may make the directional speaker more power efficient. Such approaches have been described in the U.S. patent application Ser. No. 10/826,529, now U.S. Pat. No. 7,269,452, entitled, "DIRECTIONAL WIRELESS COMMUNICATION SYSTEMS," filed Apr. 15, 2004.

The system (interface unit and/or the base unit) can include one or more rechargeable batteries. These batteries can be recharged by coupling the system to a battery charger. Another feature of the system that may be provided is one or more electrical connections on the system so as to facilitate electrical connection with a battery charger. For example, when the power source for the system is a rechargeable battery, the ability to charge the battery without removing the battery from the system is advantageous. Hence, in one embodiment, the system includes at least one connector or conductive element (e.g., terminal, pin, pad, trace, etc.) so that the electrical coupling between the rechargeable battery and the charger can be achieved. In this regard, the electrical connector or conductive element is provided on the system and electrically connected to the battery. The placement of the electrical connector or conductive element on the system serves to allow the system to be simply placed within a charger. Consequently, the electrical connector or conductive element can be in electrical contact with a counterpart or corresponding electrical connector or conductive element of the charger.

Figure 5B:
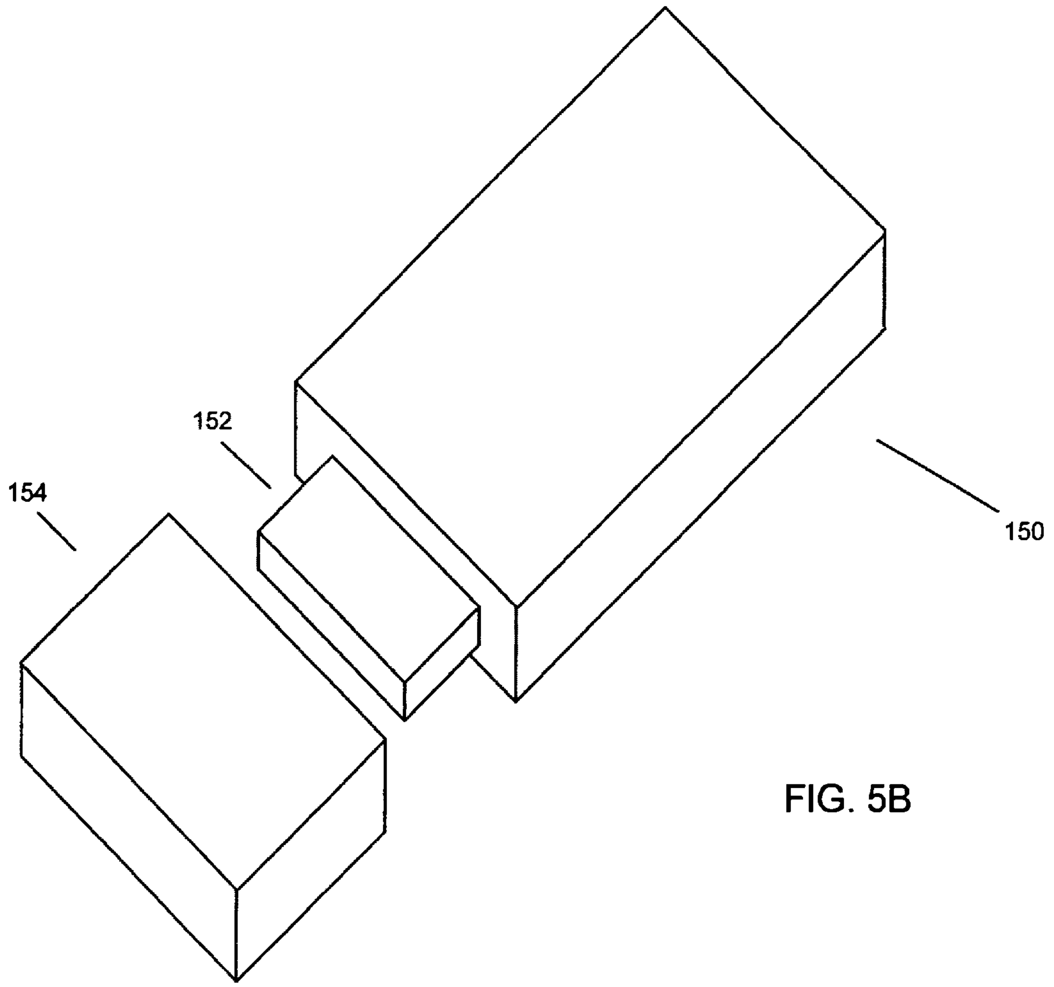
FIG. 5B shows an embodiment of the interface unit with an electrical connection.

FIG. 5B shows an embodiment of the interface unit 150 with an electrical connection 152 and a cover 154. The interface unit 150 can be the interface unit 14 shown in FIG. 1. The electrical connection 152 can be a USB connector. With the cover 154 removed, the connection 152 can be used, for example, to couple to a battery charger to recharge a battery within the interface unit 150.

In one embodiment, the charger can be considered a docking station, upon which the system is docked so that the battery within the system can be charged. Hence, the system can likewise include an electrical connector or conductive element that facilitates electrical connection to the docking station when docked.

Figure 7:
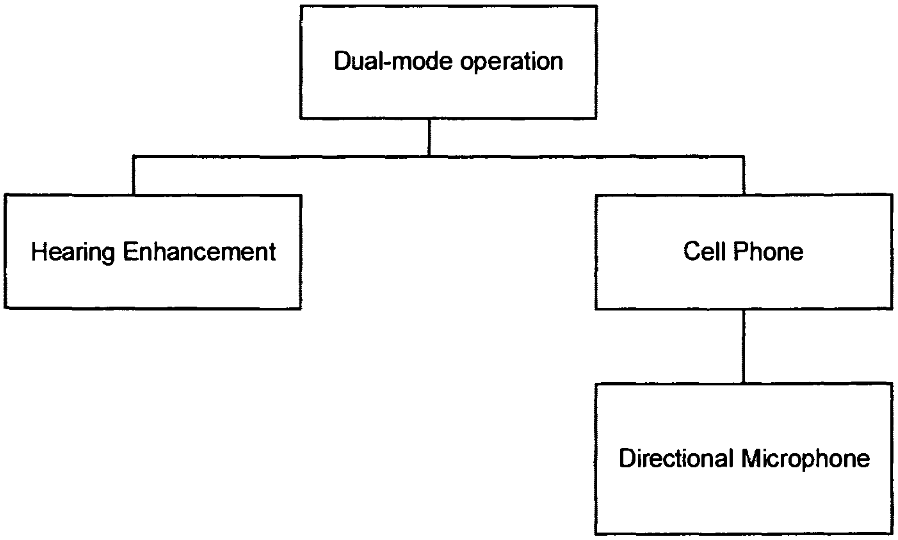
FIG. 7 shows embodiments of the present invention that can also function as a phone.

With the ear canal remaining open, the user can still use a phone directly. However, in one embodiment, the system, which can include the base unit, can also have the electronics to serve as a cell phone. FIG. 7 shows such an embodiment. When there is an incoming phone call, the system can change its mode of operation and function as a cell phone. The system can alert the user of an incoming call. This can be through, for example, ringing, vibration or a blinking light. The user can pick up the call by, for example, pushing a button on the interface unit. Picking up the call can also be through an activation mechanism on the base unit or a remote control device.

Figure 8:
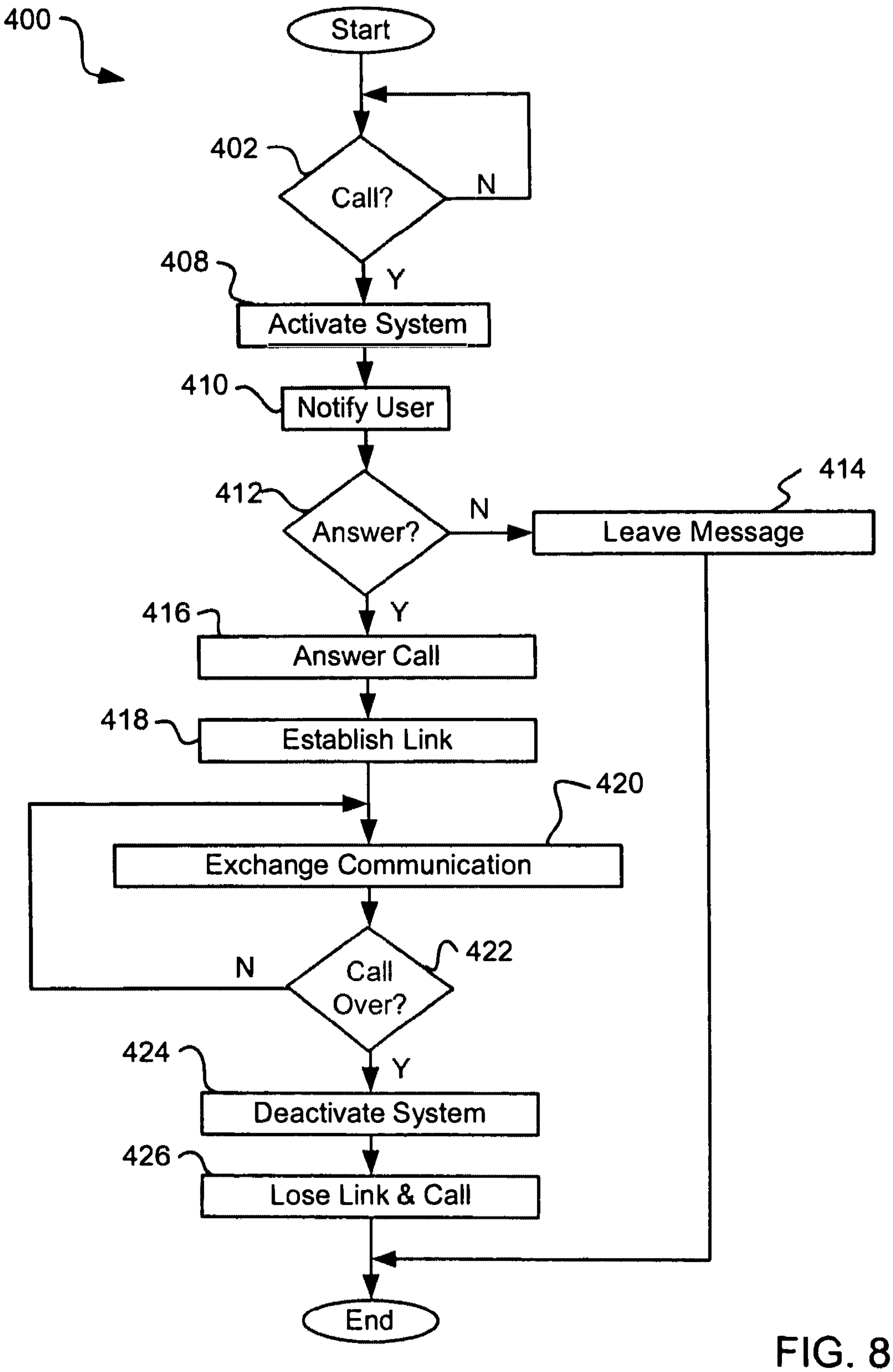
FIG. 8 is a flow diagram of call processing according to one embodiment of the invention.

FIG. 8 is a flow diagram of call processing 400 according to one embodiment of the invention. The call processing 400 is performed using the system. For example, the system can be the system shown in FIG. 1.

The call processing 400 begins with a decision 402 that determines whether a call is incoming. When the decision 402 determines that there is no incoming call, the call processing 400 waits for such a call. Once the decision 402 determines that a call is incoming, the system is activated 408. Here, the wireless communications capability of the system is activated (e.g., powered-up, enabled, or woken-up). The user of the system is then notified 410 of the incoming call. In one embodiment, the notification to the user of the incoming call can be achieved by an audio sound produced by the system (via a speaker). Alternatively, the user of the system could be notified by a vibration of the system, or a visual (e.g., light) indication provided by the system. The base unit could also include a ringer that provides audio sound and/or or vibration indication to signal an incoming call.

Next, a decision 412 determines whether the incoming call has been answered. When the decision 412 determines that the incoming call has not been answered, the base unit can activate 414 a voice message informing the caller to leave a message or instructing the caller as to the unavailability of the recipient.

On the other hand, when the decision 412 determines that the incoming call is to be answered, the call can be answered 416 at the base unit. Then, a wireless link is established 418 between the interface unit and the base unit. The wireless link is, for example, a radio communication link such as utilized with Bluetooth or WiFi networks. Thereafter, communication information associated with the call can be exchanged 420 over the wireless link. Here, the base unit receives the incoming call, and communicates wirelessly with the interface unit such that communication information is provided to the user via the system. The user of the system is accordingly able to communicate with the caller by way of the system and, thus, in a hands-free manner.

A decision 422 then determines whether the call is over (completed). When the decision 422 determines that the call is not over, the call processing 400 returns to repeat the operation 420 and subsequent operations so that the call can continue. On the other hand, when the decision 422 determines that the call is over, then the system is deactivated 424, and the wireless link and the call are ended 426. The deactivation 424 of the system can place the system in a reduced-power mode. For example, the deactivation 424 can power-down, disable, or sleep the wireless communication capabilities (e.g., circuitry) of the system. Following the operation 426, as well as following the operations 406 and 414, the call processing 400 for the particular call ends.

If the system also functions as a phone, the system can have a directional microphone pointing at the head of the user. One such embodiment is shown in FIG. 6A.

Operating the system as a phone can create different concerns as opposed to operating the unit as a hearing enhancement system. Since the audio signals are transmitted in an open environment, people in the user's immediate neighborhood might pick up some of the audio signals. If the SPL is 80 dB when the signals reach the user's head, signals reflected from the head can be 60 dB. Such a level may be heard by people in the immediate vicinity of the user. The user might not want people to pick up what he is hearing. In other words, the user may prefer more privacy.

Figure 9:
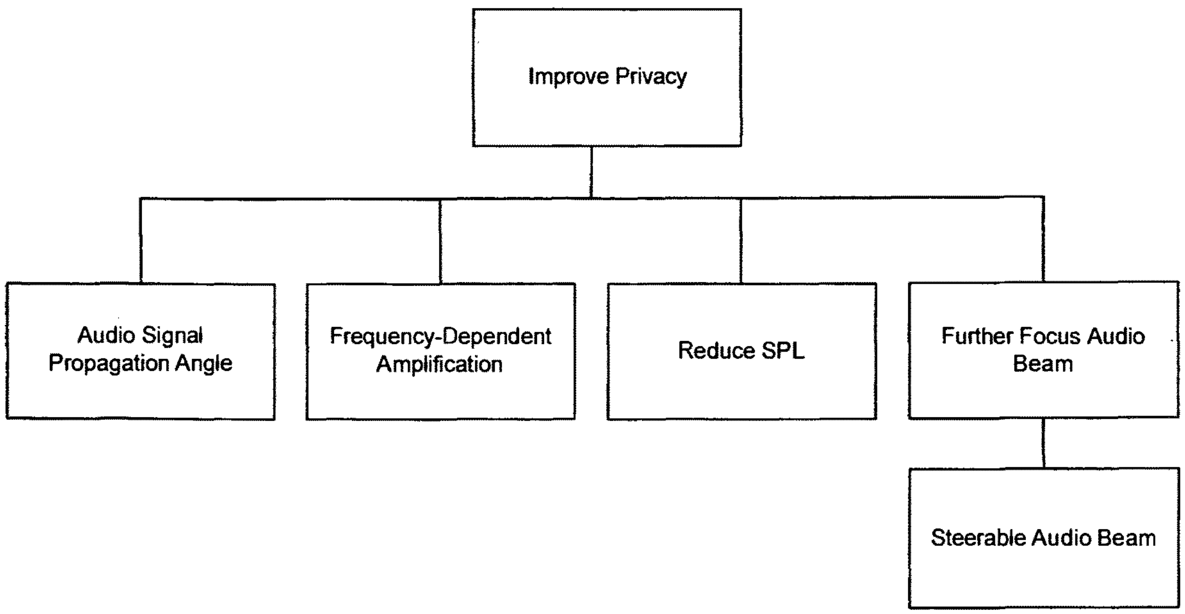
FIG. 9 shows a number of embodiments regarding improving privacy of the present invention.

FIG. 9 shows a number of embodiments regarding improving privacy of the present invention. The audio signal propagation angle can inherently improve privacy. The cone of the audio signals typically propagates from low to high in order to get to an ear of the user. For example, from the user's shoulder to an ear of the user, the elevation angle can be 45 degrees. One advantage of such a propagation direction is that most of the audio signals reflected from the head radiate towards the sky above the head. This reduces the chance of having the audio signals being eavesdropped particularly when the signal power is going down as the square of the propagation distance. Various other propagation directions can be utilized, as discussed in greater detail below.

Privacy can be enhanced based on frequency-dependent amplification. Since certain audio frequencies may not be amplified, and may be relatively low in SPL, their reflected signals can be very low. This reduces the probability of the entire audio signals being heard by others.

Another approach to improve privacy is to reduce the highest power level of the output audio signals to below a certain threshold, such as 70 dB. This level may be sufficient to improve the hearing of those who have mild hearing loss.

Yet another approach to enhance privacy is to further focus the beam of the audio signals. For the embodiment based on transforming ultrasonic frequencies, narrowing the cone can be done, for example, by increasing the carrier frequency of the audio signals. Typically, the higher the carrier frequency, the narrower the cone, such as a cone created by 100 kHz signals typically being narrower than a cone created by 40 kHz signals. Not only can the cone be narrowed, sidelobes can also be suppressed. Another approach to narrow the cone is to increase the gain of the cone or the horn that generates the audio signals.

A focused beam has the added advantage of better power conservation. With the audio signals restricted to a smaller cone, less power is needed to generate the audio signals.

In private, such as at home, hearing impaired people sometimes might have a tendency to increase the sound level of audio or video instruments a bit too high. On the other hand, in public, hearing impaired people sometimes might have difficulty hearing. In one embodiment, the system is further designed to pick up, capture or access audio signals from portable or non-portable instruments, with the interface unit serving as a personalized listening unit.

Audio signals from these instruments can be transmitted through wire to the system. The interface unit can provide an electrical input for connecting to the instrument by wires. If transmission is wireless, the system can be designed to include the electronics to capture wireless signals from the instruments through a wireless local area network, such as WiFi or Bluetooth. The audio signals from these instruments can be up-converted and transmitted as a WiFi signal to be picked up by the system. The system then down-converts the WiFi signal to re-generate the audio signals for the user.

Figure 10:
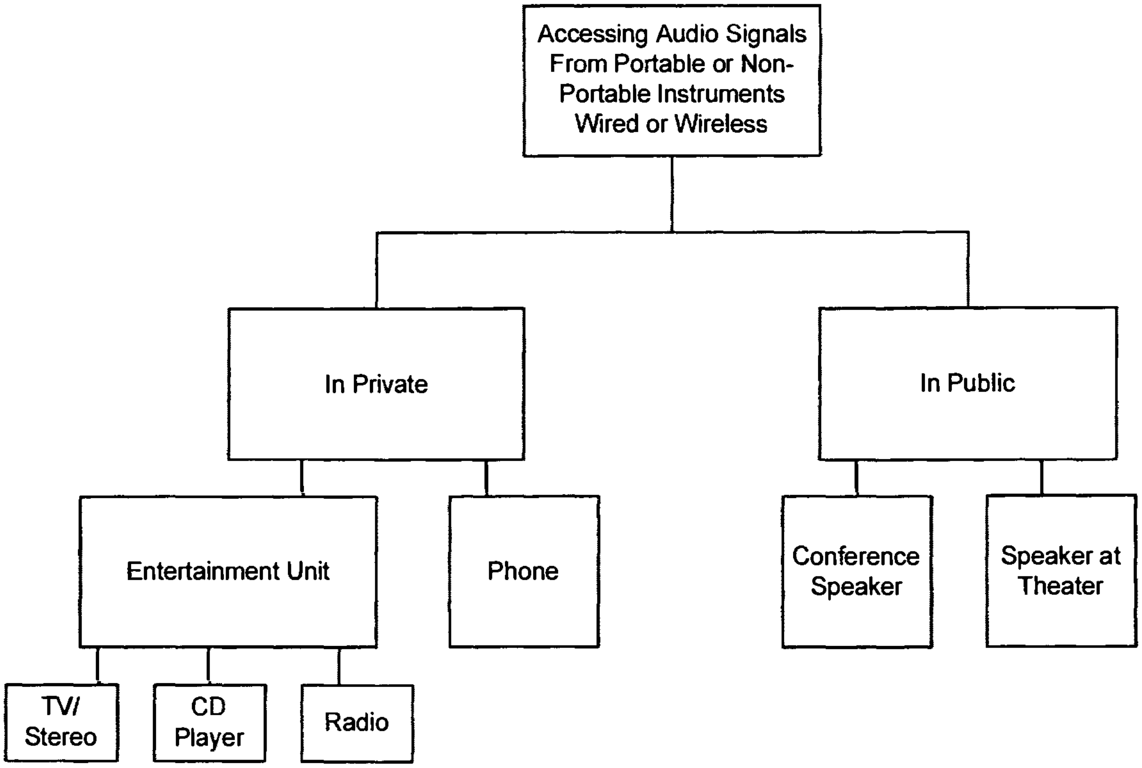
FIG. 10 shows a number of embodiments of the present invention accessing audio signals from other instruments wirelessly or through wired connection.
Figure 11:
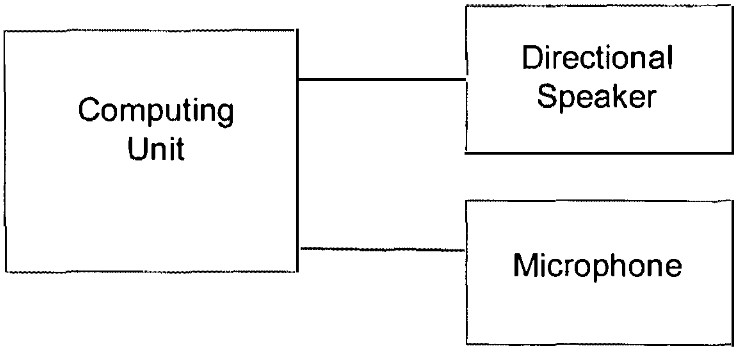
FIG. 11 shows a hearing enhancement system having a computing unit according to one embodiment of the invention.

FIG. 10 shows examples of such other portable or non-portable instruments. The instruments can be used in a private environment, such as at home, or attached to the user. This can include entertainment units, such as televisions, stereo systems, CD players, or radios. As an example, assume the user is working at the backyard and the stereo system is in the living room. Based on this technique, the user can enjoy the music without the need to crank up its volume. Private use can include a phone, which can be a desktop phone with a conference speaker or a cell phone. As yet another example, the system can function as the headset of a phone, and can be coupled to the phone in a wireless manner, such as through WiFi or Bluetooth.

Regarding public use, the user can be at a conference or a theater. The system can be coupled to the conference microphone or the theater speaker wirelessly, and thus be capable of capturing and enhancing the audio signals therefrom.

In a number of embodiments described, the directional speaker generates ultrasonic signals in the range of 40 kHz. One of the reasons to pick such a frequency is for power efficiency. However, to reduce leakage, cross talk or to enhance privacy, in other embodiments, the ultrasonic signals utilized can be between 200 kHz to 1 MHz. It can be generated by multilayer piezoelectric thin films, or other types of solid state devices. Since the carrier frequency is at a higher frequency range than 40 kHz, the absorption/attenuation coefficient by air is considerably higher. On the other hand, privacy is enhanced and audible interference to others is reduced.

A number of embodiments of directional speakers have also been described where the resultant propagation direction of the ultrasonic waves is not orthogonal to the horizontal, but at, for example, 45 degrees. The ultrasonic waves can be at an angle so that the main beam of the waves is approximately pointed at an ear of the user. In another embodiment, the propagation direction of the ultrasonic waves can be approximately orthogonal to the horizontal. Such a speaker does not have to be on a wedge or a step. It can be on a surface that is substantially parallel to the horizontal. For example, the speaker can be on the shoulder of a user, and the ultrasonic waves propagate upwards, instead of at an angle towards an ear of the user. If the ultrasonic power is sufficient, the waves would have sufficient acoustic power even when the speaker is not pointing exactly at the ear.

In one embodiment, the ultrasonic beam is considered directed towards the ear as long as any portion of the beam, or the cone of the beam, is immediately proximate to, such as within 7 cm of, the ear. The direction of the beam does not have to be pointed at the ear. It can even be orthogonal to the ear, such as propagating up from one's shoulder, substantially parallel to the face of the person.

The advantages of the invention are numerous. Different embodiments or implementations may yield different advantages. Different embodiments of the invention can provide one or more of the following advantages: (a) users are provided with non-invasive, hands-free wireless communications capability; (b) the user's ear remains free from any inserted objects and thus is free from the annoying occlusion effects, enabling the user to continue to hear sounds without interference; (c) the system can be inconspicuous due to its relatively small form factor, such as 2" by 3"; (d) the system can be inconspicuous, and would not be seen as a hearing enhancing device because it can be mistaken as a cell phone; (e) the system would not create feedback and resonance due to misalignment in its positioning as in many of the existing hearing aids; (f) the system can have a shape easy to adapt to the profile of a human being, such as in a shape comfortably residing on the shoulder of a user; (g) the system is relatively inexpensive, compared to existing hearing aids—this can, for example, be due to the lack of requiring an individually-fitted ear mold; and (h) the system is relatively easy to handle, such as to change or to recharge batteries, depending on the embodiment.

A number of embodiments have been described where a device is attachable to the clothing worn by a user. In one embodiment, attachable to the clothing worn by a user includes wearable by the user. For example, the user can wear a speaker on his neck, like a pendant on a necklace. This also would be considered as attachable to the clothing worn by the user. From another perspective, the necklace can be considered as the "clothing" worn by the user, and the device is attachable to the necklace.

One embodiment of the invention includes a mobile telephone with an integrated directional speaker. The mobile telephone is, for example, a cellular phone. The mobile telephone includes a housing that provides an overall body for the mobile telephone. The mobile telephone includes a display. The mobile telephone also includes a plurality of buttons that allow user input of alphanumeric characters or functional requests, and a navigational control that allows directional navigation with respect to the display. To support wireless communications, the mobile telephone also includes an antenna. In addition, the mobile telephone includes a microphone for voice pickup and an ear speaker for audio output. The ear speaker can also be referred to an earpiece.

Additionally, according to the invention, the mobile telephone also includes a directional speaker. The directional speaker provides directional audio sound for the user of the mobile telephone. The directional audio sound produced by the directional speaker allows the user of the mobile telephone to hear the audio sound even though neither of the speaker's ears is proximate to the mobile telephone. However, the directional nature of the directional sound output is towards the user and thus provides privacy by restricting the audio sound to a confined directional area. In other words, bystanders in the vicinity of the user but not within the confined directional area would not be able to directly hear the audio sound produced by the directional speaker. The bystanders might be able to hear a degraded version of the audio sound after it reflects from a surface. The reflected audio sound, if any, that reaches the bystander would be at a reduced decibel level (e.g., at least a 20 dB reduction) making it difficult for bystanders to hear and understand the audio sound.

Another embodiment of the invention includes a flip-type mobile telephone with an integrated directional speaker. The mobile telephone is, for example, a cellular phone. The mobile telephone is similar to the mobile telephone. More particularly, the mobile telephone includes a housing that provides a body for the mobile telephone. The mobile telephone includes a display, a plurality of keys, and a navigation control. To support wireless communications, the mobile telephone also includes an antenna. In addition, the mobile telephone includes a microphone for voice pickup and an ear speaker for audio output.

Moreover, according to the invention, the mobile telephone includes a directional speaker. In this embodiment, the directional speaker is provided in a lower region of a lid portion of the housing of the mobile telephone. The directional speaker directs audio output to the user of the mobile telephone in a directional manner. The directional nature of the directional sound output is towards the user and thus provides privacy by restricting the audio sound to a confined directional area.

In one embodiment, signals driving a speaker in a system of the present invention can be modified based upon user information stored in the system. As such, the audio sound being produced by the speaker can be customized for (or personalized to) the user. For example, when the user information pertains to user preferences of the user, the audio output by the speaker is customized for the user preferences of the user.

In one implementation, the measured sound (e.g. noise) levels at the vicinity of a user can be measured by a pickup device (e.g., microphone) at the vicinity of the user. The pickup device can be incorporated in an embodiment of the invention. For example, if the user is in an area with a lot of noise (e.g., ambient noise), such as at a confined space with various persons or where construction noise is present, signals received by the embodiment could be processed to attempt to suppress the unwanted noise. One approach to suppress the unwanted noise is to introduce audio outputs that are opposite in phase to the unwanted noise so as to cancel the noise. Noise suppression can be achieved through conventional digital signal processing, amplification and/or filtering techniques.

Figure 12:
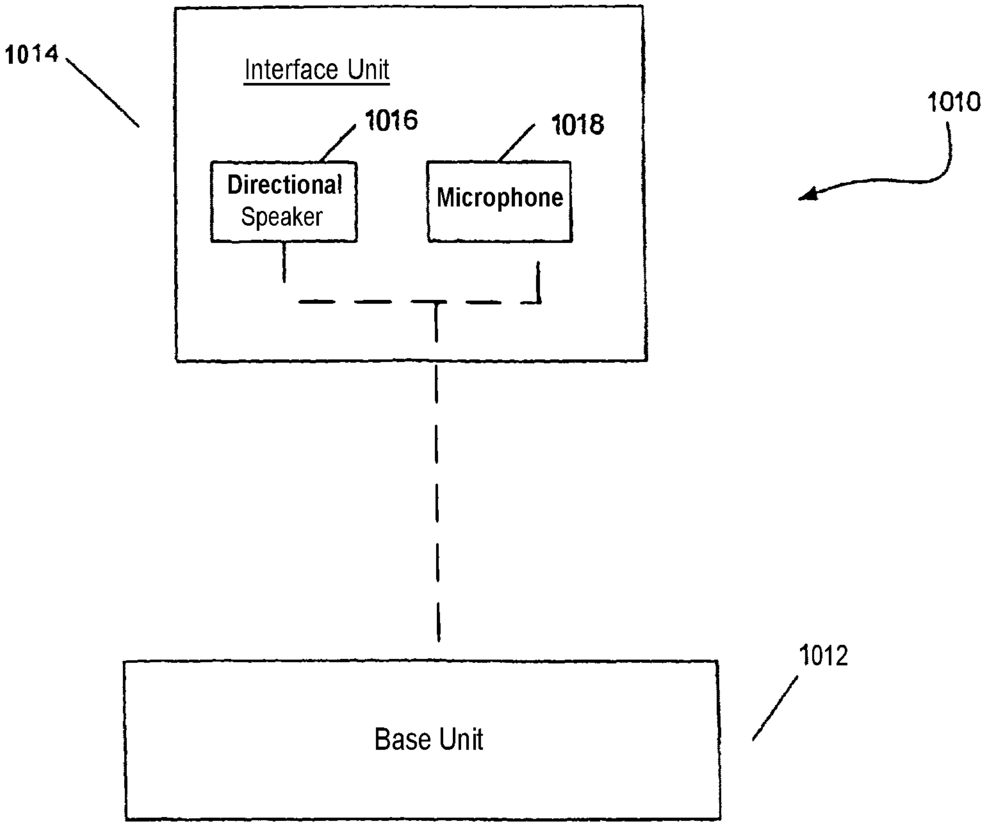
FIG. 12 shows one embodiment of the invention with a base unit coupled to a directional speaker and a microphone.

One embodiment of the present invention is a wireless communication system that provides improved hands-free usage. The wireless communication system can, for example, be a mobile phone. FIG. 12 shows a block diagram of wireless communication system 1010 according to one embodiment of the invention. The wireless communication system 1010 has a base unit 1012 that is coupled to an interface unit 1014. The interface unit 1014 includes a directional speaker 1016 and a microphone 1018. The directional speaker 1016 generates directional audio signals.

From basic aperture antenna theory, the angular beam width θ of a source, such as the directional speaker, is roughly λ/D, where θ is the angular full width at half-maximum (FWHM), λ is the wavelength and D is the diameter of the aperture. For simplicity, assume the aperture to be circular.

For ordinary audible signals, the frequency is from a few hundred hertz, such as 500 Hz, to a few thousand hertz, such as 5000 Hz. With the speed of sound in air c being 340 m/s, λ of ordinary audible signals is roughly between 70 cm and 7 cm. For personal or portable applications, the dimension of a speaker can be in the order of a few cm. Given that the acoustic wavelength is much larger than a few cm, such a speaker is almost omni-directional. That is, the sound source is emitting energy almost uniformly at all directions. This can be undesirable if one needs privacy because an omni-directional sound source means that anyone in any direction can pickup the audio signals.

To increase the directivity of the sound source, one approach is to decrease the wavelength of sound, but this can put the sound frequency out of the audible range. Another technique is known as parametric acoustics.

Parametric acoustic operation has previously been discussed, for example, in the following publications: "Parametric Acoustic Array," by P. J. Westervelt, in J., Acoust. Soc. Am., Vol. 35 (4), pp. 535-537, 1963; "Possible exploitation of Non-Linear Acoustics in Underwater Transmitting Applications," by H. O. Berktay, in J. Sound Vib. Vol. 2 (4): 435-461 (1965); and "Parametric Array in Air," by Bennett et al., in J. Acoust. Soc. Am., Vol. 57 (3), pp. 562-568, 1975.

In one embodiment, assume that the audible acoustic signal is f(t) where f(t) is a band-limited signal, such as from 500 to 5,000 Hz. A modulated signal f(t) sin $\omega_c$ tis created to drive an acoustic transducer. The carrier frequency $\omega_c/2\pi$ should be much larger than the highest frequency component of f(t). In an example, the carrier wave is an ultrasonic wave. The acoustic transducer should have a sufficiently wide bandwidth at $\omega_c$ to cover the frequency band of the incoming signal f(t). After this signal f(t) sin $\omega_c$ t is emitted from the transducer, non-linear demodulation occurs in air, creating an audible signal, E(t), where $$E(t) \propto \partial^2/\partial t^2[f^2(\tau)]$$

with τ=t−L/c, and L being the distance between the source and the receiving ear. In this example, the demodulated audio signal is proportional to the second time derivative of the square of the modulating envelope f(t).

To retrieve the audio signal f(t) more accurately, a number of approaches pre-process the original audio signals before feeding them into the transducer. Each has its specific attributes and advantages. One pre-processing approach is disclosed in "Acoustic Self-demodulation of Pre-distorted Carriers," by B. A. Davy, Master's Thesis submitted to U. T. Austin in 1972. The disclosed technique integrates the signal f(t) twice, and then square-roots the result before multiplying it with the carrier sin $\omega_c$ t. The resultant signals are applied to the transducer. In doing so, an infinite harmonics of f(t) could be generated, and a finite transmission bandwidth can create distortion.

Another pre-processing approach is described in "The audio spotlight: An application of nonlinear interaction of sound waves to a new type of loudspeaker design," by Yoneyama et al., Journal of the Acoustic Society of America, Vol. 73 (5), pp. 1532-1536, May 1983. The pre-processing scheme depends on double side-band (DSB) modulation. Let S(t)=1+m f(t), where m is the modulation index. S(t) sin $\omega_c$ t is used to drive the acoustic transducer instead of f(t) sin $\omega_c$ t. Thus, $$E(t) \propto \partial^2/\partial t^2[S^2(\tau)] \propto 2mf(\tau)+m^2\partial^2/\partial t^2[f(\tau)^2].$$

The first term provides the original audio signal. But the second term can produce undesirable distortions as a result of the DSB modulation. One way to reduce the distortions is by lowering the modulation index m. However, lowering m may also reduce the overall power efficiency of the system.

In "Development of a parametric loudspeaker for practical use," Proceedings of 10th International Symposium on Non-linear Acoustics, pp. 147-150, 1984, Kamakura et al. introduced a pre-processing approach to remove the undesirable terms. It uses a modified amplitude modulation (MAM) technique by defining $S(t)=[1+m\,f(t)]^{1/2}$. That is, the demodulated signal $E(t) \propto m\,f(t)$. The square-rooted envelope operation of the MAM signal can broaden the bandwidth of S(t), and can require an infinite transmission bandwidth for distortion-free demodulation.

In "Suitable Modulation of the Carrier Ultrasound for a Parametric Loudspeaker," Acoustica, Vol. 23, pp. 215-217, 1991, Kamakura et al. introduced another pre-processing scheme, known as "envelope modulation". In this scheme, $S(t)=[e(t)+m\,f(t)]^{1/2}$ where e(t) is the envelope of f(t). The transmitted power was reduced by over 64% using this scheme and the distortion was better than the DSB or single-side band (SSB) modulation, as described in "Self-demodulation of a plane-wave—Study on primary wave modulation for wideband signal transmission," by Aoki et al., J. Acoust. Soc. Jpn., Vol. 40, pp. 346-349, 1984.

Back to directivity, the modulated signals, S(t) sin $\omega_c$ t or f(t) sin $\omega_c$ t, have a better directivity than the original acoustic signal f(t), because $\omega_c$ is higher than the audible frequencies. As an example, $\omega_c$ can be 2π*40 kHz, though experiment has shown that $\omega_c$ can range from 2π*20 kHz to well over 2π*1 MHz. Typically, $\omega_c$ is chosen not to be too high because of the higher acoustic absorption at higher carrier frequencies. Anyway, with $\omega_c$ being 2π*40 kHz, the modulated signals have frequencies that are approximately ten times higher than the audible frequencies. This makes an emitting source with a small aperture, such as 2.5 cm in diameter, a directional device for a wide range of audio signals.

In one embodiment, choosing a proper working carrier frequency $\omega_c$ takes into consideration a number of factors, such as:

1. To reduce the acoustic attenuation, which is generally proportional to $\omega_c^2$, the carrier frequency $\omega_c$ should not be high.
2. The FWHM of the ultrasonic beam should be large enough, such as 25 degrees, to accommodate head motions of the person wearing the portable device and to reduce the ultrasonic intensity through beam expansion.
3. To avoid the near-field effect which may cause amplitude fluctuations, the distance between the emitting device and the receiving ear r should be greater than $0.3^*R_0$, where $R_0$ is the Rayleigh distance, and is defined as (the area of the emitting aperture/λ).

As an example, with FWHM being 20 degrees, $$\theta=\lambda/D=(c2\pi/\omega_c)/D\sim1/3.$$

Assuming D is 2.5 cm, $\omega_c$ becomes 2π*40 kHz. From this relation, it can be seen that the directivity of the ultrasonic beam can be adjusted by changing the carrier frequency $\omega_c$. If a smaller aperture acoustic transducer is preferred, the directivity may decrease. Note also that the power generated by the acoustic transducer is typically proportional to the aperture area. In the above example, the Rayleigh distance $R_0$ is about 57 mm.

Based on the above description, in one embodiment, directional audio signals can be generated by the speaker 1016 even with a relatively small aperture through modulated ultrasonic signals. The modulated signals can be demodulated in air to regenerate the audio signals. The speaker 1016 can then generate directional audio signals even when emitted from an aperture that is in the order of a few centimeters. This allows the directional audio signals to be pointed at desired directions.

Note that a number of examples have been described on generating audio signals through demodulating ultrasonic signals. However, the audio signals can also be generated through mixing two ultrasonic signals whose difference frequencies are the audio signals.

Figure 13:
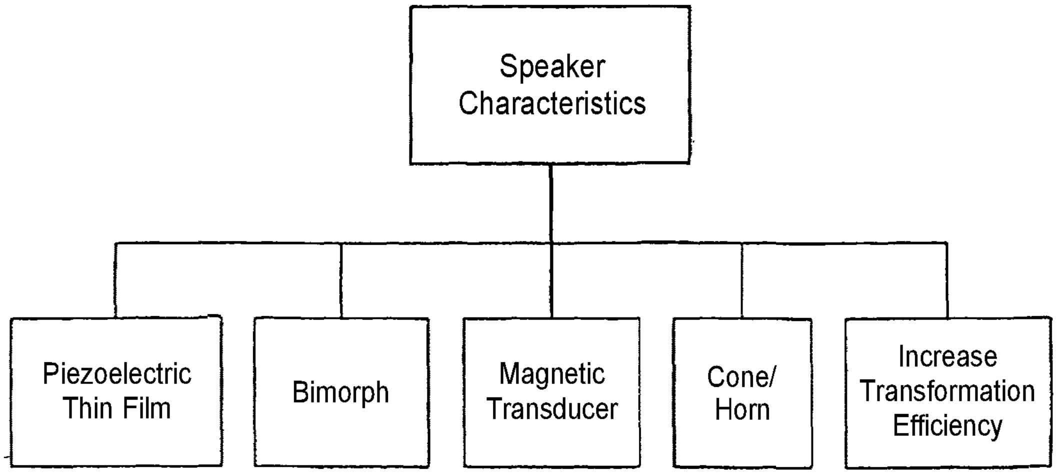
FIG. 13 shows examples of characteristics of a directional speaker of the present invention.

FIG. 13 shows examples of characteristics of a directional speaker. The directional speaker can, for example, be the directional speaker 1016 illustrated in FIG. 1. The directional speaker can use a piezoelectric thin film. The piezoelectric thin film can be deposited on a plate with many cylindrical tubes. An example of such a device is described in U.S. Pat. No. 6,011,855, which is hereby incorporated by reference. The film can be a polyvinylidiene di-fluoride (PVDF) film, and can be biased by metal electrodes. The film can be attached or glued to the perimeter of the plate of tubes. The total emitting surfaces of all of the tubes can have a dimension in the order of a few wavelengths of the carrier or ultrasonic signals. Appropriate voltages applied through the electrodes to the piezoelectric thin film create vibrations of the thin film to generate the modulated ultrasonic signals. These signals cause resonance of the enclosed tubes. After emitted from the film, the ultrasonic signals self-demodulate through non-linear mixing in air to produce the audio signals.

As one example, the piezoelectric film can be about 28 microns in thickness; and the tubes can be 9/64" in diameter and spaced apart by 0.16", from center to center of the tube, to create a resonating frequency of around 40 kHz. With the ultrasonic signals being centered around 40 kHz, the emitting surface of the directional speaker can be around 2 cm by 2 cm. A significant percentage of the ultrasonic power generated by the directional speaker can, in effect, be confined in a cone.

To calculate the amount of power within the cone, for example, as a rough estimation, assume that (a) the emitting surface is a uniform circular aperture with the diameter of 2.8 cm, (b) the wavelength of the ultrasonic signals is 8.7 mm, and (c) all power goes to the forward hemisphere, then the ultrasonic power contained within the FWHM of the main lobe is about 97%, and the power contained from null to null of the main lobe is about 97.36%. Similarly, again as a rough estimation, if the diameter of the aperture drops to 1 cm, the power contained within the FWHM of the main lobe is about 97.2%, and the power contained from null to null of the main lobe is about 99%.

Referring back to the example of the piezoelectric film, the FWHM of the signal beam is about 24 degrees. Assume that such a directional speaker 1016 is placed on the shoulder of a user. The output from the speaker can be directed in the direction of one of the ears of the user, with the distance between the shoulder and the ear being, for example, 8 inches. More than 75% of the power of the audio signals generated by the emitting surface of the directional speaker can, in effect, be confined in a cone. The tip of the cone is at the speaker, and the mouth of the cone is at the location of the user's ear. The diameter of the mouth of the cone, or the diameter of the cone in the vicinity of the ear, is less than about 4 inches.

In another embodiment, the directional speaker can be made of a bimorph piezoelectric transducer. The transducer can have a cone of about 1 cm in diameter. In yet another embodiment, the directional speaker can be a magnetic transducer. In a further embodiment, the directional speaker does not generate ultrasonic signals, but generates audio signals directly; and the speaker includes, for example, a physical horn or cone to direct the audio signals.

In yet another embodiment, the power output from the directional speaker is increased by increasing the transformation efficiency (e.g., demodulation or mixing efficiency) of the ultrasonic signals. According to the Berktay's formula, as disclosed, for example, in "Possible exploitation of Non-Linear Acoustics in Underwater Transmitting Applications," by H. O. Berktay, in J. Sound Vib. Vol. 2 (4):435-461 (1965), which is hereby incorporated by reference, output audio power is proportional to the coefficient of non-linearity of the mixing or demodulation medium. One approach to increase the efficiency is to have at least a portion of the transformation performed in a medium other than air.

Figure 14:
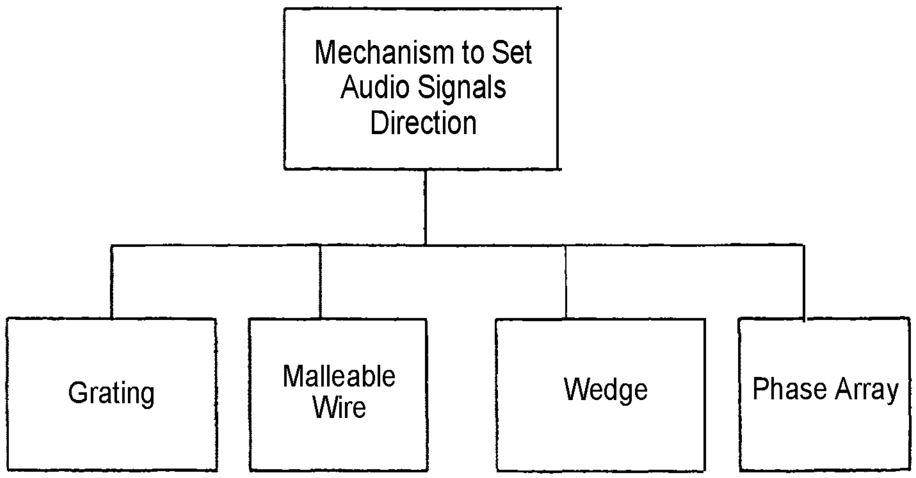
FIG. 14 shows examples of mechanisms to set the direction of audio signals of the present invention.

As explained, in one embodiment, based on parametric acoustic techniques, directional audio signals can be generated. FIG. 14 shows examples of mechanisms to direct the ultrasonic signals. They represent different approaches, which can utilize, for example, a grating, a malleable wire, or a wedge.

Figure 15A:
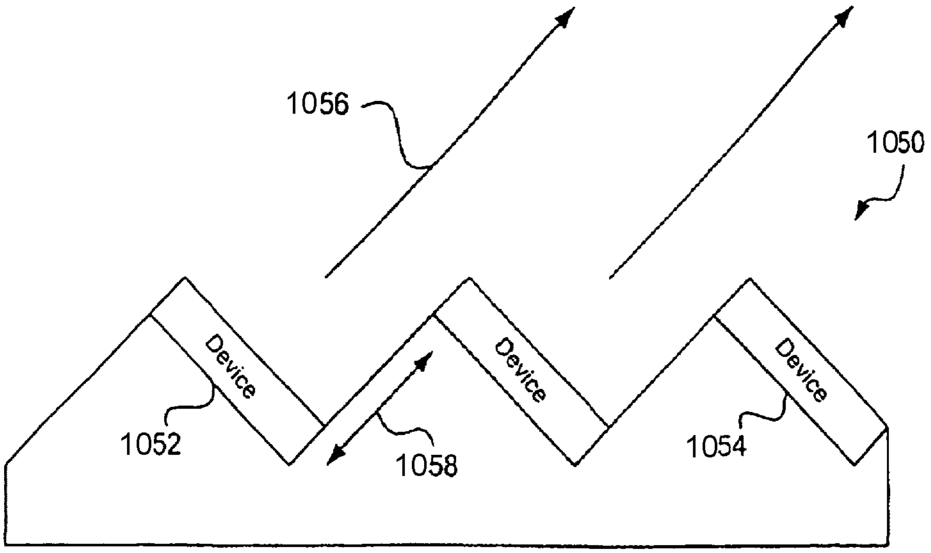
FIG. 15A shows one embodiment of a blazed grating for the present invention.

FIG. 15A shows one embodiment of a directional speaker 1050 having a blazed grating. The speaker 1050 is, for example, suitable for use as the directional speaker 1016. Each emitting device, such as 1052 and 1054, of the speaker 1050 can be a piezoelectric device or another type of speaker device located on a step of the grating. In one embodiment, the sum of all of the emitting surfaces of the emitting devices can have a dimension in the order of a few wavelengths of the ultrasonic signals.

In another embodiment, each of the emitting devices can be driven by a replica of the ultrasonic signals with an appropriate delay to cause constructive interference of the emitted waves at the blazing normal 1056, which is the direction orthogonal to grating. This is similar to the beam steering operation of a phase array, and can be implemented by a delay matrix. The delay between adjacent emitting surfaces can be approximately h/c, with the height of each step being h. One approach to simplify signal processing is to arrange the height of each grating step to be an integral multiple of the ultrasonic or carrier wavelength, and all the emitting devices can be driven by the same ultrasonic signals.

Based on the grating structure, the array direction of the virtual audio sources can be the blazing normal 1056. In other words, the structure of the steps can set the propagation direction of the audio signals. In the example shown in FIG. 15A, there are three emitting devices or speaker devices, one on each step. The total emitting surfaces are the sum of the emitting surfaces of the three devices. The propagation direction is approximately 45 degrees from the horizontal plane. The thickness of each speaker device can be less than half the wavelength of the ultrasonic waves. If the frequency of the ultrasonic waves is 40 kHz, the thickness can be about 4 mm.

Another approach to direct the audio signals to specific directions is to position a directional speaker of the present invention at the end of a malleable wire. The user can bend the wire to adjust the direction of propagation of the audio signals. For example, if the speaker is placed on the shoulder of a user, the user can bend the wire such that the ultrasonic signals produced by the speaker are directed towards the ear adjacent to the shoulder of the user.

Figure 15B:
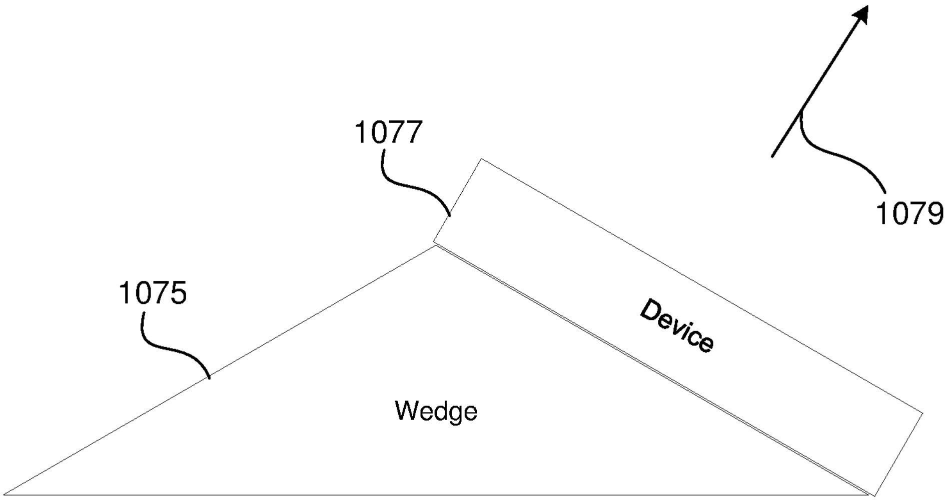
FIG. 15B shows an example of a wedge to direct the propagation angle of audio signals for the present invention.

Still another approach is to position the speaker device on a wedge. FIG. 15B shows an example of a wedge 1075 with a speaker device 1077. The angle of the wedge from the horizontal can be about 40 degrees. This sets the propagation direction 1079 of the audio signals to be about 50 degrees from the horizon.

Figure 16:
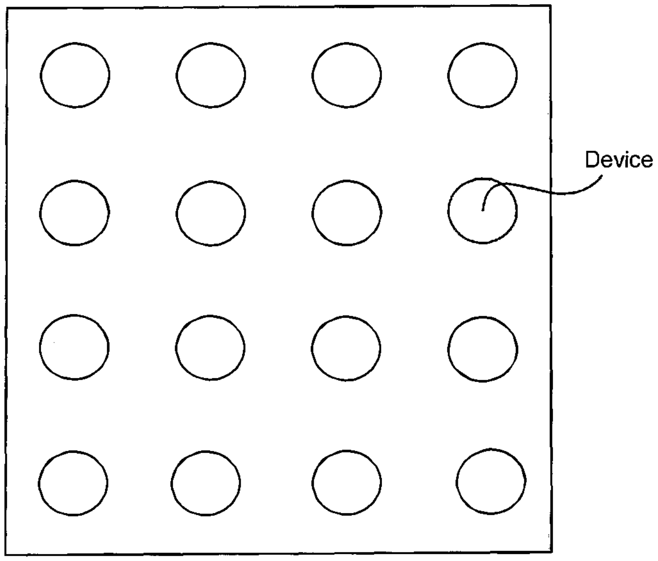
FIG. 16 shows an example of a steerable phase array of devices to generate the directional audio signals in accordance with the present invention.

In one embodiment, the ultrasonic signals are generated by a steerable phase array of individual devices, as illustrated, for example, in FIG. 16. They generate the directional signals by constructive interference of the devices. The signal beam is steerable by changing the relative phases among the array of devices.

One way to change the phases in one direction is to use a one-dimensional array of shift registers. Each register shifts or delays the ultrasonic signals by the same amount. This array can steer the beam by changing the clock frequency of the shift registers. These can be known as "x" shift registers. To steer the beam independently also in an orthogonal direction, one approach is to have a second set of shift registers controlled by a second variable rate clock. This second set of registers, known as "y" shift registers, is separated into a number of subsets of registers. Each subset can be an array of shift registers and each array is connected to one "x" shift register. The beam can be steered in the orthogonal direction by changing the frequency of the second variable rate clock.

For example, as shown in FIG. 16, the acoustic phase array is a 4 by 4 array of speaker devices. The devices in the acoustic phase array are the same. For example, each can be a bimorph device or transmitter of 7 mm in diameter. The overall size of the array can be around 2.8 cm by 2.8 cm. The carrier frequency can be set to 100 kHz. Each bimorph is driven at less than 0.1 W. The array is planar but each bimorph is pointed at the ear, such as at about 45 degrees to the array normal. The FWHM main lobe of each individual bimorph is about 0.5 radian.

There can be 4 "x" shift registers. Each "x" shift register can be connected to an array of 4 "y" shift registers to create a 4 by 4 array of shift registers. The clocks can be running at approximately 10 MHz (100 ns per shift). The ultrasonic signals can be transmitted in digital format and delayed by the shift registers at the specified amount.

Assuming the distance of the array from an ear is approximately 20 cm, the main lobe of each array device covers an area of roughly 10 cm×10 cm around the ear. As the head can move over an area of 10 cm×10 cm, the beam can be steerable roughly by a phase of 0.5 radian over each direction. This is equivalent to a maximum relative time delay of 40 us across one direction of the phase array, or 5 us of delay per device.

For a n by n array, the ultrasonic beam from each array element interferes with each other to produce a final beam that is 1/n narrower in beam width. In the above example, n is equal to 4, and the beam shape of the phase array is narrowed by a factor of 4 in each direction. That is, the FWHM is less than 8 degrees, covering an area of roughly 2.8 cm×2.8 cm around the ear.

With power focused into a smaller area, the power requirement is reduced by a factor of $1/n^2$, significantly improving power efficiency. In one embodiment, the above array can give the acoustic power of over 90 dB SPL.

Instead of using the bimorph devices, the above example can use an array of piezoelectric thin film devices.

In one embodiment, the interface unit can also include a pattern recognition device that identifies and locates the ear, or the ear canal. Then, if the ear or the canal can be identified, the beam is steered more accurately to the opening of the ear canal. Based on closed loop control, the propagation direction of the ultrasonic signals can be steered by the results of the pattern recognition approach.

One pattern recognition approach is based on thermal mapping to identify the entrance to the ear canal. Thermal mapping can be through infrared sensors. Another pattern recognition approach is based on a pulsed-infrared LED, and a reticon or CCD array for detection. The reticon or CCD array can have a broadband interference filter on top to filter light, which can be a piece of glass with coating.

Note that if the system cannot identify the location of the ear or the ear canal, the system can expand the cone, or decrease its directivity. For example, all array elements can emit the same ultrasonic signals, without delay, but with the frequency decreased.

Privacy is often a concern for users of cell phones. Unlike music or video players where users passively receive information or entertainment, with cell phones, there is a two-way communication. In most circumstances, cell phone users have gotten accustomed to people hearing what they have to say. At least, they can control or adjust their part of the communication. However, cell phone users typically do not want others to be aware of their entire dialogue. Hence, for many applications, at least the voice output portion of the cell phone should provide some level of privacy. With the directional speaker as discussed herein, the audio signals are directional, and thus the wireless communication system provides certain degree of privacy protection.

Figure 17:
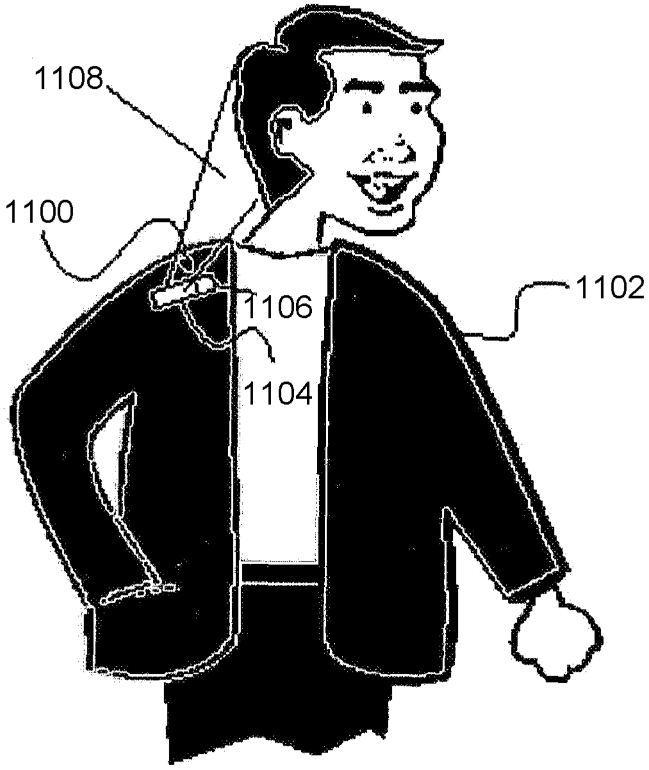
FIG. 17 shows one example of an interface unit attached to a piece of clothing of a user in accordance with the present invention.

FIG. 17 shows one example of the interface unit 1100 attached to a jacket 1102 of the user. The interface unit 1100 includes a directional speaker 1104 and a microphone 1106. The directional speaker 1104 emits ultrasonic signals in the general direction towards an ear of the user. The ultrasonic signals are transformed by mixing or demodulating in the air between the speaker and ear. The directional ultrasonic signals confine most of the audio energy within a cone 1108 that is pointed towards the ear of the user. The surface area of the cone 1108 when it reaches the head of the user can be tailored to be smaller than the head of the user. Hence, the directional ultrasonic signals are able to provide certain degree of privacy protection.

In one embodiment, there is one or more additional speaker devices provided within, proximate to, or around the directional speaker. The user's head can scatter a portion of the received audio signals. Others in the vicinity of the user may be able to pick up these scattered signals. The additional speaker devices, which can be piezoelectric devices, transmit random signals to interfere or corrupt the scattered signals or other signals that may be emitted outside the cone 1108 of the directional signals to reduce the chance of others comprehending the scattered signals.

Figure 18:
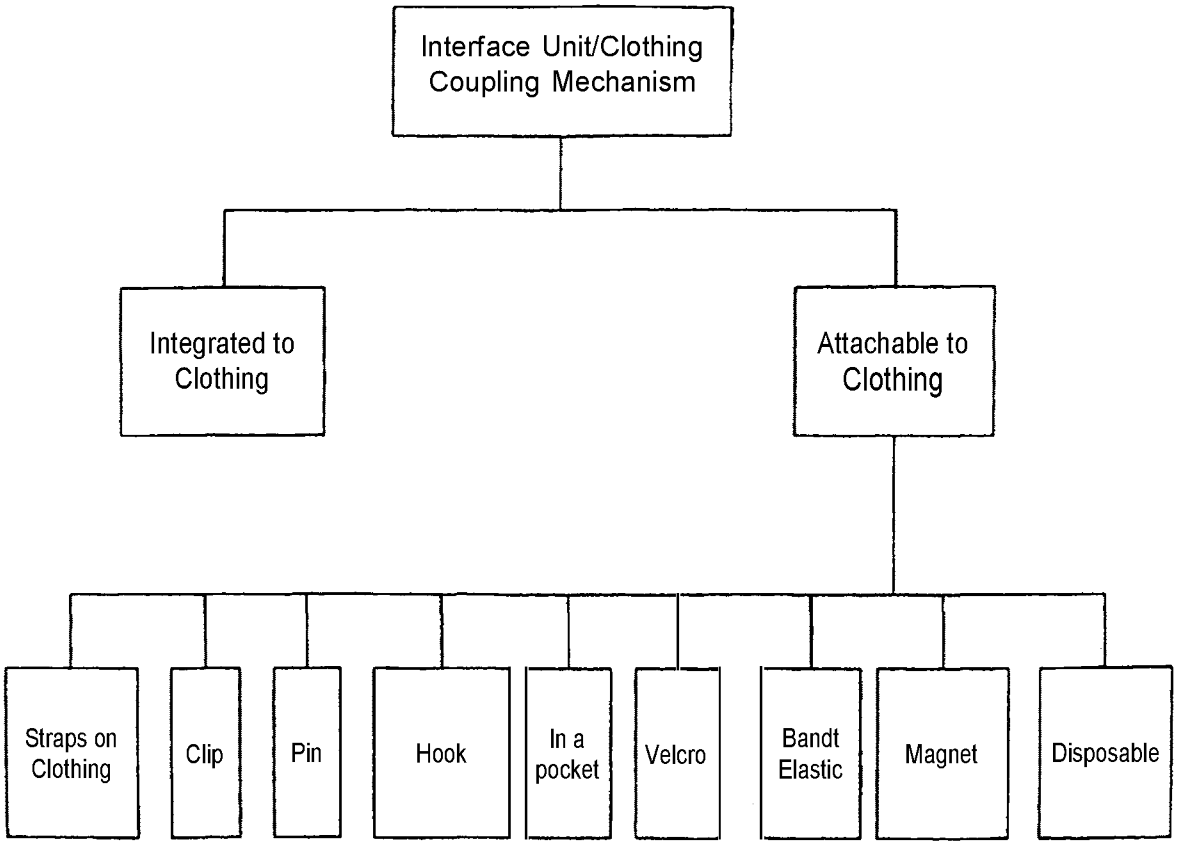
FIG. 18 shows examples of mechanisms to couple the interface unit to a piece of clothing in accordance with the present invention.

FIG. 18 shows examples of mechanisms to couple an interface unit to a piece of clothing. For example, the interface unit can be integrated into a user's clothing, such as located between the outer surface of the clothing and its inner lining. To receive power or other information from the outside, the interface unit can have an electrical protrusion from the inside of the clothing.

Instead of integrated into the clothing, in another embodiment, the interface unit can be attachable to the user's clothing. For example, a user can attach the interface unit to his clothing, and then turn it on. Once attached, the unit can be operated hands-free. The interface unit can be attached to a strap on the clothing, such as the shoulder strap of a jacket. The attachment can be through a clip, a pin or a hook. There can be a small pocket, such as at the collar bone area or the shoulder of the clothing, with a mechanism (e.g., a button) to close the opening of the pocket. The interface unit can be located in the pocket. In another example, a fastener can be on both the interface unit and the clothing for attachment purposes. In one example, the fastener can use hooks and loops (e.g., VELCRO brand fasteners). The interface unit can also be attached by a band, which can be elastic (e.g., an elastic armband). Or, the interface unit can be hanging from the neck of the user with a piece of string, like an ornamental design on a necklace. In yet another example, the interface unit can have a magnet, which can be magnetically attached to a magnet on the clothing. Note that one or more of these mechanisms can be combined to further secure the attachment. In yet another example, the interface unit can be disposable. For example, the interface unit could be disposed of once it runs out of power.

Figure 19:
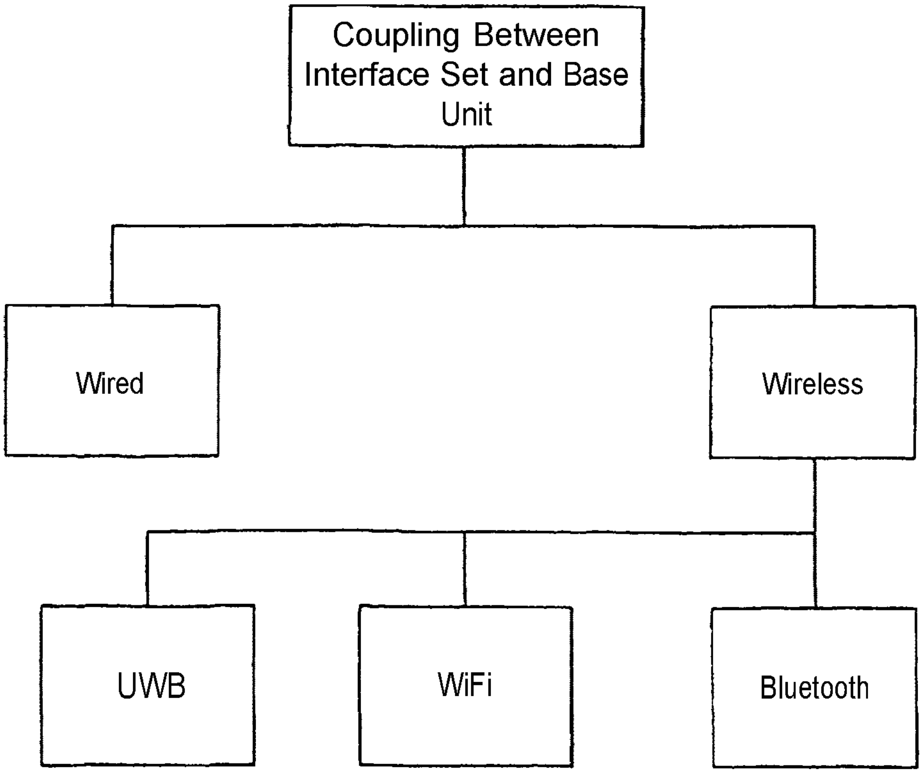
FIG. 19 shows examples of different coupling techniques between the interface unit and the base unit in the present invention.

Regarding the coupling between the interface unit and the base unit, FIG. 19 shows examples of a number of coupling techniques. The interface unit may be coupled wirelessly or tethered to the base unit through a wire. In the wireless embodiment, the interface unit may be coupled through Bluetooth, WiFi, Ultrawideband (UWB) or other wireless network/protocol.

Figure 20:
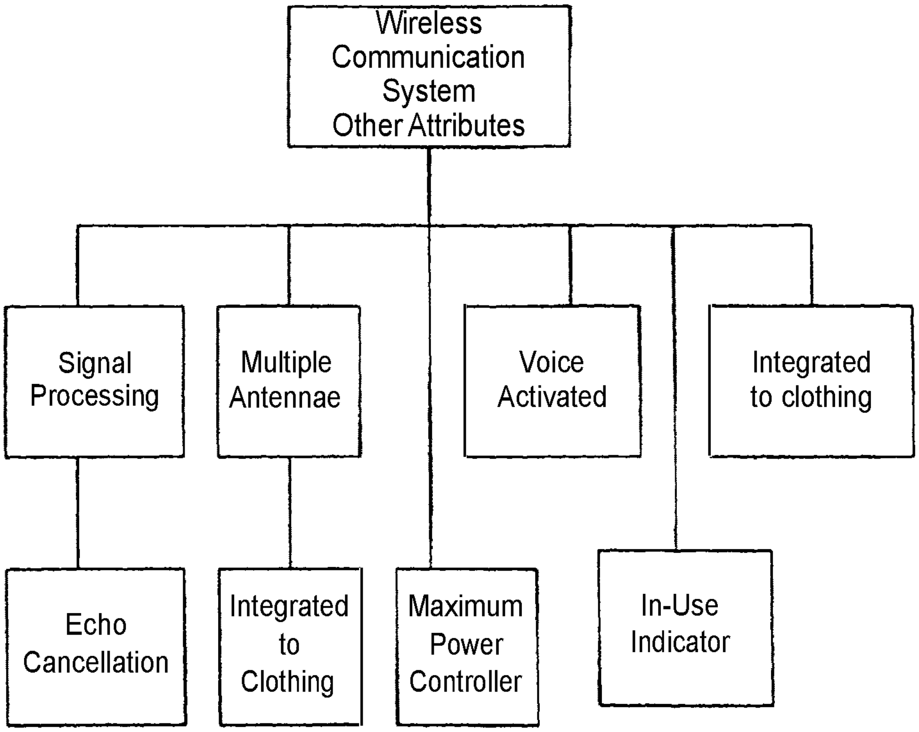
FIG. 20 shows examples of additional attributes of the wireless communication system in the present invention.

FIG. 20 shows examples of additional attributes of the wireless communication system of the present invention. The system can include additional signal processing techniques. Typically, single-side band (SSB) or lower-side band (LSB) modulation can be used with or without compensation for fidelity reproduction. If compensation is used, a processor (e.g., digital signal processor) can be deployed based on known techniques. Other components/functions can also be integrated with the processor. This can be local oscillation for down or up converting and impedance matching circuitry. Echo cancellation techniques may also be included in the circuitry. However, since the speaker is directional, the echo cancellation circuitry may not be necessary. These other functions can also be performed by software (e.g., firmware or microcode) executed by the processor.

The base unit can have one or more antennae to communicate with base stations or other wireless devices. Additional antennae can improve antenna efficiency. In the case where the interface unit wirelessly couples to the base unit, the antenna on the base unit can also be used to communicate with the interface unit. In this situation, the interface unit may also have more than one antenna.

The antenna can be integrated to the clothing. For example, the antenna and the base unit can both be integrated to the clothing. The antenna can be located at the back of the clothing.

The system can have a maximum power controller that controls the maximum amount of power delivered from the interface unit. For example, average output audio power can be set to be around 60 dB, and the maximum power controller limits the maximum output power to be below 70 dB. In one embodiment, this maximum power is in the interface unit and is adjustable.

The wireless communication system may be voice activated. For example, a user can enter, for example, phone numbers using voice commands. Information, such as phone numbers, can also be entered into a separate computer and then downloaded to the communication system. The user can then use voice commands to make connections to other phones.

The wireless communication system can have an in-use indicator. For example, if the system is in operation as a cell phone, a light source (e.g., a light-emitting diode) at the interface unit can operate as an in-use indicator. In one implementation, the light source can flash or blink to indicate that the system is in-use. The in-use indicator allows others to be aware that the user is, for example, on the phone.

In yet another embodiment, the base unit of the wireless communication system can also be integrated to the piece of clothing. The base unit can have a data port to exchange information and a power plug to receive power. Such port or ports can protrude from the clothing.

Figure 21:
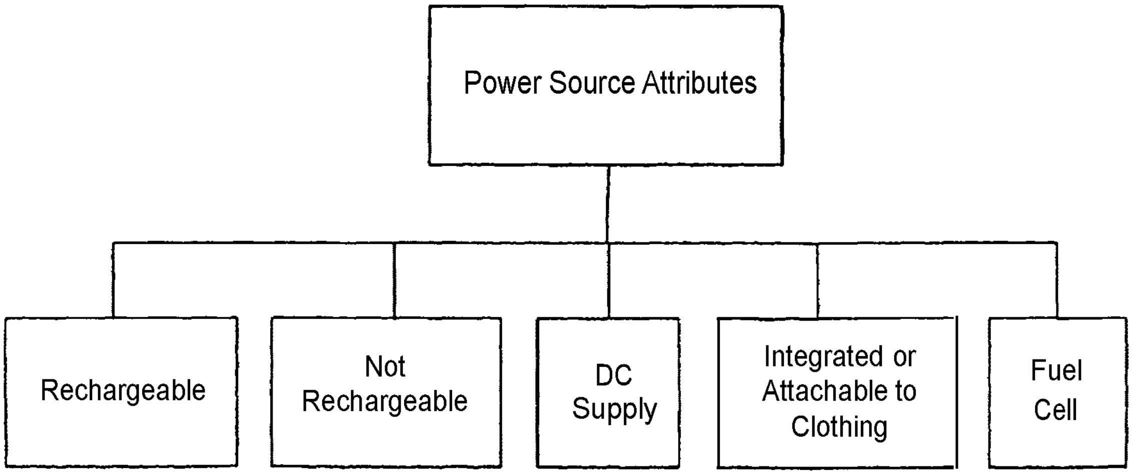
FIG. 21 shows examples of attributes of a power source for use with the present invention.

FIG. 21 shows examples of attributes of the power source. The power source may be a rechargeable battery or a non-rechargeable battery. As an example, a bimorph piezoelectric device, such as AT/R40-12P from Nicera, Nippon Ceramic Co., Ltd., can be used as a speaker device to form the speaker. It has a resistance of 1,000 ohms. Its power dissipation can be in the milliwatt range. A coin-type battery that can store a few hundred mAHours of energy has sufficient power to run the unit for a limited duration of time. Other types of batteries are also applicable.

The power source can be from a DC supply. The power source can be attachable, or integrated or embedded in a piece of clothing worn by the user. The power source can be a rechargeable battery. In one embodiment, for a rechargeable battery, it can be integrated in the piece of clothing, with its charging port exposed. The user can charge the battery on the road. For example, if the user is driving, the user can use a cigarette-lighter type charger to recharge the battery. In yet another embodiment, the power source is a fuel cell. The cell can be a cartridge of fuel, such methanol.

Figure 22A:
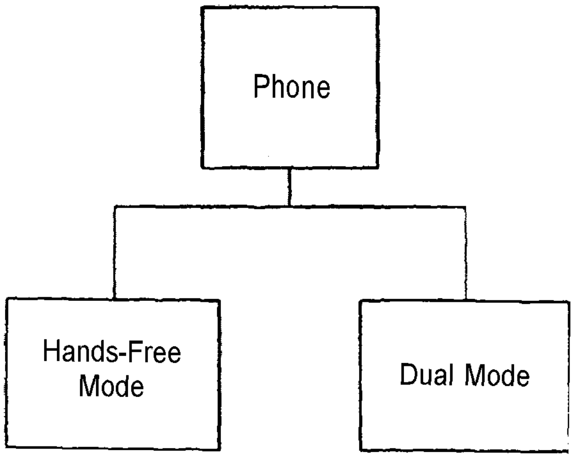
FIG. 22A shows the phone being a hands-free or a normal mode phone according to one embodiment of the present invention.

A number of embodiments have been described where the wireless communication system is a phone, particularly a cell phone that can be operated hands-free. In one embodiment, such can be considered a hands-free mode phone. FIG. 22A shows one embodiment where the phone can alternatively be a dual-mode phone. In a normal-mode phone, the audio signals are produced directly from a speaker integral with the phone (e.g., within its housing). Such a speaker is normally substantially non-directional (i.e., the speaker does not generate audio signals through transforming ultrasonic signals in air). In a dual mode phone, one mode is the hands-free mode phone as described above, and the other mode is the normal-mode phone.

Figure 22B:
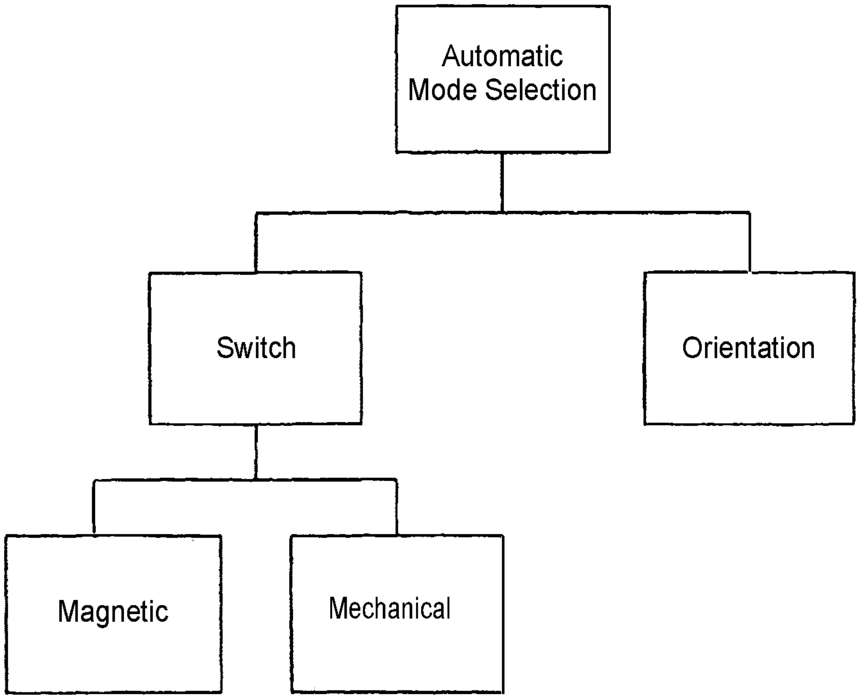
FIG. 22B shows examples of different techniques to automatically select the mode of a dual mode phone in accordance with the present invention.

The mode selection process can be set by a switch on the phone. In one embodiment, mode selection can be automatic. FIG. 22B shows examples of different techniques to automatically select the mode of a dual mode phone. For example, if the phone is attached to the clothing, the directional speaker of the interface unit can be automatically activated, and the phone becomes the hands-free mode phone. In one embodiment, automatic activation can be achieved through a switch integrated to the phone. The switch can be a magnetically-activated switch. For example, when the interface unit is attached to clothing (for hands-free usage), a magnet or a piece of magnetizable material in the clothing can cause the phone to operate in the hands-free mode. When the phone is detached from clothing, the magnetically-activated switch can cause the phone to operate as a normal-mode phone. In another example, the switch can be mechanical. For example, an on/off button on the unit can be mechanically activated if the unit is attached. This can be done, for example, by a lever such that when the unit is attached, the lever will be automatically pressed. In yet another example, activation can be based on orientation. If the interface unit is substantially in a horizontal orientation (e.g., within 30 degrees from the horizontal), the phone will operate in the hands-free mode. However, if the unit is substantially in a vertical orientation (e.g., within 45 degrees from the vertical), the phone will operate as a normal-mode phone. A gyro in the interface unit can be used to determine the orientation of the interface unit.

Figure 23:
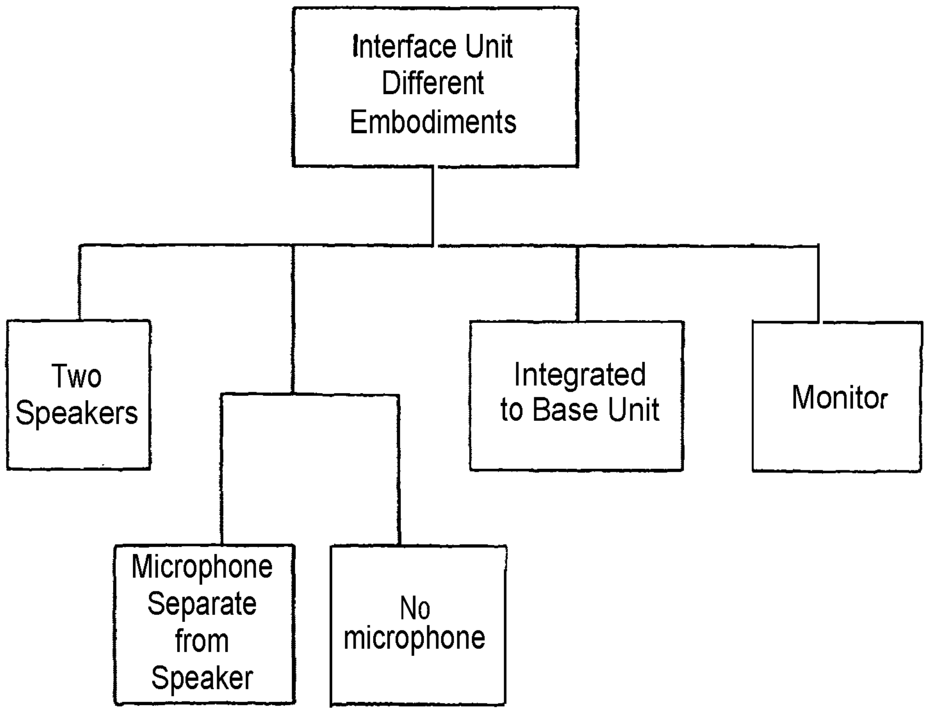
FIG. 23 shows examples of different embodiments of an interface unit of the present invention.
Figure 24:
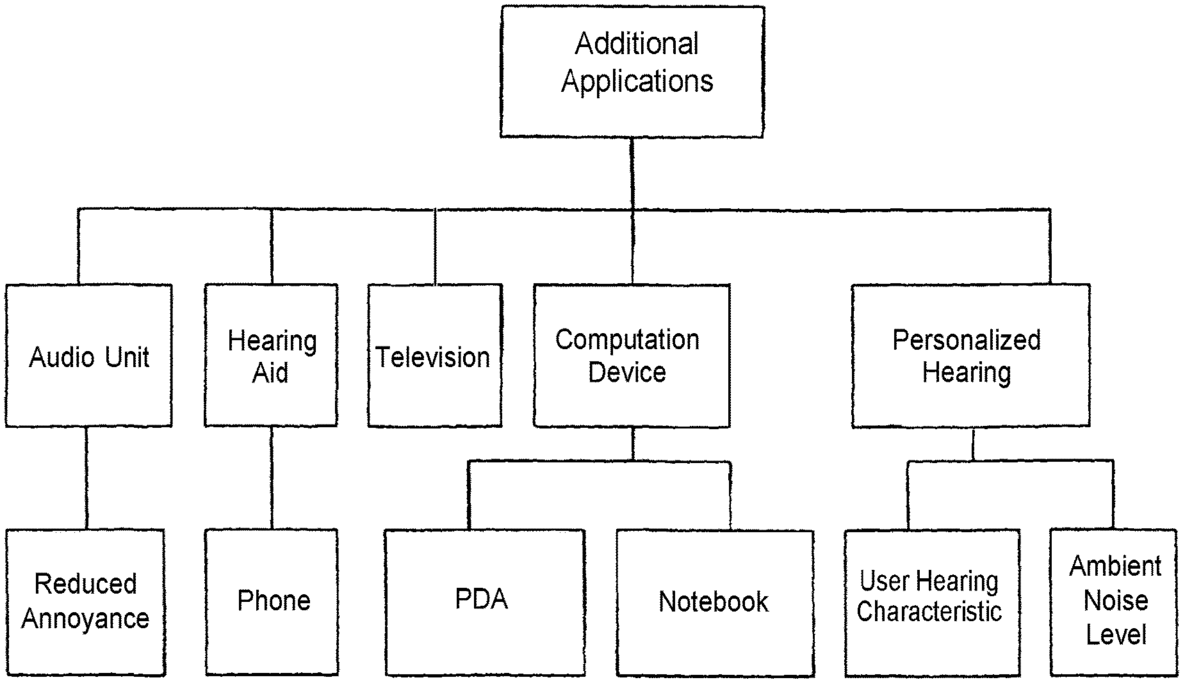
FIG. 24 shows examples of additional applications for the present invention.

A number of embodiments have been described where the wireless communication system is a phone with a directional speaker and a microphone. However, the present invention can be applied to other areas. FIG. 23 shows examples of other embodiments of the interface unit, and FIG. 24 shows examples of additional applications.

The interface unit can have two speakers, each propagating its directional audio signals towards one of the ears of the user. For example, one speaker can be on one shoulder of the user, and the other speaker on the other shoulder. The two speakers can provide a stereo effect for the user.

A number of embodiments have been described where the microphone and the speaker are integrated together in a single package. In another embodiment, the microphone can be a separate component and can be attached to the clothing as well. For wired connections, the wires from the base unit can connect to the speaker and at least one wire can split off and connect to the microphone at a location close to the head of the user.

The interface unit does not need to include a microphone. Such a wireless communication system can be used as an audio unit, such as a MP3 player, a CD player or a radio. Such wireless communication systems can be considered one-way communication systems.

In another embodiment, the interface unit can be used as the audio output, such as for a stereo system, television or a video game player. For example, the user can be playing a video game. Instead of having the audio signals transmitted by a normal speaker, the audio signals, or a representation of the audio signals, are transmitted wirelessly to a base unit or an interface unit. Then, the user can hear the audio signals in a directional manner, reducing the chance of annoying or disturbing people in his immediate environment.

In another embodiment, a wireless communication system can, for example, be used as a hearing aid. The microphone in the interface unit can capture audio signals in its vicinity, and the directional speaker can re-transmit the captured audio signals to the user. The microphone can also be a directional microphone that is more sensitive to audio signals in selective directions, such as in front of the user. In this application, the speaker output volume is typically higher. For example, one approach is to drive a bimorph device at higher voltages. The hearing aid can selectively amplify different audio frequencies by different amounts based on user preference or user hearing characteristics. In other words, the audio output can be tailored to the hearing of the user. Different embodiments on hearing enhancement through personalizing or tailoring to the hearing of the user have been described in the U.S. patent application Ser. No. 10/826,527, filed Apr. 15, 2004 now U.S. Pat. No. 7,388,962 and U.S. patent application Ser. No. 12/157,092 filed Jun. 6, 2008, and entitled, "Directional Hearing Enhancement Systems", which are hereby incorporated herein by reference.

In one embodiment, the wireless communication system can function both as a hearing aid and a cell phone. When there are no incoming calls, the system functions as a hearing aid. On the other hand, when there is an incoming call, instead of capturing audio signals in its vicinity, the system transmits the incoming call through the directional speaker to be received by the user. In another embodiment, the base unit and the interface unit are integrated together in a package, which again can be attached to the clothing by techniques previously described for the interface unit.

In yet another embodiment, an interface unit can include a monitor or a display. A user can watch television or video signals in public, again with reduced possibility of disturbing people in the immediate surroundings because the audio signals are directional. For wireless applications, video signals can be transmitted from the base unit to the interface unit through UWB signals.

The base unit can also include the capability to serve as a computation system, such as in a personal digital assistant (PDA) or a notebook computer. For example, as a user is working on the computation system for various tasks, the user can simultaneously communicate with another person in a hands-free manner using the interface unit, without the need to take her hands off the computation system. Data generated by a software application the user is working on using the computation system can be transmitted digitally with the voice signals to a remote device (e.g., another base station or unit). In this embodiment, the directional speaker does not have to be integrated or attached to the clothing of the user. Instead, the speaker can be integrated or attached to the computation system, and the computation can function as a cell phone. Directional audio signals from the phone call can be generated for the user while the user is still able to manipulate the computation system with both of his hands. The user can simultaneously make phone calls and use the computation system. In yet another approach for this embodiment, the computation system is also enabled to be connected wirelessly to a local area network, such as to a WiFi or WLAN network, which allows high-speed data as well as voice communication with the network. For example, the user can make voice over IP calls. In one embodiment, the high-speed data as well as voice communication permits signals to be transmitted wirelessly at frequencies beyond 1 GHz.

In yet another embodiment, the wireless communication system can be a personalized wireless communication system. The audio signals can be personalized to the hearing characteristics of the user of the system. The personalization process can be done periodically, such as once every year, similar to periodic re-calibration. Such re-calibration can be done by another device, and the results can be stored in a memory device. The memory device can be a removable media card, which can be inserted into the wireless communication system to personalize the amplification characteristics of the directional speaker as a function of frequency. The system can also include an equalizer that allows the user to personalize the amplitude of the speaker audio signals as a function of frequency.

The system can also be personalized based on the noise level in the vicinity of the user. The device can sense the noise level in its immediate vicinity and change the amplitude characteristics of the audio signals as a function of noise level.

The form factor of the interface unit can be quite compact. In one embodiment, it is rectangular in shape. For example, it can have a width of about "x", a length of about "2x", and a thickness that is less than "x". "X" can be 1.5 inches, or less than 3 inches. In another example, the interface unit has a thickness of less than 1 inch. In yet another example, the interface unit does not have to be flat. It can have a curvature to conform to the physical profile of the user.

A number of embodiments have been described with the speaker being directional. In one embodiment, a speaker is considered directional if the FWHM of its ultrasonic signals is less than about 1 radian or around 57 degrees. In another embodiment, a speaker is considered directional if the FWHM of its ultrasonic signals is less than about 30 degrees. In yet another embodiment, a speaker is transmitting from, such as, the shoulder of the user. The speaker is considered directional if in the vicinity of the user's ear or in the vicinity 6-8 inches away from the speaker, 75% of the power of its audio signals is within an area of less than 50 square inches. In a further embodiment, a speaker is considered directional if in the vicinity of the ear or in the vicinity a number of inches, such as 8 inches, away from the speaker, 75% of the power of its audio signals is within an area of less than 20 square inches. In yet a further embodiment, a speaker is considered directional if in the vicinity of the ear or in the vicinity a number of inches, such as 8 inches, away from the speaker, 75% of the power of its audio signals is within an area of less than 13 square inches.

Also, referring back to FIG. 17, in one embodiment, a speaker can be considered a directional speaker if most of the power of its audio signals is propagating in one general direction, confined within a cone, such as the cone 1108 in FIG. 17, and the angle between the two sides or edges of the cone, such as shown in FIG. 17, is less than 60 degrees. In another embodiment, the angle between the two sides or edges of the cone is less than 45 degrees.

In a number of embodiments described above, the directional speaker generates ultrasonic signals in the range of 40 kHz. One of the reasons to pick such a frequency is for power efficiency. However, to reduce leakage, cross talk or to enhance privacy, in other embodiments, the ultrasonic signals utilized can be between 200 kHz to 1 MHz. It can be generated by multilayer piezoelectric thin films, or other types of solid state devices. Since the carrier frequency is at a higher frequency range than 40 kHz, the absorption/attenuation coefficient by air is considerably higher. For example, at 500 kHz, in one calculation, the attenuation coefficient $\alpha$ can be about 4.6, implying that the ultrasonic wave will be attenuated by $\exp(-\alpha^*z)$ or about 40 dB/m. As a result, the waves are more quickly attenuated, reducing the range of operation of the speaker in the propagation direction of the ultrasonic waves. On the other hand, privacy is enhanced and audible interference to others is reduced.

The 500 kHz embodiment can be useful in a confined environment, such as inside a car. The beam can emit from the dashboard towards the ceiling of the car. In one embodiment, there can be a reflector at the ceiling to reflect the beam to the desired direction or location. In another embodiment, the beam can be further confined in a cavity or waveguide, such as a tube, inside the car. The beam goes through some distance inside the cavity, such as 2 feet, before emitting into free space within the car, and then received by a person, without the need for a reflector.

A number of embodiments of directional speakers have also been described where the resultant propagation direction of the ultrasonic waves is not orthogonal to the horizontal, but at, for example, 45 degrees. The ultrasonic waves can be at an angle so that the main beam of the waves is approximately pointed at an ear of the user. In another embodiment, the propagation direction of the ultrasonic waves can be approximately orthogonal to the horizontal. Such a speaker does not have to be on a wedge or a step. It can be on a surface that is substantially parallel to the horizontal. For example, the speaker can be on the shoulder of a user, and the ultrasonic waves propagate upwards, instead of at an angle pointed at an ear of the user. If the ultrasonic power is sufficient, the waves would have sufficient acoustic power even when the speaker is not pointing exactly at the ear.

One approach to explain the sufficiency in acoustic power is that the ultrasonic speaker generates virtual sources in the direction of propagation. These virtual sources generate secondary acoustic signals in numerous directions, not just along the propagation direction. This is similar to the antenna pattern which gives non-zero intensity in numerous directions away from the direction of propagation. In one such embodiment, the acoustic power is calculated to be from 45 to 50 dB SPL if (a) the ultrasonic carrier frequency is 500 kHz; (b) the audio frequency is 1 kHz; (c) the emitter size of the speaker is 3 cm×3 cm; (d) the emitter power (peak) is 140 dB SPL; (e) the emitter is positioned at 10 to 15 cm away from the ear, such as located on the shoulder of the user; and (f) with the ultrasonic beam pointing upwards, not towards the ear, the center of the ultrasonic beam is about 2-5 cm away from the ear.

In one embodiment, the ultrasonic beam is considered directed towards the ear as long as any portion of the beam, or the cone of the beam, is immediately proximate to, such as within 7 cm of, the ear. The direction of the beam does not have to be pointed at the ear. It can even be orthogonal to the ear, such as propagating up from one's shoulder, substantially parallel to the face of the person.

In yet another embodiment, the emitting surface of the ultrasonic speaker does not have to be flat. It can be designed to be concave or convex to eventually create a diverging ultrasonic beam. For example, if the focal length of a convex surface is f, the power of the ultrasonic beam would be 6 dB down at a distance of f from the emitting surface. To illustrate numerically, if f is equal to 5 cm, then after 50 cm, the ultrasonic signal would be attenuated by 20 dB.

A number of embodiments have been described where a device is attachable to the clothing worn by a user. In one embodiment, attachable to the clothing worn by a user includes wearable by the user. For example, the user can wear a speaker on his neck, like a pendant on a necklace. This also would be considered as attachable to the clothing worn by the user. From another perspective, the necklace can be considered as the "clothing" worn by the user, and the device is attachable to the necklace.

One or more of the above-described embodiments can be combined. For example, two directional speakers can be positioned one on each side of a notebook computer. As the user is playing games on the notebook computer, the user can communicate with other players using the microphone on the notebook computer and the directional speakers, again without taking his hands off a keyboard or a game console. Since the speakers are directional, audio signals are more confined to be directed to the user in front of the notebook computer.

Figure 25:
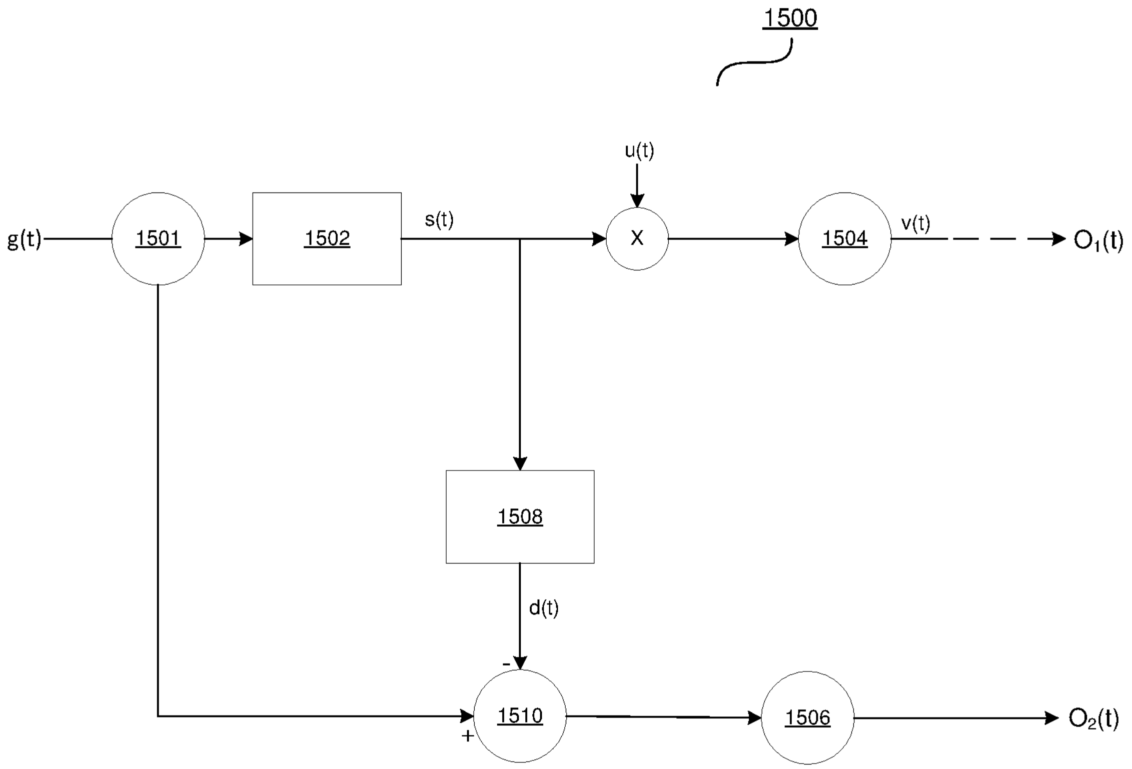
FIG. 25 shows a speaker apparatus including an ultrasonic speaker and a standard speaker according to another embodiment.

As described above, different embodiments can have at least two speakers, one ultrasonic speaker and one standard (non-ultrasonic) speaker. FIG. 25 shows such a speaker arrangement 1500 according to one embodiment. In one embodiment, the speaker arrangement 1500 includes at least one ultrasonic speaker 1504 and at least one standard speaker 1506. The ultrasonic speaker 1504 can be configured to generate ultrasonic output signals v(t). The ultrasonic output signals v(t) can be transformed via a non-linear media, such as air, into ultrasonic-transformed audio output signals $O_1$(t). The standard speaker 1506 can be a speaker that generates standard audio output signals $O_2$(t).

A standard speaker 1506 can be audio signals (or audio sound) generated directly from the speaker 1506 without the need for non-linear transformation of ultrasonic signals. For example, the standard speaker 1506 can be an audio speaker. As one example, a standard speaker can be a speaker that is configured to output signals in the audio frequency range. As another example, a standard speaker can be a speaker that is configured to not generate ultrasonic frequencies. As yet another example, a standard speaker can be a speaker that is configured to not respond to ultrasonic frequency excitation at its input.

Figure 26:
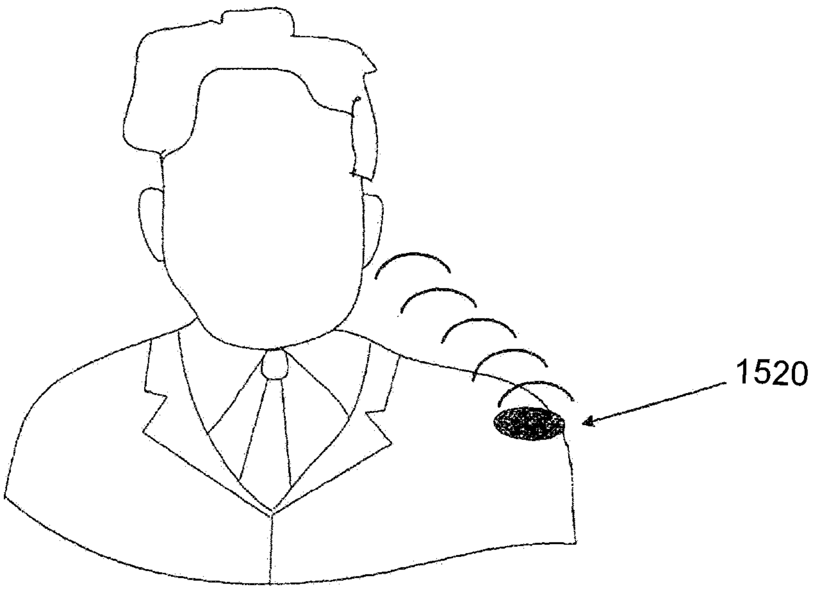
FIG. 26 shows a speaker apparatus on a shoulder of a person according to one embodiment.

In one approach, the speaker arrangement 1500 with both speakers 1504 and 1506 can be embodied in a portable unit, which can be made suitable for portable or wearable applications. The portable unit can be placed near a user's shoulder, with its resulting audio outputs configured to be directed to one of the ears of the user. FIG. 26 shows one example of such a wearable device 1520. In another approach, the speaker arrangement 1500 with both speakers 1504 and 1506 can be embodied in a stationary unit, such as an entertainment unit, or can in general be stationary, such as mounted to a stationary object, like on a wall.

In one embodiment, the embodiment shown in FIG. 25 can also include a number of signal processing mechanisms. In one embodiment, audio input signals g(t) can be separated into two sectors (or ranges), a high frequency sector and a low frequency sector. The ultrasonic speaker 1504 can be responsible for the high frequency sector, while the standard speaker 1506 can be responsible for the low frequency sector. The high frequency sector of the audio input signals g(t) can be pre-processed by a pre-processor or a pre-processing compensator 1502 to generate pre-processed signals s(t). The pre-processed signals s(t) can be used to modulate ultrasonic carrier signals u(t). The modulated ultrasonic signals can serve as inputs to the ultrasonic speaker 1504 to produce ultrasonic output signals v(t). In one embodiment, the ultrasonic carrier signals u(t) can be represented as sin ($2\pi f_c t$). The ultrasonic output signals v(t) are relatively directionally constrained as they propagate, such as, in air. Also, as they propagate, the ultrasonic output signals v(t) can be self-demodulated into ultrasonic-transformed audio output signals $O_1$ (t).

In one embodiment, the pre-processing compensator 1502 can be configured to enhance signal quality by, for example, compensating for at least some of the non-linear distortion effect in the ultrasonic-transformed audio output signals $O_1$(t). An example of a pre-processing scheme is Single-Side Band (SSB) modulation. A number of other pre-processing schemes or compensation schemes have previously been described above.

Self-demodulation process in air of the ultrasonic output signals v(t) can lead to a −12 dB/octave roll-off. With air being a weak non-linear medium, one approach to compensate for the roll-off is to increase the signal power, such as the power of the audio input signals g(t) or the input power to the ultrasonic speaker 1504. In one embodiment, the ultrasonic speaker 1504 can have a relatively small aperture. For example, the aperture can be approximately circular, with a diameter in the order of a few centimeters, such as 5 cm. One way to provide higher ultrasonic power is to use a larger aperture for the ultrasonic speaker 1504.

During self-demodulation, if the ultrasonic-transformed audio output signals (t) include signals in the low frequency sector, those signals typically can be significantly attenuated, which can cause pronounced loss of fidelity in the signals. One way to compensate for such loss can be to significantly increase the power in the low frequency sector of the audio input signals g(t), or the pre-processed signals s(t). But such high input power can drive the ultrasonic speaker 1504 into saturation.

In one embodiment shown in FIG. 25, the speaker arrangement 1500 can include a pre-processing compensator 1502 configured to apply to the high frequency sector of the audio input signals g(t), but not to the low frequency sector of the audio input signals g(t). In one embodiment, the pre-processing compensator 1502 can substantially block or filter signals in the low frequency sector, such that they are not subsequently generated via self-demodulation in air. In another embodiment, a filter 1501 can filter the audio input signals g(t) such that signals in the high frequency sector can be substantially channeled to the pre-processing compensator 1502 and signals in the low frequency sector can be substantially channeled to the standard speaker 1506.

In one embodiment, the standard speaker 1506 can be responsible for generating the audio output signals in the low frequency sector. Since a standard speaker 1506 is typically more efficient (i.e., better power efficiency) than an ultrasonic speaker, particularly, in some instances, in generating signals in the low frequency sector, power efficiency of the speaker arrangement can be significantly improved, with the operating time of the power source correspondingly increased.

In one embodiment, the speaker arrangement 1500 can optionally provide a distortion compensation unit 1508 to provide additional distortion compensation circuitry. FIG. 25 shows another embodiment where the standard speaker 1506 can also generate signals to further compensate for distortion in the ultrasonic-transformed audio output signals $O_1$(t). This embodiment can include a feedback mechanism. In one embodiment of this approach, a distortion compensation unit 1508 can try to simulate the non-linear distortion effect due to self-demodulation in air. For example, the distortion compensation unit 1508 can include differentiating electronics to twice differentiate the pre-processed signals s(t) to generate the distortion compensated signals d(t). The distortion compensated signals d(t) can then be subtracted from the audio input signals g(t) by a combiner 1510. The output from the combiner 1510 (the subtracted signals) can serve as inputs to the standard audio speaker 1506. For such an embodiment, distortion in the ultrasonic-transformed audio output signals (t), in principle, can be significantly (or even completely) cancelled by the corresponding output in the standard audio output signals $O_2$(t). Thus, with the assistance of the distortion compensation unit 1508, signal distortion due to the non-linear effect, in principle, can be significantly or even completely compensated, despite the difficult non-linear self-demodulation process.

One embodiment produces directional audio output signals without the need of a filter to separate the audio input signals g(t) into low frequency signals and high frequency signals. The embodiment includes a pre-processor 1502, a distortion compensation unit 1508, a modulator, an ultrasonic speaker 1504, a standard audio speaker 1506, and a combiner 1510. The pre-processor 1502 can be operatively connected to receive at least a portion of the audio input signals g(t) and to perform predetermined preprocessing on the audio input signals to produce pre-processed signals s(t). The distortion compensation unit 1508 can be operatively connected to the pre-processor 1502 to produce distortion compensated signals d(t) from the pre-processed signals s(t). The modulator can be operatively connected to the pre-processor 1502 to modulate ultrasonic carrier signals u(t) by the pre-processed signals s(t) thereby producing modulated ultrasonic signals. The ultrasonic speaker 1504 can be operatively connected to the modulator to receive the modulated ultrasonic signals and to output ultrasonic output signals v(t), which can be transformed into a first portion $O_1(t)$ of the audio output signals. The combiner 1510 can be operatively connected to the distortion compensation unit 1508 to subtract the distortion compensated signals d(t) from at least a portion of the audio input signals g(t) to generate inputs for the standard audio speaker 1506 to output a second portion $O_2(t)$ of the audio output signals.

In one embodiment, digital signal processing (DSP) algorithms can be used to compute the electronics of the pre-processing compensator 1502. DSP algorithms can also be used to compute electronics in the distortion compensation unit 1508 to generate the distortion compensated signals d(t). Such algorithms can be used to compensate for the non-linear distortion effect in the audio output signals.

In one approach, the high frequency sector can be frequencies exceeding 500 Hz. In another embodiment, the high frequency sector can be frequencies exceeding 1 kHz.

In one embodiment, with a standard speaker being responsible for the low frequency sector and an ultrasonic speaker being responsible for the high frequency sector of the audio output signals, signals in the low frequency sector are typically more omni-directional than signals in the high frequency sector of the audio output signals. There are a number of approaches to reduce the possibility of compromising privacy due to signals in the low frequency sector being more omni-directional. In one embodiment, the standard speaker 1506 can be configured to generate signals that are angularly constrained (e.g., to certain degrees), such as using a cone-shaped output device. In another embodiment, the power for the low frequency sector can be reduced. With the power intensity of the low frequency sector lowered, their corresponding audio output signals could be more difficult to discern.

Another embodiment to improve privacy is to inject into the pre-processed signals s(t), some random noise-like signals. The random noise-like signals again can be used to modulate the ultrasonic carrier signals u(t), and can be used as inputs to the distortion compensation unit 1508. With the random noise-like signals being injected into the signal streams, positively (to the ultrasonic speaker) and negatively (to the standard speaker), their effect would be substantially cancelled at the desired user's ear. However, for the people who would hear little or none of the ultrasonic-transformed audio output signals $O_1(t)$, but would hear outputs from the standard speaker 1506, the random noise-like signals from the standard speaker 1506 would be more pronounced.

One way to represent the approximate extent of the ultrasonic-transformed audio output signals $O_1(t)$ from the ultrasonic speaker 1504 is via a virtual column. It can be a fictitious column where one can hear the audio signals or audio sound. The length of the virtual column of the ultrasonic speaker 1504 is typically limited by the attenuation of the ultrasonic signals in air. A lower ultrasonic frequency, such as below 40 kHz, leads to a longer (or a deeper) virtual column, while a higher ultrasonic frequency typically leads to a shorter virtual column.

In one embodiment, the ultrasonic speaker 1504 can be configured to be for portable or wearable applications, where at least one of the ears of a user can be relatively close to the speaker. For example, the speaker 1504 can be attached or worn on a shoulder of the user. In this situation, the virtual column does not have to be very long, and can be restricted in length to, for example, 20 cm. This is because the distance between the shoulder and one of the user's ears is typically not much more than 20 cm. Though a higher ultrasonic frequency typically has a higher attenuation, if the virtual column can be short, the effect of a higher attenuation may not be detrimental to usability. However, a higher attenuation can improve signal isolation or privacy.

In one embodiment, a standard speaker and an ultrasonic speaker can be in a unit, and the unit further includes a RF wireless transceiver, such as a short-range wireless communication device (e.g. Bluetooth device). The transceiver can be configured to allow the unit to communicate with another device, which can be a mobile phone.

In one embodiment, the ultrasonic output signals v(t) from an ultrasonic speaker can be steerable. One approach to steer uses phase array beam steering techniques.

In one embodiment, the size of a unit with both a standard speaker and an ultrasonic speaker is less than 5 cm×5 cm×1 cm, and can be operated by battery. The battery can be chargeable.

In one embodiment, an ultrasonic speaker can be implemented by at least a piezoelectric thin film transducer, a bimorph piezoelectric transducer or a magnetic film transducer.

In one embodiment, an ultrasonic speaker can be a piezoelectric transducer. The transducer includes a piezoelectric thin film, such as a polyvinylidiene di-flouride (PVDF) film, deposited on a plate with a number of cylindrical tubes to create mechanical resonances. The film can be attached to the perimeter of the plate of tubes and can be biased by electrodes. Appropriate voltages applied via the electrodes to the piezoelectric thin film can create vibrations of the thin film, which in turn can generate modulated ultrasonic signals.

In another embodiment, the ultrasonic speaker can be a magnetic film transducer, which includes a magnetic coil thin film transducer with a permanent magnet. The thin film can vibrate up to 0.5 mm, which can be higher in magnitude than a piezoelectric thin film transducer.

In one embodiment, a unit with a standard speaker and an ultrasonic speaker, similar to the different embodiments as disclosed herein, can be configured to be used for a directional hearing enhancement system. Different embodiments have been described regarding a hearing enhancement system in U.S. patent application Ser. No. 10/826,527, filed Apr. 15, 2004, and entitled, "DIRECTIONAL HEARING ENHANCEMENT SYSTEMS," which is hereby incorporated herein by reference.

In one embodiment, a unit with a standard speaker and an ultrasonic speaker, similar to the different embodiments as disclosed herein, can be configured to be used for a portable electronic device. Different embodiments have been described regarding a portable electronic device in U.S. patent application Ser. No. 10/826,531, filed Apr. 15, 2004, and entitled, "DIRECTIONAL SPEAKER FOR PORTABLE ELECTRONIC DEVICE," which is hereby incorporated herein by reference.

In one embodiment, a unit with a standard speaker and an ultrasonic speaker, similar to the different embodiments as disclosed herein, can be configured to be used for localized delivery of audio sound. Different embodiments have been described regarding localized delivery of audio sound in U.S. patent application Ser. No. 10/826,537, filed Apr. 15, 2004, and entitled, "METHOD AND APPARATUS FOR LOCALIZED DELIVERY OF AUDIO SOUND FOR ENHANCED PRIVACY," which is hereby incorporated herein by reference.

In one embodiment, a unit with a standard speaker and an ultrasonic speaker, similar to the different embodiments as disclosed herein, can be configured to be used for wireless audio delivery. Different embodiments have been described regarding wireless audio delivery in U.S. patent application Ser. No. 10/826,528, filed Apr. 15, 2004, and entitled, "METHOD AND APPARATUS FOR WIRELESS AUDIO DELIVERY," which is hereby incorporated herein by reference.

Figure 27:
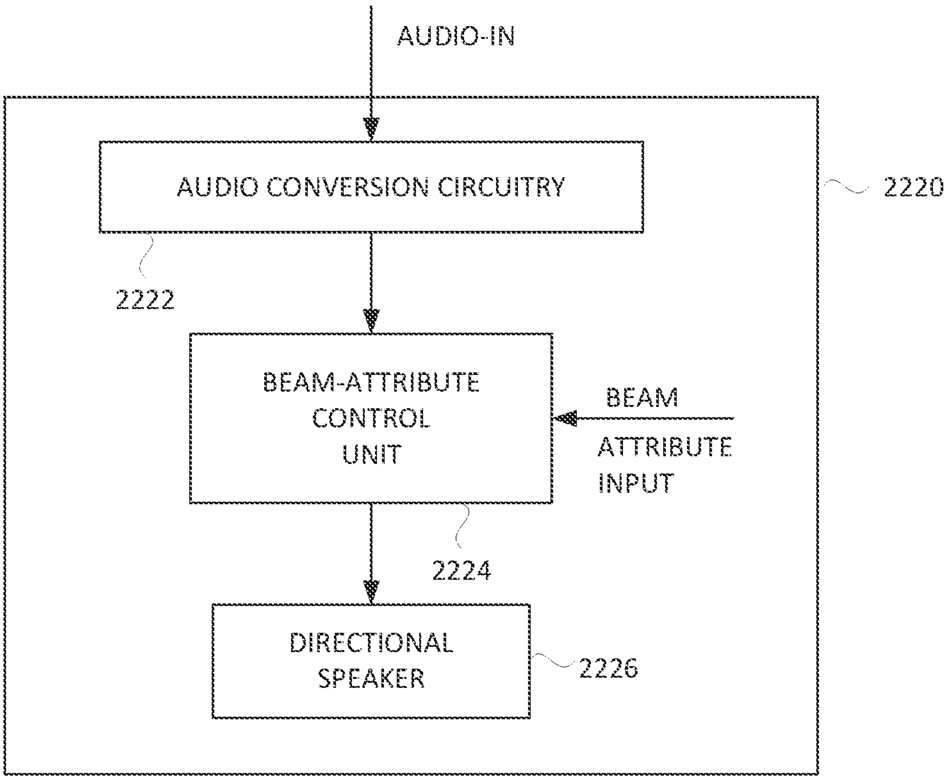
FIG. 27 is a block diagram of a directional audio delivery device according to an embodiment of the invention.

FIG. 27 is a block diagram of a directional audio delivery device 2220 according to an embodiment of the invention.

The directional audio delivery device 2220 includes audio conversion circuitry 1222, a beam-attribute control unit 2224 and a directional speaker 2226. The audio conversion circuitry 2222 converts the received audio signals into ultrasonic signals. The directional speaker 2226 receives the ultrasonic signals and produces an audio output. The beam-attribute control unit 2224 controls one or more attributes of the audio output.

One attribute can be the beam direction. The beam-attribute control unit 2224 receives a beam attribute input, which in this example is related to the direction of the beam. This can be known as a direction input. The direction input provides information to the beam-attribute control unit 2224 pertaining to a propagation direction of the ultrasonic output produced by the directional speaker 2226. The direction input can be a position reference, such as a position for the directional speaker 2226 (relative to its housing), the position of a person desirous of hearing the audio sound, or the position of an external electronic device (e.g., remote controller). Hence, the beam-attribute control unit 2224 receives the direction input and determines the direction of the audio output.

Another attribute can be the desired distance to be traveled by the beam. This can be known as a distance input. In one embodiment, the ultrasonic frequency of the audio output can be adjusted. By controlling the ultrasonic frequency, the desired distance traveled by the beam can be adjusted. This will be further explained below. Thus, with the appropriate control signals, the directional speaker 2226 generates the desired audio output accordingly.

One way to control the audio output level to be received by other users is through the distance input. By controlling the distance the ultrasonic output travels, the directional audio delivery device can minimize the audio output that might reach other persons.

Figure 28:
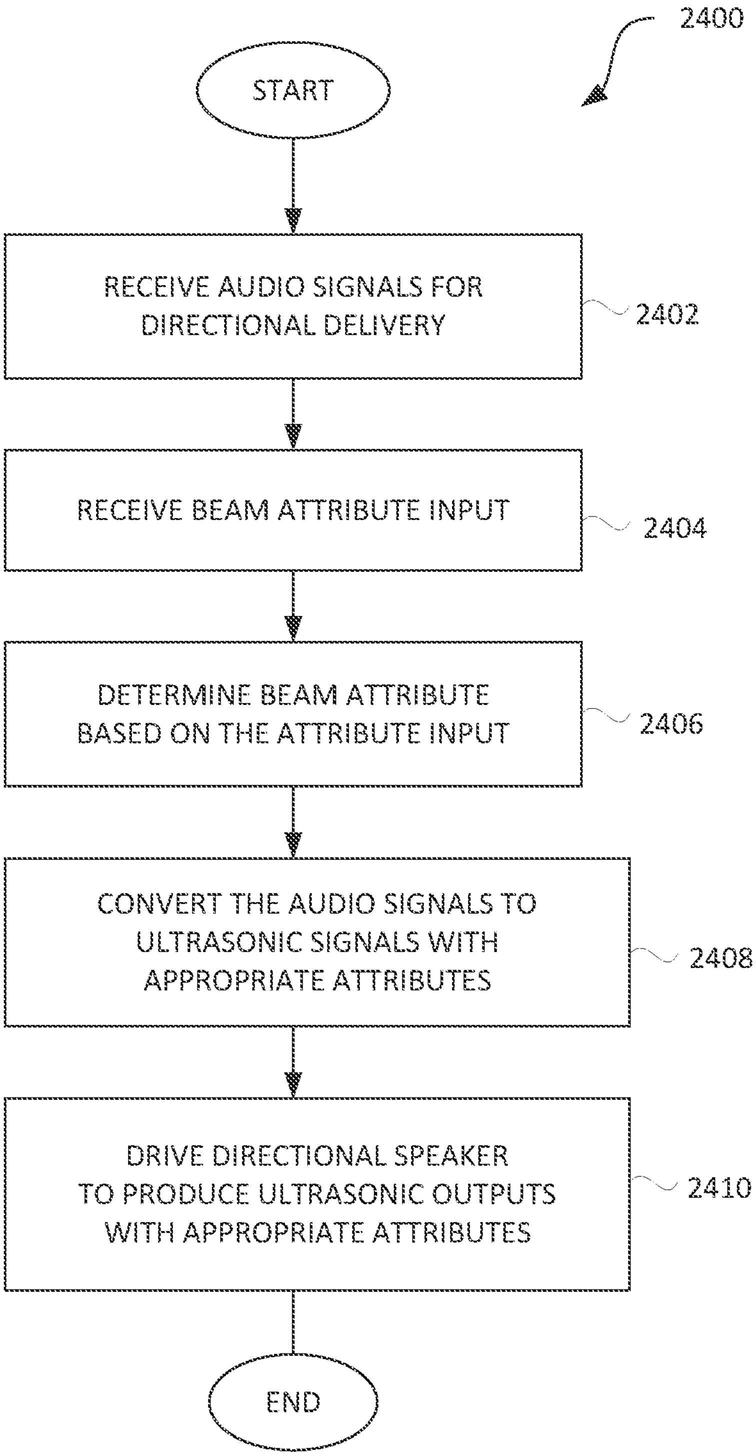
FIG. 28 is a flow diagram of directional audio delivery processing according to an embodiment of the invention.

FIG. 28 is a flow diagram of directional audio delivery processing 2400 according to an embodiment of the invention. The directional audio delivery processing 2400 is, for example, performed by a directional audio delivery device. More particularly, the directional audio delivery processing 2400 is particularly suitable for use by the directional audio delivery device 2220 illustrated in FIG. 27.

The directional audio delivery processing 2400 initially receives 2402 audio signals for directional delivery. The audio signals can be supplied by an audio system. In addition, a beam attribute input is received 2404. As previously noted, the beam attribute input is a reference or indication of one or more attributes regarding the audio output to be delivered. After the beam attribute input has been received 2404, one or more attributes of the beam are determined 2406 based on the attribute input. If the attribute pertains to the direction of the beam, the input can set the constrained delivery direction of the beam. The constrained delivery direction is the direction that the output is delivered. The audio signals that were received are converted 2408 to ultrasonic signals with appropriate attributes, which may include one or more of the determined attributes. Finally, the directional speaker is driven 2410 to generate ultrasonic output again with appropriate attributes. In the case where the direction of the beam is set, the ultrasonic output is directed in the constrained delivery direction. Following the operation 2410, the directional audio delivery processing 2400 is complete and ends. Note that the constrained delivery direction can be altered dynamically or periodically, if so desired.

Figure 29:
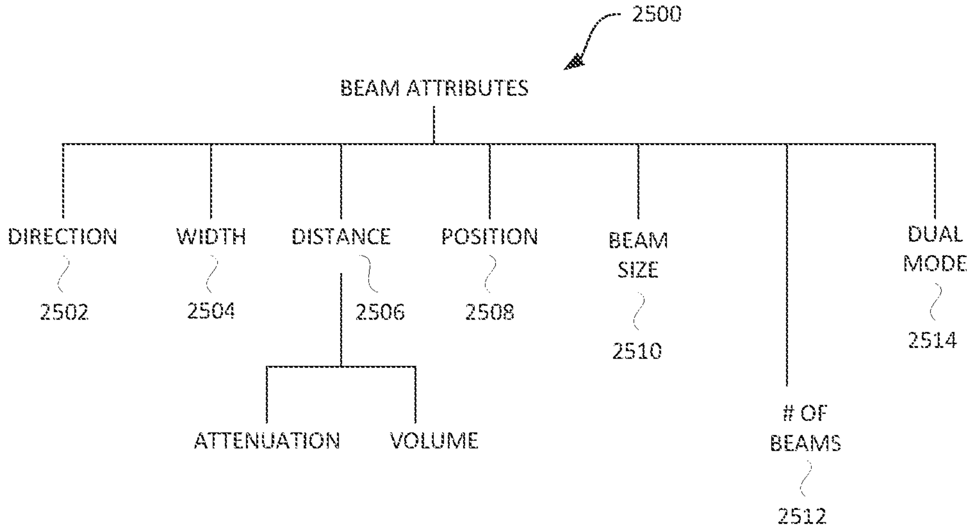
FIG. 29 shows examples of attributes of the constrained audio output according to the invention.

FIG. 29 shows examples of beam attributes 2500 of the constrained audio output according to the invention. These beam attributes 2500 can be provided either automatically, such as periodically, or manually, such as at the request of a user. The attributes can be for the beam-attribute control unit 2224. One attribute, which has been previously described, is the direction 2502 of the beam. Another attribute can be the beam width 2504. In other words, the width of the ultrasonic output can be controlled. In one embodiment, the beam width is the width of the beam at the desired position. For example, if the desired location is 10 feet directly in front of the directional audio apparatus, the beam width can be the width of the beam at that location. In another embodiment, the width 2504 of the beam is defined as the width of the beam at its full-width-half-max (FWHM) position.

The desired distance 2506 to be covered by the beam can be set. In one embodiment, the rate of attenuation of the ultrasonic output/audio output can be controlled to set the desired distance. In another embodiment, the volume or amplification of the beam can be changed to control the distance to be covered. Through controlling the desired distance, other persons in the vicinity of the person to be receiving the audio signals (but not adjacent thereto) would hear little or no sound. If sound were heard by such other persons, its sound level would have been substantially attenuated (e.g., any sound heard would be faint and likely not discernable).

There are also other types of beam attribute inputs. For example, the inputs can be the position 2508, and the size 2510 of the beam. The position input can pertain to the position of a person desirous of hearing the audio sound, or the position of an electronic device (e.g., remote controller). Hence, the beam-attribute control unit 2224 receives the beam position input and the beam size input, and then determines how to drive the directional speaker to output the audio sound to a specific position with the appropriate beam width. Then, the beam-attribute control unit 2224 produces drive signals, such as ultrasonic signals and other control signals. The drive signals controls the directional speaker to generate the ultrasonic output towards a certain position with a particular beam size.

There can be more than one beam. Hence, one attribute of the beam is the number 2512 of beams present. Multiple beams can be utilized, such that multiple persons are able to receive the audio signals via the ultrasonic output by the directional speaker (or a plurality of directional speakers). Each beam can have its own attributes.

There can also be a dual mode operation 2514 having a directional mode and a normal mode. The directional audio apparatus can include a normal speaker (e.g., substantially omni-directional speaker). There are situations where a user would prefer the audio output to be heard by everyone in a room, for example. Under this situation, the user can deactivate the directional delivery mechanism of the apparatus, or can allow the directional audio apparatus to channel the audio signals to the normal speaker to generate the audio output. In one embodiment, a normal speaker generates its audio output based on audio signals, without the need for generating ultrasonic outputs. However, a directional speaker requires ultrasonic signals to generate its audio output.

In one embodiment, the beam from a directional speaker can propagate towards the ceiling of a building, which reflects the beam back towards the floor to be received by users. One advantage of such an embodiment is to lengthen the propagation distance to broaden the width of the beam when it reaches the users. Another feature of this embodiment is that the users do not have to be in the line-of-sight of the directional audio apparatus.

Figure 30:
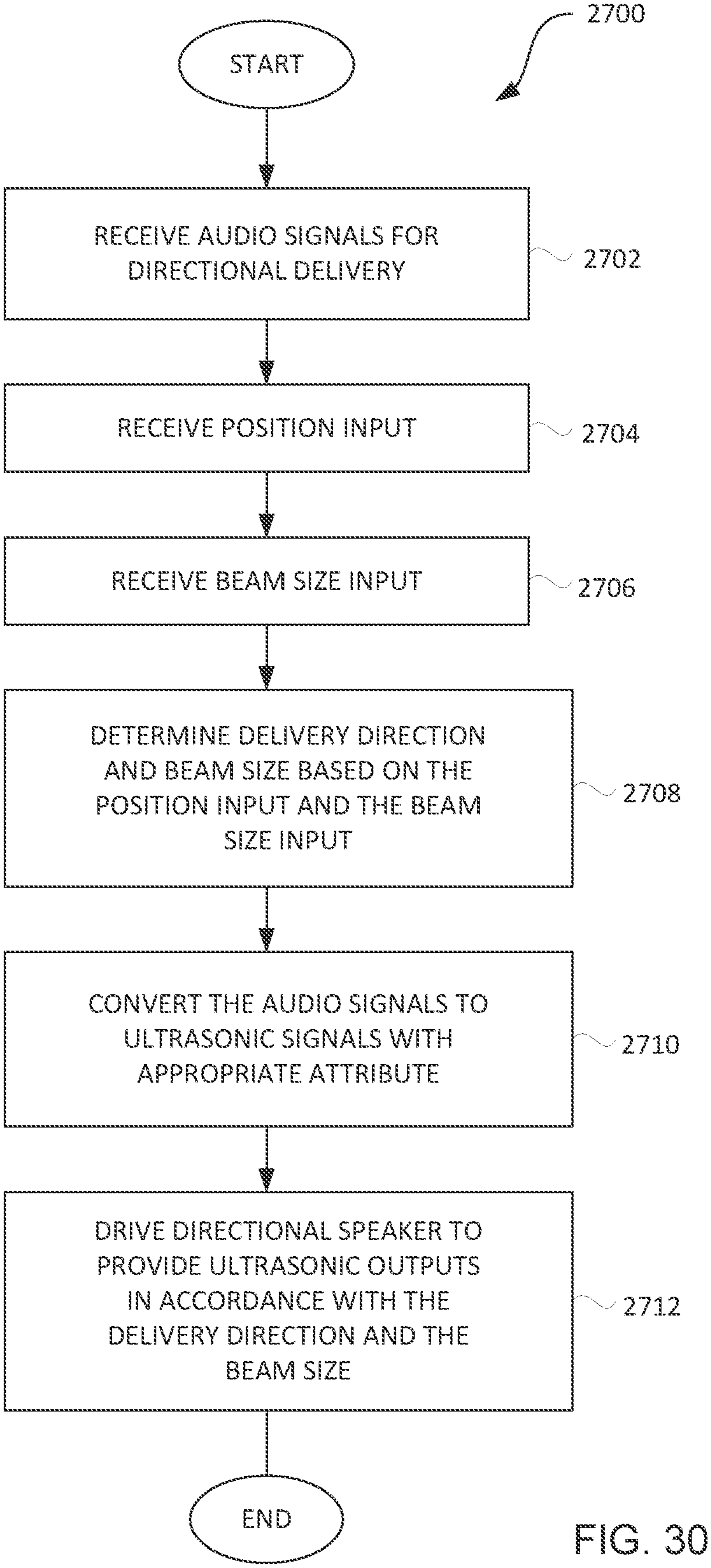
FIG. 30 is a flow diagram of directional audio delivery processing according to another embodiment of the invention.

FIG. 30 is a flow diagram of directional audio delivery processing 2700 according to another embodiment of the invention. The directional audio delivery processing 2700 is, for example, performed by a directional audio delivery device. More particularly, the directional audio delivery processing 2700 is particularly suitable for use by the directional audio delivery device 2220 illustrated in FIG. 27.

The directional audio delivery processing 2700 receives 2702 audio signals for directional delivery. The audio signals are provided by an audio system. In addition, two beam attribute inputs are received, and they are a position input 2704 and a beam size input 2706. Next, the directional audio delivery processing 2700 determines 2708 a delivery direction and a beam size based on the position input and the beam size input. The desired distance to be covered by the beam can also be determined. The audio signals are then converted 2710 to ultrasonic signals, with the appropriate attributes. For example, the frequency and/or the power level of the ultrasonic signals can be generated to set the desired travel distance of the beam. Thereafter, a directional speaker (e.g., ultrasonic speaker) is driven 2712 to generate ultrasonic output in accordance with, for example, the delivery direction and the beam size. In other words, when driven 2712, the directional speaker produces ultrasonic output (that carries the audio sound) towards a certain position, with a certain beam size at that position. In one embodiment, the ultrasonic signals are dependent on the audio signals, and the delivery direction and the beam size are used to control the directional speaker. In another embodiment, the ultrasonic signals can be dependent on not only the audio signals but also the delivery direction and the beam size. Following the operation 2712, the directional audio delivery processing 2700 is complete and ends.

Figure 31A:
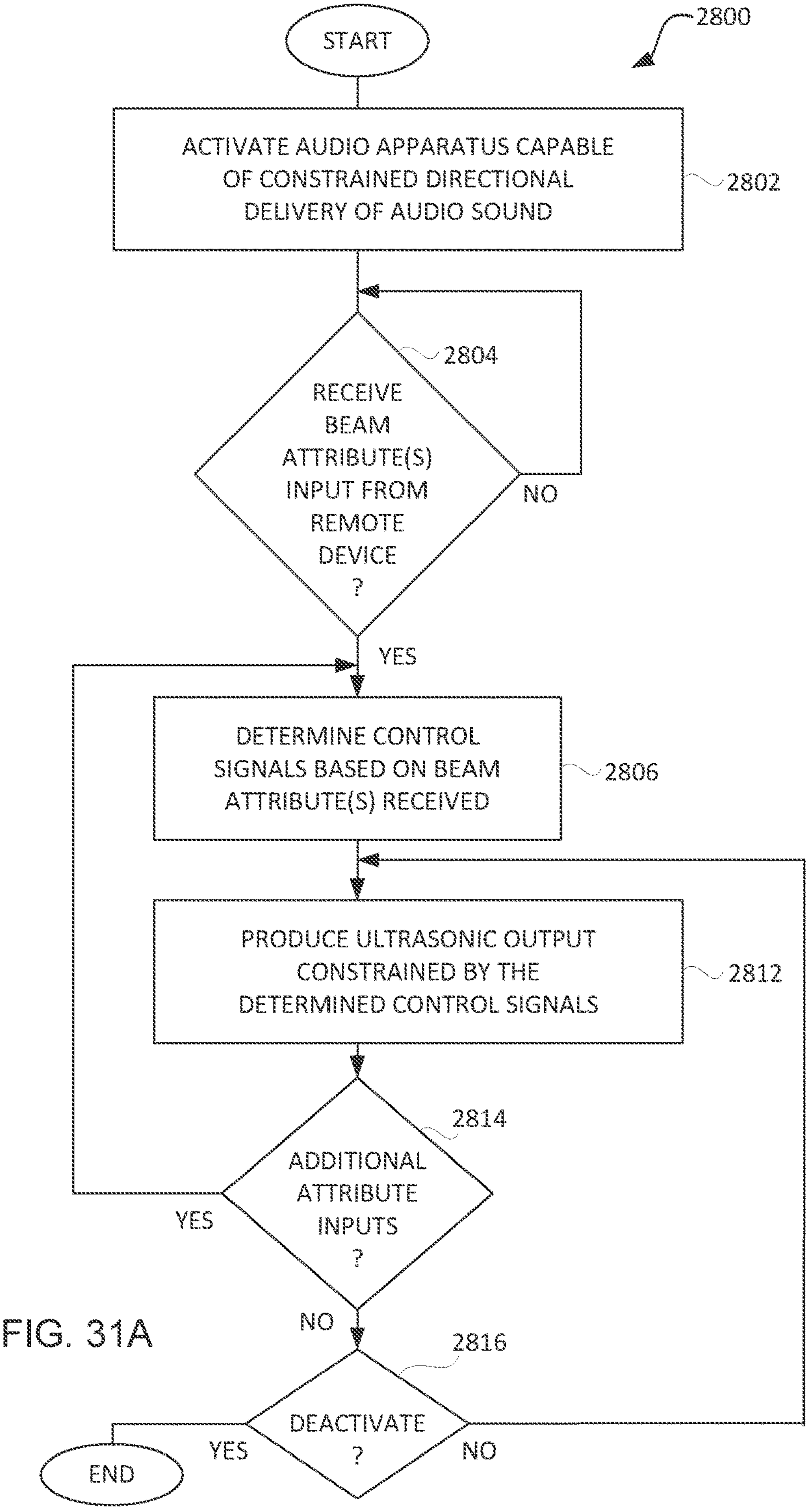
FIG. 31A is a flow diagram of directional audio delivery processing according to yet another embodiment of the invention.

FIG. 31A is a flow diagram of directional audio delivery processing 2800 according to yet another embodiment of the invention. The directional audio delivery processing 2800 is, for example, suitable for use by a directional audio delivery device. More particularly, the directional audio delivery processing 2800 is particularly suitable for use by the directional audio delivery device 2220 illustrated in FIG. 27, with the beam attribute inputs being beam position and beam size received from a remote device.

The directional audio delivery processing 2800 initially activates a directional audio apparatus that is capable of constrained directional delivery of audio sound. A decision 2804 determines whether a beam attribute input has been received. Here, in accordance with one embodiment, the audio apparatus has associated with it a remote control device, and the remote control device can provide the beam attributes. Typically, the remote control device enables a user positioned remotely (e.g., but in line-of-sight) to change settings or characteristics of the audio apparatus. One beam attribute is the desired location of the beam. Another attribute is the beam size. According to the invention, a user of the audio apparatus might hold the remote control device and signal to the directional audio apparatus a position reference. This can be done by the user, for example, through selecting a button on the remote control device. This button can be the same button for setting the beam size because in transmitting beam size information, location signals can be relayed as well. The beam size can be signaled in a variety of ways, such as via a button, dial or key press, using the remote control device. When the decision 2804 determines that no attributes have been received from the remote control device, the decision 2804 can just wait for an input.

When the decision 2804 determines that a beam attribute input has been received from the remote control device, control signals for the directional speaker are determined 2806 based on the attribute received. If the attribute is a reference position, a delivery direction can be determined based on the position reference. If the attribute is for a beam size adjustment, control signals for setting a specific beam size are determined. Then, based on the control signals determined, the desired ultrasonic output that is constrained is produced 2812.

Next, a decision 2814 determines whether there are additional attribute inputs. For example, an additional attribute input can be provided to incrementally increase or decrease the beam size. The user can adjust the beam size, hear the effect and then further adjust it, in an iterative manner. When the decision 2814 determines that there are additional attribute inputs, appropriate control signals are determined 2806 to adjust the ultrasonic output accordingly. When the decision 2814 determines that there are no additional inputs, the directional audio apparatus can be deactivated. When the decision 2816 determines that the audio system is not to be deactivated, then the directional audio delivery processing 2800 returns to continuously output the constrained audio output. On the other hand, when the decision 2816 determines that the directional audio apparatus is to be deactivated, then the directional audio delivery processing 2800 is complete and ends.

Besides directionally constraining audio sound that is to be delivered to a user, the audio sound can optionally be additionally altered or modified in view of the user's hearing characteristics or preferences, or in view of the audio conditions in the vicinity of the user.

Figure 31B:
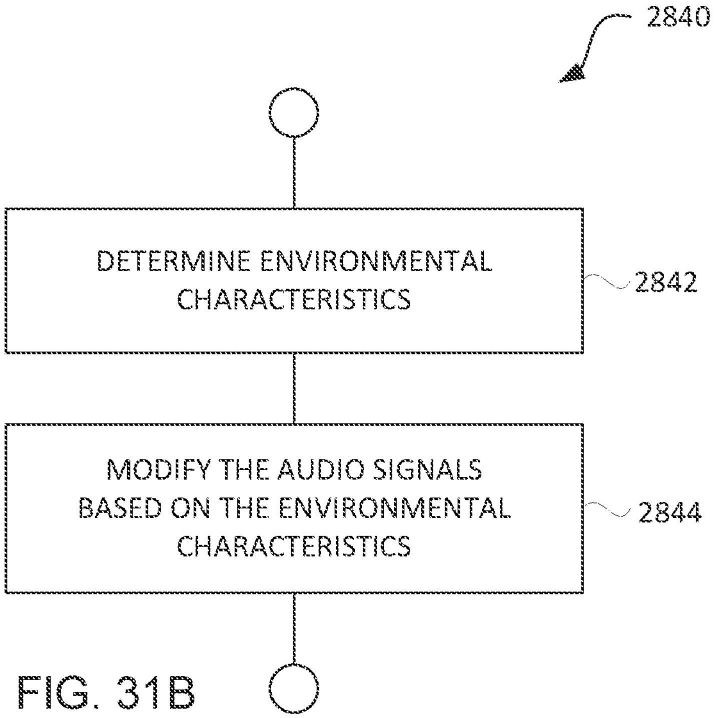
FIG. 31B is a flow diagram of an environmental accommodation process according to one embodiment of the invention.

FIG. 31B is a flow diagram of an environmental accommodation process 2840 according to one embodiment of the invention. The environmental accommodation process 2840 determines 2842 environmental characteristics. In one implementation, the environmental characteristics can pertain to measured sound (e.g., noise) levels at the vicinity of the user. The sound levels can be measured by a pickup device (e.g., microphone) at the vicinity of the user. The pickup device can be at the remote device held by the user. In another implementation, the environmental characteristics can pertain to estimated sound (e.g., noise) levels at the vicinity of the user. The sound levels at the vicinity of the user can be estimated based on a position of the user/device and/or the estimated sound level for the particular environment. For example, sound level in a department store is higher than the sound level in the wilderness. The position of the user can, for example, be determined by Global Positioning System (GPS) or other triangulation techniques, such as based on infrared, radio-frequency or ultrasound frequencies with at least three non-collinear receiving points. There can be a database with information regarding typical sound levels at different locations. The database can be accessed to retrieve the estimated sound level based on the specific location.

After the environmental accommodation process 2840 determines 2842 the environmental characteristics, the audio signals are modified based on the environmental characteristics. For example, if the user were in an area with a lot of noise (e.g., ambient noise), such as at a confined space with various persons or where construction noise is present, the audio signals could be processed to attempt to suppress the unwanted noise, and/or the audio signals (e.g., in a desired frequency range) could be amplified. One approach to suppress the unwanted noise is to introduce audio outputs that are opposite in phase to the unwanted noise so as to cancel the noise. In the case of amplification, if noise levels are excessive, the audio output might not be amplified to cover the noise because the user might not be able to safely hear the desired audio output. In other words, there can be a limit to the amount of amplification and there can be negative amplification on the audio output (even complete blockage) when excessive noise levels are present. Noise suppression and amplification can be achieved through conventional digital signal processing, amplification and/or filtering techniques. The environmental accommodation process 2840 can, for example, be performed periodically or if there is a break in audio signals for more than a preset amount of time. The break may signify that there is a new audio stream.

A user might have a hearing profile that contains the user's hearing characteristics. The audio sound provided to the user can optionally be customized or personalized to the user by altering or modifying the audio signals in view of the user's hearing characteristics. By customizing or personalizing the audio signals to the user, the audio output can be enhanced for the benefit or enjoyment of the user.

Figure 31C:
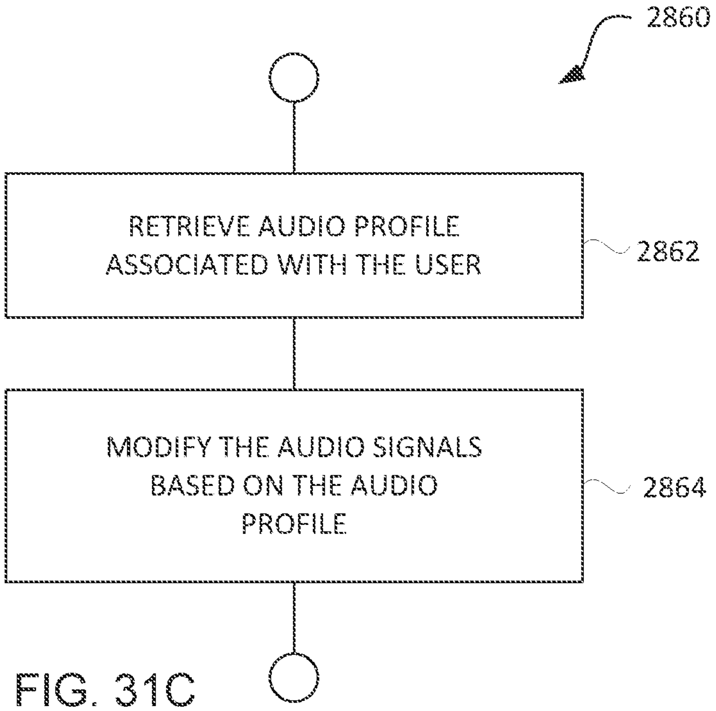
FIG. 31C is a flow diagram of audio personalization process according to one embodiment of the invention.

FIG. 31C is a flow diagram of an audio personalization process 2860 according to one embodiment of the invention. The audio personalization process 2860 retrieves 2862 an audio profile associated with the user. The hearing profile contains information that specifies the user's hearing characteristics. For example, the hearing characteristics may have been acquired by the user taking a hearing test. Then, the audio signals are modified 2864 or pre-processed based on the audio profile associated with the user.

The hearing profile can be supplied to a directional audio delivery device performing the personalization process 2860 in a variety of different ways. For example, the audio profile can be electronically provided to the directional audio delivery device through a network. As another example, the audio profile can be provided to the directional audio delivery device by way of a removable data storage device (e.g., memory card). Additional details on audio profiles and personalization to enhance hearing can be found in U.S. patent application Ser. No. 19/826,527, filed Apr. 15, 2004, now U.S. Pat. No. 7,388,962, entitled "DIRECTIONAL HEARING ENHANCEMENT SYSTEMS", which is hereby incorporated herein by reference.

The environmental accommodation process 2840 and/or the audio personalization process 2860 can optionally be performed together with any of the directional audio delivery devices or processes discussed above. For example, the environmental accommodation process 2840 and/or the audio personalization process 2860 can optionally be performed together with any of the directional audio delivery processes 2400, 2700 or 2800 embodiments discussed above with respect to FIGS. 28, 30 and 31. The environmental accommodation process 2840 and/or the audio personalization process 2860 typically would precede the operation 2408 in FIG. 28, the operation 2710 in FIG. 30 and/or the operation 2812 in FIG. 31A.

Figure 32A:
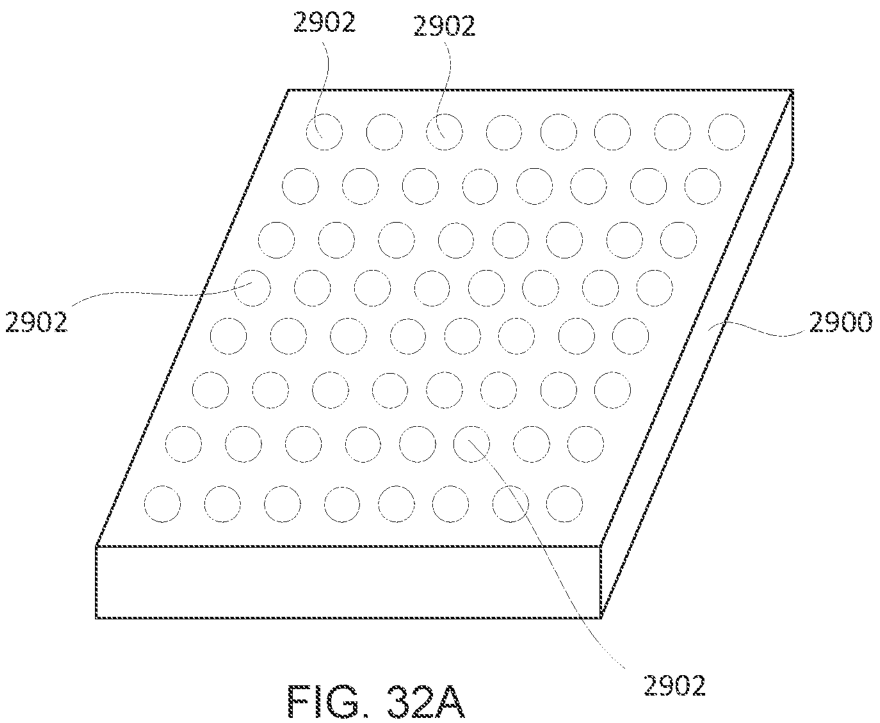
FIG. 32A is a perspective diagram of an ultrasonic transducer according to one embodiment of the invention.

FIG. 32A is a perspective diagram of an ultrasonic transducer 2900 according to one embodiment of the invention. The ultrasonic transducer 2900 can implement the directional speakers discussed herein. The ultrasonic transducer 2900 produces the ultrasonic output utilized as noted above. In one embodiment, the ultrasonic transducer 2900 includes a plurality of resonating tubes 2902 covered by a piezoelectric thin-film, such as PVDF, that is under tension. When the film is driven by a voltage at specific frequencies, the structure will resonate to produce the ultrasonic output.

Mathematically, the resonance frequency f of each eigen mode (n,s) of a circular membrane can be represented by:

$$f(n,s)=\alpha(n,s)/(2\pi a)*\sqrt{(S/m)}$$

where a is the radius of the circular membrane,

S is the uniform tension per unit length of boundary, and

M is the mass of the membrane per unit area.

For different eigen modes of the tube structure shown in FIG. 32A, $\alpha(0,0)=2.4$ $\alpha(0,1)=5.52$ $\alpha(0,2)=8.65$ Assume $\alpha(0,0)$ to be the fundamental resonance frequency, and is set to be at 50 kHz. Then, $\alpha(0,1)$ is 115 kHz, and $\alpha(0,2)$ is 180 kHz etc. The n=0 modes are all axisymmetric modes. In one embodiment, by driving the thin-film at the appropriate frequency, such as at any of the axisymmetric mode frequencies, the structure resonates, generating ultrasonic waves at that frequency.

Instead of using a membrane over the resonating tubes, in another embodiment, the ultrasonic transducer is made of a number of speaker elements, such as unimorph, bimorph or other types of multilayer piezoelectric emitting elements. The elements can be mounted on a solid surface to form an array. These emitters can operate at a wide continuous range of frequencies, such as from 40 to 200 kHz.

One embodiment to control the distance of propagation of the ultrasonic output is by changing the carrier frequency, such as from 40 to 200 kHz. Frequencies in the range of 200 kHz have much higher acoustic attenuation in air than frequencies around 40 kHz. Thus, the ultrasonic output can be attenuated at a much faster rate at higher frequencies, reducing the potential risk of ultrasonic hazard to health, if any. Note that the degree of attenuation can be changed continuously, such as based on multi-layer piezoelectric thin-film devices by continuously changing the carrier frequency. In another embodiment, the degree of isolation can be changed more discreetly, such as going from one eigen mode to another eigen mode of the tube resonators with piezoelectric membranes.

Figure 32B:
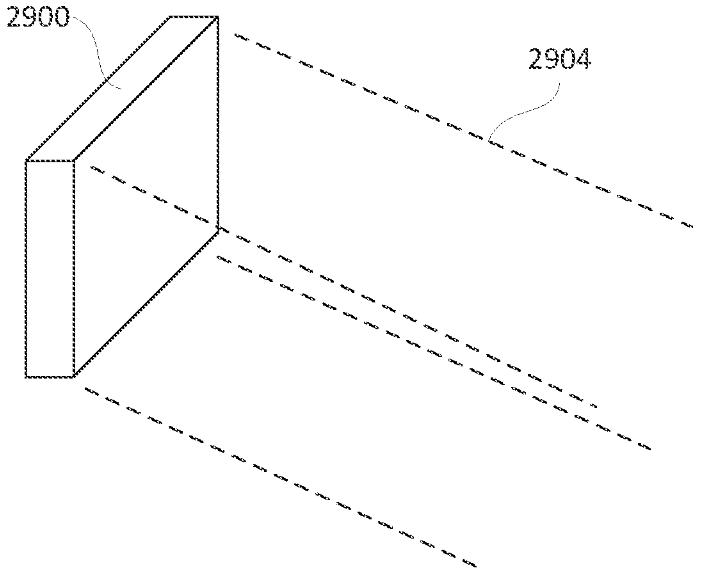
FIG. 32B is a diagram that illustrates the ultrasonic transducer with its beam being produced for audio output according to an embodiment of the invention.

FIG. 32B is a diagram that illustrates the ultrasonic transducer 2900 generating its beam 2904 of ultrasonic output.

Figure 32C:
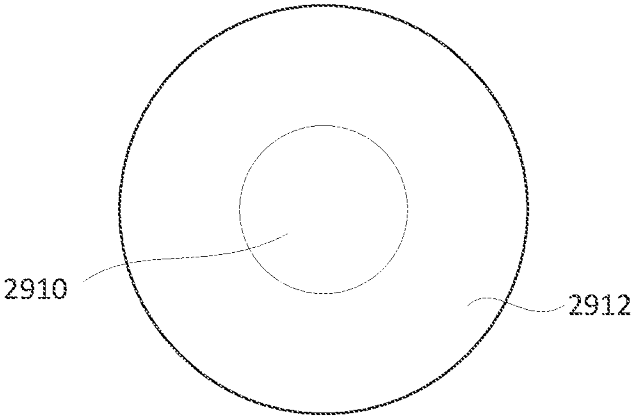
FIGS. 32C-32D illustrate two embodiments of the invention where the directional speakers are segmented.
Figure 32D:
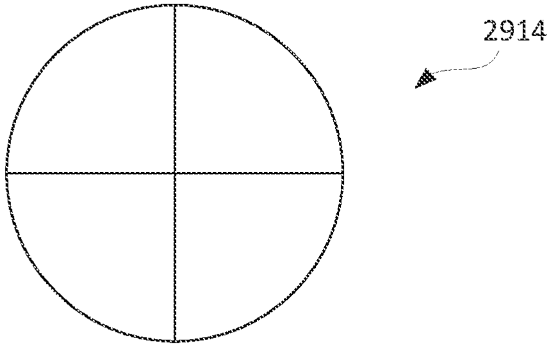

The width of the beam 2904 can be varied in a variety of different ways. For example, a reduced area or one segment of the transducer 2900 can be used to decrease the width of the beam 2904. In the case of a membrane over resonating tubes, there can be two concentric membranes, an inner one 2910 and an outer one 2912, as shown in FIG. 32C. One can turn on the inner one only, or both at the same time with the same frequency, to control the beam width. FIG. 32D illustrates another embodiment 2914, with the transducer segmented into four quadrants. The membrane for each quadrant can be individually controlled. They can be turned on individually, or in any combination to control the width of the beam. In the case of directional speakers using an array of bimorph elements, reduction of the number of elements can be used to reduce the size of the beam width. Another approach is to activate elements within specific segments to control the beam width.

Figure 32E:
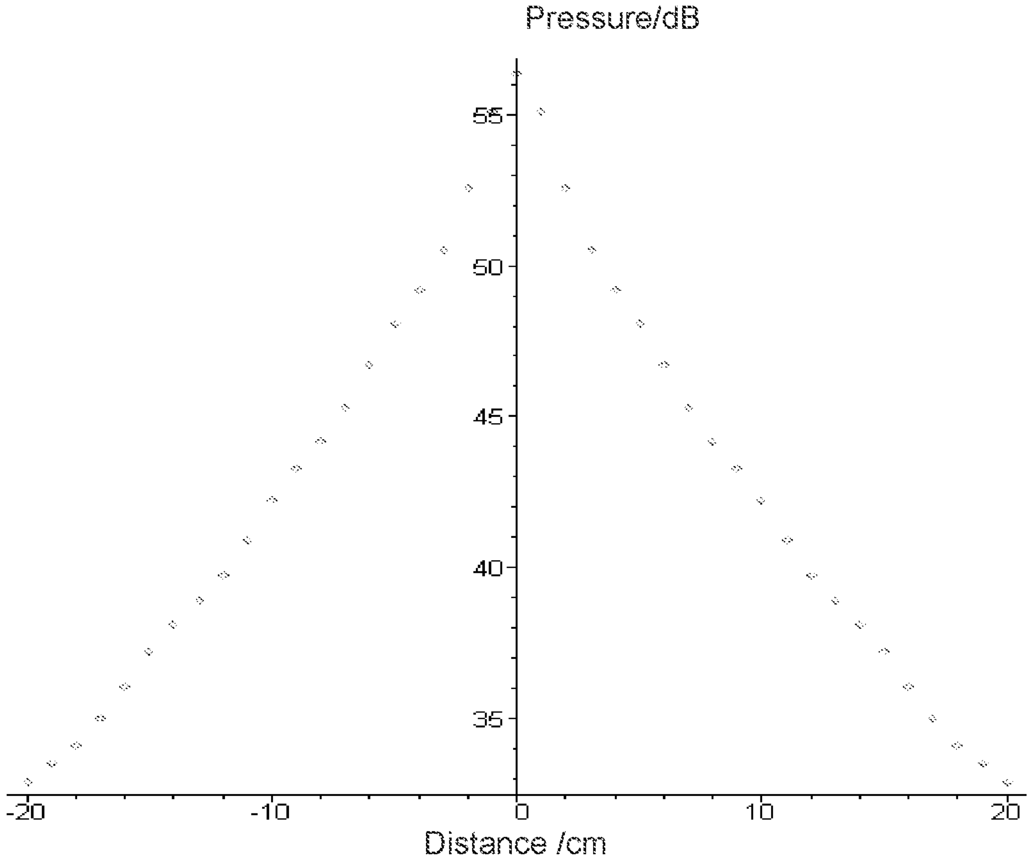
FIGS. 32E-32G show changes in beam width based on different carrier frequencies according to different embodiments of the present invention.
Figure 32F:
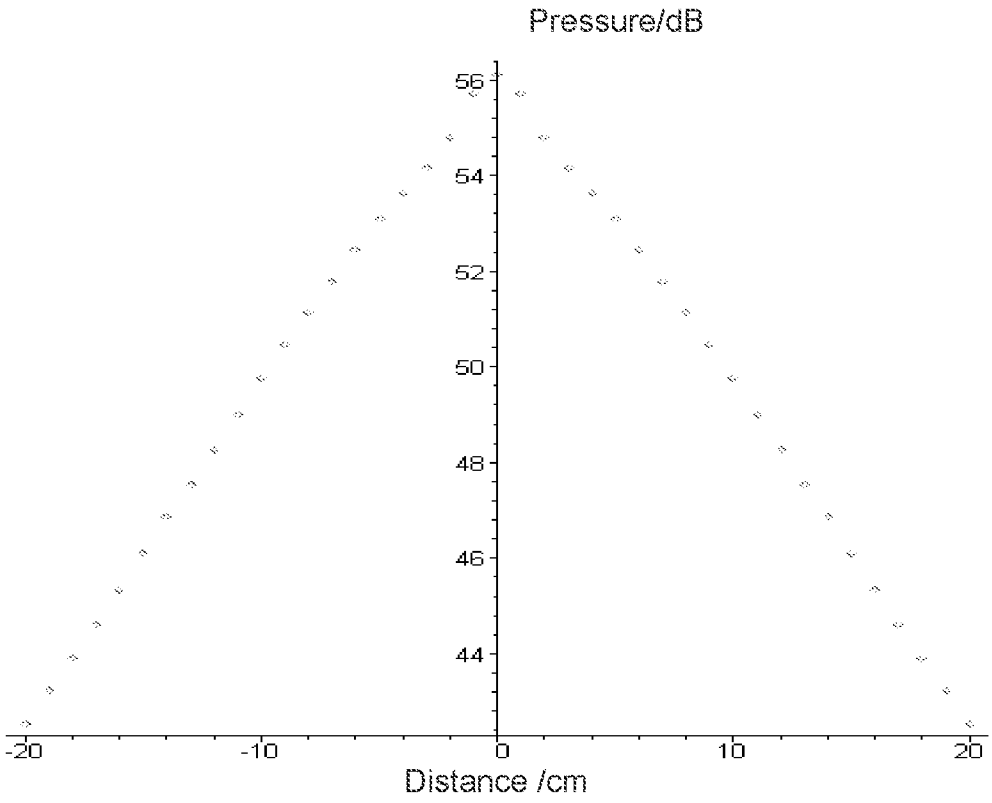
Figure 32G:
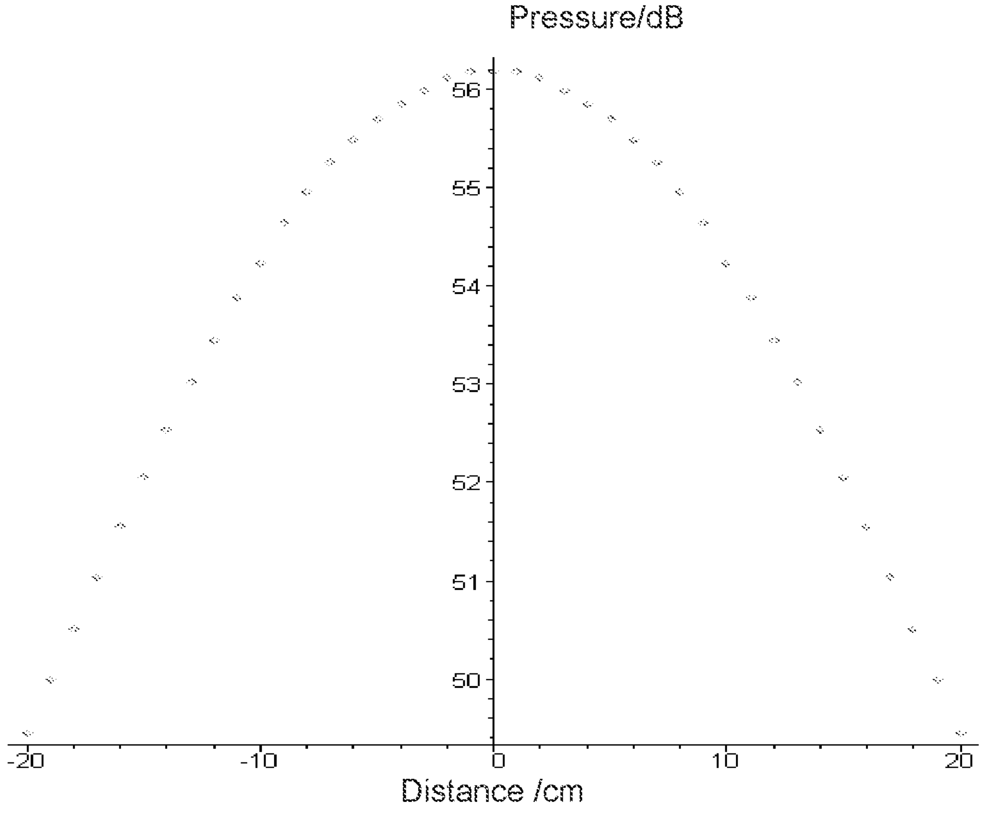

In yet another embodiment, the width of the beam can be broadened by increasing the frequency of the ultrasonic output. To illustrate this embodiment, the dimensions of the directional speaker are made to be much larger than the ultrasonic wavelengths. As a result, beam divergence based on aperture diffraction is relatively small. One reason for the increase in beam width in this embodiment is due to the increase in attenuation as a function of the ultrasonic frequency. Examples are shown in FIGS. 32E-32G, with the ultrasonic frequencies being 40 kHz, 100 kHz and 200 kHz, respectively. These figures illustrate the audio output beam patterns computed by integrating the non-linear KZK equation based on an audio frequency at 1 kHz. The emitting surface of the directional speaker is assumed to be a planar surface of 20 cm by 10 cm. Such equations are described, for example, in "Quasi-plane waves in the nonlinear acoustics of confined beams," by E. A. Zabolotskaya and R. V. Khokhov, which appeared in Sov. Phys. Acoust., Vol. 15, pp. 35-40, 1969; and "Equations of nonlinear acoustics," by V. P. Kuznetsov, which appeared in Sov. Phys. Acoust., Vol. 16, pp. 467-470, 1971.

In the examples shown in FIGS. 32E-32G, the acoustic attenuations are assumed to be 0.2 per meter for 40 kHz, 0.5 per meter for 100 kHz and 1.0 per meter for 200 kHz. The beam patterns are calculated at a distance of 4 m away from the emitting surface and normal to the axis of propagation. The x-axis of the figures indicates the distance of the test point from the axis (from −2 m to 2 m), while the y-axis of the figures indicates the calculated acoustic pressure in dB SPL of the audio output at the test point. The emitted power for the three examples are normalized so that the received power for the three audio outputs on-axis are roughly the same (e.g. at 56 dB SPL 4 m away). Comparing the figures, one can see that the lowest carrier frequency (40 kHz in FIG. 21E) gives the narrowest beam and the highest carrier frequency (200 kHz in FIG. 21G) gives the widest beam. One explanation can be that higher acoustic attenuation reduces the length of the virtual array of speaker elements, which tends to broaden the beam pattern. Anyway, in this embodiment, a lower carrier frequency provides better beam isolation, with privacy enhanced.

As explained, the audio output is in a constrained beam for enhanced privacy. Sometimes, although a user would not want to disturb other people in the immediate neighborhood, the user may want the beam to be wider or more divergent. A couple may be sitting together to watch a movie. Their enjoyment would be reduced if one of them cannot hear the movie because the beam is too narrow. In a number of embodiments to be described below, the width of the beam can be expanded in a controlled manner based on curved structural surfaces or other phase-modifying beam forming techniques.

Figure 33:
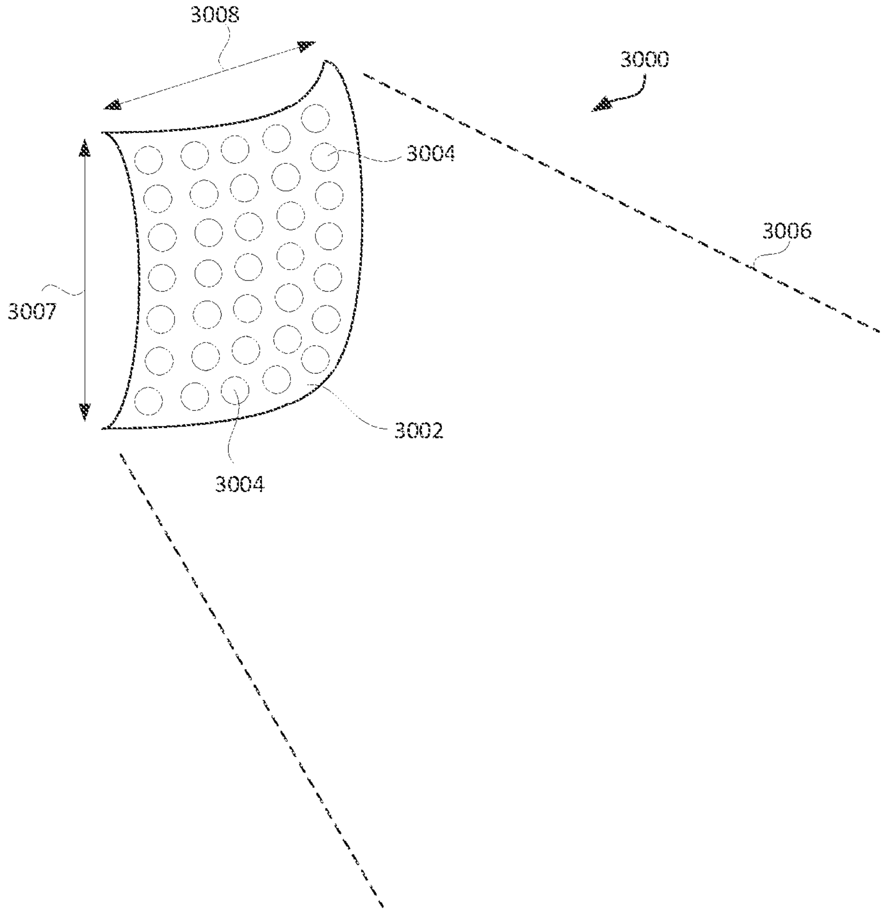
FIG. 33 shows an embodiment of the invention where the directional speaker has a curved surface to expand the beam.

FIG. 33 illustrates one approach to diverge the beam based on an ultrasonic speaker with a convex emitting surface. The surface can be structurally curved in a convex manner to produce a diverging beam. The embodiment shown in FIG. 33 has a spherical-shaped ultrasonic speaker 3000, or an ultrasonic speaker whose emitting surface of ultrasonic output is spherical in shape. In the spherical arrangement, a spherical surface 3002 has a plurality of ultrasonic elements 3004 affixed (e.g. bimorphs) or integral thereto. The ultrasonic speaker with a spherical surface 3002 forms a spherical emitter that outputs an ultrasonic output within a cone (or beam) 3006. Although the cone will normally diverge due to the curvature of the spherical surface 3002, the cone 3006 remains directionally constrained.

Diverging beams can also be generated even if the emitting surface of the ultrasonic speaker is a planar surface. For example, a convex reflector can be used to reflect the beam into a diverging beam (and thus with an increased beam width). In this embodiment, the ultrasonic speaker can be defined to include the convex reflector.

Another way to modify the shape of a beam, so as to diverge or converge the beam, is through controlling phases. In one embodiment, the directional speaker includes a number of speaker elements, such as bimorphs. The phase shifts to individual elements of the speaker can be individually controlled. With the appropriate phase shift, one can generate ultrasonic outputs with a quadratic phase wavefront to produce a converging or diverging beam. For example, the phase of each emitting element is modified by $k*r^2/(2F_0)$, where (a) r is the radial distance of the emitting element from the point where the diverging beam seems to originate from, (b) $F_0$ is the desired focal distance, (c) k—the propagation constant of the audio frequency f—is equal to $2\pi f/c_0$, where $c_0$ is the acoustic velocity.

In yet another example, beam width can be changed by modifying the focal length or the focus of the beam, or by de-focusing the beam. This can be done electronically through adjusting the relative phases of the ultrasonic signals exciting different directional speaker elements.

Still further, the propagation direction of the ultrasonic beam, such as the beam 3006 in FIG. 33, can be changed by electrical and/or mechanical mechanisms. To illustrate based on the spherical-shaped ultrasonic speaker shown in FIG. 33, a user can physically reposition the spherical surface 3002 to change its beam's orientation or direction. Alternatively, a motor can be mechanically coupled to the spherical surface 3002 to change its orientation or the propagation direction of the ultrasonic output. In yet another embodiment, the direction of the beam can be changed electronically based on phase array techniques.

The movement of the spherical surface 3002 to adjust the delivery direction can track user movement. This tracking can be performed dynamically. This can be done through different mechanisms, such as by GPS or other triangulation techniques. The user's position is fed back to or calculated by the directional audio apparatus. The position can then become a beam attribute input. The beam-attribute control unit would convert the input into the appropriate control signals to adjust the delivery direction of the audio output. The movement of the spherical surface 3002 can also be in response to a user input. In other words, the movement or positioning of the beam 3006 can be done automatically or at the instruction of the user.

As another example, a directional speaker can be rotated to cause a change in the direction in which the directionally-constrained audio output outputs are delivered. In one embodiment, a user of an audio system can manually position (e.g., rotate) the directional speaker to adjust the delivery direction. In another embodiment, the directional speaker can be positioned (e.g., rotated) by way of an electrical motor provided within the directional speaker. Such an electrical motor can be controlled by a conventional control circuit and can be instructed by one or more buttons provided on the directional speaker or a remote control device.

Figure 34A:
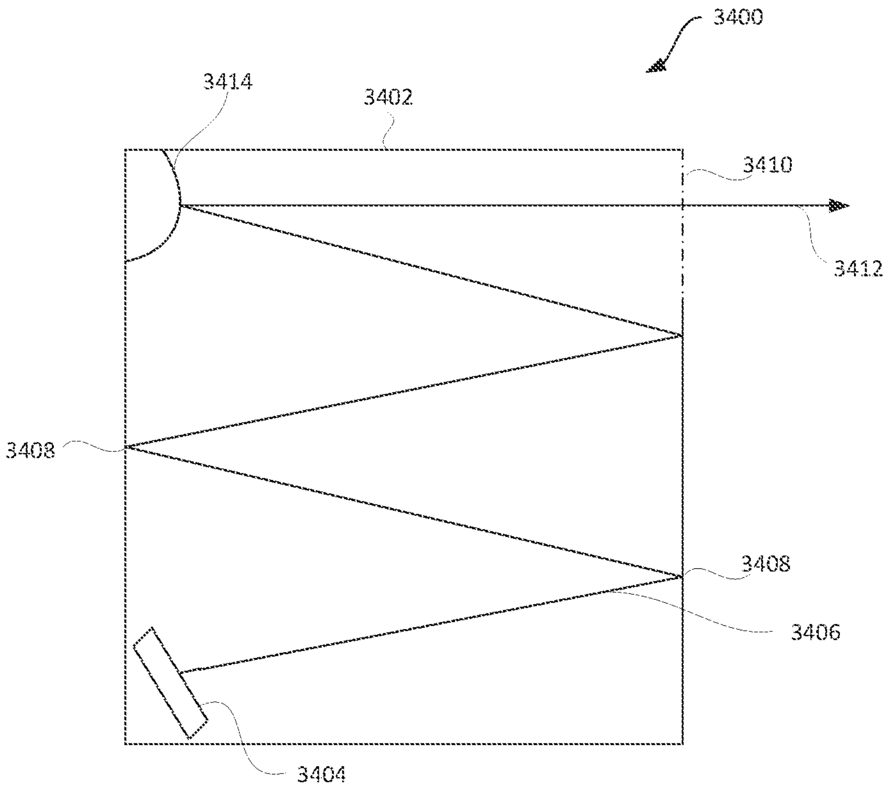
FIGS. 34A-34B show two embodiments of the invention with directional audio delivery devices that allow ultrasonic signals to bounce back and forth before emitting into free space.
Figure 34B:
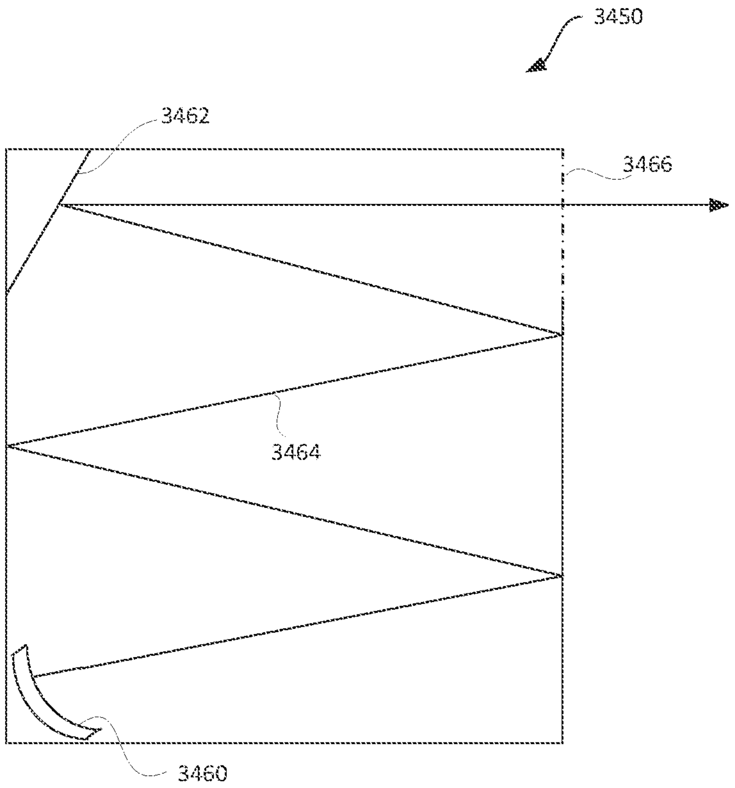

Depending on the power level of the ultrasonic signals, sometimes, it might be beneficial to reduce its level in free space to prevent any potential health hazards, if any. FIGS. 34A-34B show two such embodiments that can be employed, for example, for such a purpose. FIG. 34A illustrates a directional speaker with a planar emitting surface 3404 of ultrasonic output. The dimension of the planar surface can be much bigger than the wavelength of the ultrasonic signals. For example, the ultrasonic frequency is 100 kHz and the planar surface dimension is 15 cm, which is 50 times larger than the wavelength. With a much bigger dimension, the ultrasonic waves emitting from the surface are controlled so that they do not diverge significantly within the enclosure 3402. In the example shown in FIG. 34A, the directional audio delivery device 3400 includes an enclosure 3402 with at least two reflecting surfaces for the ultrasonic waves. The emitting surface 3404 generates the ultrasonic waves, which propagate in a beam 3406. The beam reflects within the enclosure 3402 back and forth at least once by reflecting surfaces 3408. After the multiple reflections, the beam emits from the enclosure at an opening 3410 as the output audio 3412. The dimensions of the opening 3410 can be similar to the dimensions of the emitting surface 3404. In one embodiment, the last reflecting surface can be a concave or convex surface 3414, instead of a planar reflector, to generate, respectively, a converging or diverging beam for the output audio 3412. Also, at the opening 3410, there can be an ultrasonic absorber to further reduce the power level of the ultrasonic output in free space.

FIG. 34B shows another embodiment of a directional audio delivery device 3450 that allows the ultrasonic waves to bounce back and forth at least once by ultrasonic reflecting surfaces before emitting into free space. In FIG. 34B, the directional speaker has a concave emitting surface 3460. The concave surface first focuses the beam and then diverges the beam. For example, the focal point 3464 of the concave surface 3460 is at the mid-point of the beam path within the enclosure. Then with the last reflecting surface 3462 being flat, convex or concave, the beam width at the opening 3466 of the enclosure can be not much larger than the beam width right at the concaved emitting surface 3460. However, at the emitting surface 3460, the beam is converging. While at the opening 3466, the beam is diverging. The curvatures of the emitting and reflecting surfaces can be computed according to the desired focal length or beam divergence angle similar to techniques used in optics, such as in telescopic structures.

Different embodiments or implementations may yield different advantages. One advantage of the invention is that audio output from a directional audio apparatus can be directionally constrained so as to provide directional audio delivery. The directionally-constrained audio output can provide less disturbance to others in the vicinity who are not desirous of hearing the audio output. A number of attributes of the constrained audio outputs can be adjusted, either by a user or automatically and dynamically based on certain monitored or tracked measurements, such as the position of the user.

One adjustable attribute is the direction of the constrained audio outputs. It can be controlled, for example, by (a) activating different segments of a planar or curved speaker surface, (b) using a motor, (c) manually moving the directional speaker, or (d) through phase array beam steering techniques.

Another adjustable attribute is the width of the beam of the constrained audio outputs. It can be controlled, for example, by (a) modifying the frequency of the ultrasonic signals, (b) activating one or more segments of the speaker surface, (c) using phase array beam forming techniques, (d) employing curved speaker surfaces to diverge the beam, (e) changing the focal point of the beam, or (f) de-focusing the beam.

In one embodiment, the degree of isolation or privacy can be controlled independent of the beam width. For example, one can have a wider beam that covers a shorter distance through increasing the frequency of the ultrasonic signals. Isolation or privacy can also be controlled through, for example, (a) phase array beam forming techniques, (b) adjusting the focal point of the beam, or (c) de-focusing the beam.

The volume of the audio output can be modified through, for example, (a) changing the amplitude of the ultrasonic signals driving the directional speakers, (b) modifying the ultrasonic frequency to change its distance coverage, or (c) activating more segments of a planar or curved speaker surface.

The audio output can also be personalized or adjusted based on the audio conditions of the areas surrounding the directional audio apparatus. Signal pre-processing techniques can be applied to the audio signals for such personalization and adjustment.

Ultrasonic hazards, if any, can be minimized by increasing the path lengths of the ultrasonic waves from the directional speakers before the ultrasonic waves emit into free space. There can also be an ultrasonic absorber to attenuate the ultrasonic waves before they emit into free space. Another way to reduce potential hazard, if any, is to increase the frequency of the ultrasonic signals to reduce their distance coverage.

Stereo effects can also be introduced by using more than one directional audio delivery devices that are spaced apart. This will generate multiple and different constrained audio outputs to create stereo effects for a user.

Directionally-constrained audio output outputs can also be generated from a remote control.

In one embodiment, a directional audio conversion apparatus transforms audio input signals into directional audio output signals.

An embodiment is applicable in a moving vehicle, such as a car, a boat or a plane. A directional audio conversion apparatus can be integrated into or attachable to the moving vehicle. As an example, the moving vehicle can be a car. At the front panel or dashboard of the car, there can be a USB, PCMCIA or other types of interface port. The apparatus can be inserted into the port to generate directional audio signals.

In yet another embodiment, one or more directional speakers are incorporated into a moving vehicle. The speakers can be used for numerous applications, such as personal entertainment and communication applications, in the vehicle.

In one embodiment, the directional speaker emits ultrasonic beams. The frequency of the ultrasonic beams can be, for example, in the 40 kHz range, and the beams can be diverging. For example, a 3-cm (diameter) emitter generates an ultrasonic beam that diverges to a 30-cm (diameter) cone after propagating for a distance of 20 to 40 cm. With the diameter of the beams increased by 10 dB, the ultrasonic intensity is reduced by around 20 dB. In another embodiment, the frequency of the beams is at a higher range, such as in the 200 to 500 kHz range. Such higher frequency ultrasonic beams experience higher attenuation in air, such as in the 8 to 40 dB/m range depending on the frequency. In yet another embodiment, the beams with higher ultrasonic frequencies, such as 500 kHz, are diverging beams also. Such embodiments with higher frequencies and diverging beams are suitable to other applications also, such as in areas where the distance of travel is short, for example, 20 cm between the speaker and ear.

Regarding the location of the speaker, it can be mounted directly above where a user should be, such as on the rooftop of the vehicle above the seat. The speaker can be located closer to the back than the front of the seat because when a person sits, the person typically leans on the back of the seat. In another embodiment, the directional speaker is mounted slightly further away, such as at the dome light of a car, with ultrasonic beams directed approximately at the head rest of a user's seat inside the car. For example, one speaker is located in the vicinity of the corner of the dome-light that is closest to the driver, with the direction of the signals, pointing towards the approximate location of the head of the driver. Signals not directly received by the intended recipient, such as the driver, can be scattered by the driver and/or the seat fabrics thereby reducing the intensity of the reflected signals to be received by other passengers in the car.

Instead of emitting ultrasonic signals, in one embodiment, the speakers can emit audio beams, with any directivity depending on the physical structure of the speaker. For example, the speaker is a horn or cone or other similar structure. The directivity of such a speaker depends on the aperture size of the structure. For example, a 10-cm horn has a $\lambda/D$ of about 1 at 3 kHz, and a $\lambda/D$ of about 0.3 at 10 kHz. Thus, at low frequency, such an acoustic speaker offers relatively little directivity. Still, the intensity of the beams goes as $1/R^2$, with R being the distance measured from, for example, the apex of the horn. To achieve isolation, proximity becomes more relevant. In such an embodiment, the speaker is positioned close to the user. Assume that the speaker is placed directly behind the passenger's ears, such as around 10 to 15 cm away. The speaker can be in the head rest or head cushion of the user's seat. Or, the speaker can be in the user's seat, with the beam directed towards the user. If other passengers in the vehicle are spaced at least 1 meter away from the user, based on propagation attenuation (or attenuation as the signals travel in air), the sound isolation effect is around 16 to 20 dB. The structure of the horn or cone can provide additional isolation effect, such as another 6 to 10 dB.

In one embodiment, the user can control one or more attributes of the beams. For example, the user can control the power, direction, distance or coverage of the beams.

Regarding the location of the controls, if the vehicle is a car, the controls can be on the dash board of the vehicle. In another embodiment, the controls are in the armrest of the seat the user is sitting on.

The controls can be mechanical. For example, the speaker is at the dome light, and there can be a rotational mechanism at the dome light area. The rotational mechanism allows the user to adjust the direction of beam as desired. In one embodiment, the rotational mechanism allows two-dimensional rotations. For example, the beams are emitting at a 30 degrees angle from the roof top, and the rotational mechanism allows the beams to be rotated 180 degrees around the front side of the vehicle. In another embodiment, the elevation angle can also be adjusted, such as in the range of 20 to 70 degrees from the roof top.

Another mechanical control can be used to turn the speaker off. For example, when the user stands up from the user's seat, after a preset amount of time, such as 3 seconds, the speaker is automatically turned off.

The controls can also be in a remote controller. The remote controller can use BlueTooth, WiFi, ultrasonic, or infrared or other wireless technologies. The remote controller can also include a fixed or detachable display. The remote controller can be a portable device.

Regarding other attributes of the beam, as to the power level of the signals, the sound level does not have to be too high. For example, the sound level can be about 60 dB SPL at 5 cm away from the speaker.

The content of the signals from the speaker can be accessed in a number of ways. In one embodiment, the content, which can be from a radio station, is wirelessly received by the speaker. For example, the content can be received through the Internet, a WiFi network, a WiMax network, a cell-phone network or other types of networks.

The speaker does not have to receive the content directly from the broadcaster, or the source. In one embodiment, the vehicle receives the content wirelessly from the source, and then through a wired or a wireless connection, the vehicle transmits the content to the speaker.

In yet another embodiment, the content can be selected from a multimedia player, such as a CD player, from the vehicle. The multimedia player can receive from multiple channels to support multiple users in the vehicle. Again, the contents or channels can be received from a broadcast station and selected locally. Or, the content can be created on-demand and streamed to the user demanding it by a wireless server station. In yet another embodiment, the content can be downloaded to a multimedia player from a high-speed wireless network in its entirely before being played.

Another type of control is to select the radio station or a piece of music on a multimedia player. Again, these types of selection control can be from a fixed location in the vehicle, such as there can be control knobs at the dashboard, console, arm rest, door or seat of the vehicle. Or, as another example, the selection controller can be in a portable device.

A number of embodiments have been described regarding one speaker. In yet another embodiment, there can be more than one speaker for a user. The multiple speakers allow the creation of stereo or surround sound effects.

As described regarding the multimedia player, the player can receive from multiple channels to support multiple users in the vehicle. If there is more than one user in the vehicle, each user can have a directional speaker or a set of directional speakers. Regarding the locations of the speakers for multiple users, in one embodiment, they are centralized. All of the speakers are, for example, at the dome light of a vehicle. Each user has a corresponding set of directional beams, radiating from the dome towards the user. Or, the speakers can be distributed. Each user can have a speaker mounted, for example, on the rooftop above where the user should be seating, or in the user's headrest. Regarding control, each user can independently control the signals to that user. For example, a user's controller can control the user's own set of beams, or to select the content of what the user wants to hear. Each user can have a remote controller. In another embodiment, the controller for a user is located at the armrest, seat or door for that user.

Numerous embodiments of the present invention have been applied to an indoor environment, using building layouts. However, many embodiments of the present invention are perfectly suitable for outdoor applications also. For example, a user can be sitting inside a patio reading a book, while listening to music from a directional audio apparatus of the present invention. The apparatus can be outside, such as 10 meters away from the user. Due to the directionally constrained nature of the audio output, sound can still be localized within the direct vicinity of the user. As a result, the degree of noise pollution to the user's neighbors is significantly reduced.

In one embodiment, an existing audio system can be modified with one of the described embodiments to generate directionally-constrained audio output outputs. A user can select either directionally constrained or normal audio outputs from the audio system, as desired.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data, which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the invention. However, it will be understood by those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A wearable hearing device to at least help a user hear audio signals, with the wearable hearing device configured to secure to the head of the user, at one ear of the user, the wearable hearing device comprising:

a wireless communication component configured to receive wireless signals in gigahertz frequencies, wherein the wireless signals are configured to be from signals in a mobile phone that have been up-converted and wirelessly transmitted to be received by the wearable hearing device at least via the wireless communication component;

a down-convert circuitry configured to generate down-converted signals, based on the received wireless signals;

a speaker configured to provide audio output signals, based on the down-converted signals; and a rechargeable battery, wherein the wireless communication component is configured to operate in at least a Bluetooth network, wherein the wearable hearing device comprises a first and a second microphones in the wearable hearing device, with at least the first microphone configured to at least pickup sound in an environment of the wearable hearing device, and with at least the second microphone configured to pickup at least voice of the user, wherein the wearable hearing device is configured to modify power in at least a portion of the audio output signals, based on at least the pickup sound in the environment of the wearable hearing device, so as to at least reduce noise in the audio output signals to provide to the user via the speaker, and wherein the wearable hearing device is configured to further modify power in at least a portion of the audio output signals, based on at least hearing of the user, to provide to the user via the speaker.

2. A wearable hearing device as recited in claim 1, wherein the power is modified in at least a portion of the audio output signals based on signals that are opposite in phase to at least a portion of the pickup sound in the environment of the wearable hearing device.

3. A wearable hearing device as recited in claim 1, wherein the wireless communication component is configured also to operate in a WiFi network.

4. A wearable hearing device as recited in claim 1 comprising a controller configured to make hands-free calls for the user via the mobile phone.

5. A wearable hearing device as recited in claim 4 comprising a storage device storing at least a plurality of instructions configured to recognize at least a word based on voice recognition.

6. A wearable hearing device as recited in claim 5, wherein the plurality of instructions are configured to recognize at least a voice command from the user based on voice recognition, with the wearable hearing device configured to operate according to the voice command.

7. A wearable hearing device as recited in claim 5, wherein the wearable hearing device comprises a conductive pad, and wherein the rechargeable battery is configured to be charged by having the wearable hearing device placed at least partially in a charging apparatus so that at least the conductive pad is in contact with a corresponding conductive element at the charging apparatus.

8. A wearable hearing device as recited in claim 1 comprising a storage device storing at least a plurality of instructions configured to recognize at least a word based on voice recognition.

9. A wearable hearing device as recited in claim 8, wherein the wearable hearing device is configured to be activated based on recognizing the at least a word.

10. A wearable hearing device as recited in claim 8,
wherein the wearable hearing device comprises a conductive pad, and
wherein the rechargeable battery is configured to be charged by having the wearable hearing device placed at least partially in a charging apparatus so that at least the conductive pad is in contact with a corresponding conductive element at the charging apparatus.

11. A wearable hearing device as recited in claim 10 comprising a controller configured to facilitate calibrating the hearing of the user via the speaker.

12. A wearable hearing device as recited in claim 1 comprising a storage device storing at least a plurality of instructions configured to recognize at least a voice command from the user based on voice recognition, with the wearable hearing device configured to operate according to the voice command.

13. A wearable hearing device as recited in claim 1,
wherein the audio output signals include a plurality of frequency bands, and
wherein the wearable hearing device is configured to increase the power of the audio output signals in at least one of the frequency bands more than another one of the frequency bands in the plurality of frequency bands.

14. A headset to at least help a user hear audio signals, with the headset configured to secure to the head of the user, at least at one ear of the user, the headset comprising:
a wireless communication component configured to receive wireless signals in gigahertz frequencies, wherein the wireless signals are configured to be from signals in a mobile device that have been up-converted and wirelessly transmitted to be received by the headset at least via the wireless communication component;
a down-convert circuitry configured to generate down-converted signals, based on the received wireless signals;
a speaker configured to provide audio output signals, based on the down-converted signals; and
a rechargeable battery,
wherein the headset comprises a first and a second microphones in the headset, with at least the first microphone configured to at least pickup sound in an environment of the headset, and with at least the second microphone configured to pickup at least voice of the user,
wherein the headset is configured to modify power in at least a portion of the audio output signals, based on at least the pickup sound in the environment of the headset, so as to at least reduce noise in the audio output signals to provide to the user via the speaker,
wherein the wireless communication component is configured to operate in at least a Bluetooth network,
wherein the headset comprises a controller configured to make hands-free calls for the user via the mobile device operable at least as a mobile phone,
wherein the headset comprises a storage device storing at least a plurality of instructions configured to recognize at least a word based on voice recognition, and
wherein the headset is configured to further modify power within at least a portion of the audio output signals, based on at least a hearing characteristic of the user, to provide to the user via the speaker.

15. A headset as recited in claim 14,
wherein the headset comprises a conductive pad, and
wherein the rechargeable battery is configured to be charged by having the headset placed at least partially in a charging apparatus so that at least the conductive pad is in contact with a corresponding conductive element at the charging apparatus.

16. A headset to at least help a user hear audio signals, with the headset configured to secure to the head of the user, at least at one ear of the user, the headset comprising:
a wireless communication component configured to receive wireless signals in gigahertz frequencies, wherein the wireless signals are configured to be from signals in a television that have been up-converted and wirelessly transmitted to be received by the headset at least via the wireless communication component;
a down-convert circuitry configured to generate down-converted signals, based on the received wireless signals;
a speaker configured to provide audio output signals, based on the down-converted signals; and
a rechargeable battery,
wherein the headset comprises a first and a second microphones in the headset, with at least the first microphone configured to at least pickup sound in an environment of the headset, and with at least the second microphone configured to pickup at least voice of the user,
wherein the headset is configured to modify power in at least a portion of the audio output signals, based on at least the pickup sound in the environment of the headset, so as to at least reduce noise in the audio output signals to provide to the user via the speaker,
wherein the headset is configured to further modify power in at least a portion of the audio output signals, based on at least hearing of the user, to provide to the user via the speaker, and
wherein the wireless communication component is configured to operate in at least a Bluetooth network.

17. A headset as recited in claim 16 comprising:
a storage device storing at least a plurality of instructions configured to recognize at least a word based on voice recognition; and
a conductive pad,
wherein the rechargeable battery is configured to be charged by having the headset placed at least partially in a charging apparatus so that at least the conductive pad is in contact with a corresponding conductive element at the charging apparatus.

18. A headset as recited in claim 17 comprising a controller configured to make hands-free calls for the user via a mobile phone.

19. A headset as recited in claim 18, wherein the wireless communication component is configured also to operate in a WiFi network.

20. A headset as recited in claim 19, wherein the controller is configured to facilitate calibrating the hearing of the user via the speaker.

* * * * *